(12) United States Patent
Tremaine et al.

(10) Patent No.: US 10,006,584 B2
(45) Date of Patent: Jun. 26, 2018

(54) ADJUSTABLE RETAINING BRACKET

(71) Applicant: QTran, Inc., Milford, CT (US)

(72) Inventors: John M. Tremaine, New Canaan, CT (US); Adrian R. Teschemaker, West Haven, CT (US)

(73) Assignee: QTran, Inc., Milford, CT (US)

( * ) Notice: Subject to any disclaimer, the term of this patent is extended or adjusted under 35 U.S.C. 154(b) by 0 days. days.

(21) Appl. No.: 15/030,550

(22) PCT Filed: Oct. 20, 2014

(86) PCT No.: PCT/US2014/061305
§ 371 (c)(1),
(2) Date: Apr. 19, 2016

(87) PCT Pub. No.: WO2015/094469
PCT Pub. Date: Jun. 25, 2015

(65) Prior Publication Data
US 2016/0238191 A1    Aug. 18, 2016

Related U.S. Application Data

(60) Provisional application No. 61/918,462, filed on Dec. 19, 2013.

(51) Int. Cl.
*F16M 13/00* (2006.01)
*F16M 13/02* (2006.01)
(Continued)

(52) U.S. Cl.
CPC ............... *F16M 13/02* (2013.01); *E04B 1/40* (2013.01); *E04F 21/185* (2013.01); *F16C 3/03* (2013.01);
(Continued)

(58) Field of Classification Search
CPC ................................ E04G 17/16; F16M 13/02
(Continued)

(56) References Cited

U.S. PATENT DOCUMENTS

| 4,325,529 A | 4/1982 | Seebinger |
| 5,131,616 A | 7/1992 | Biba |

(Continued)

FOREIGN PATENT DOCUMENTS

| DE | 3532303 A1 | 3/1987 |
| DE | 202013007452 U1 | 10/2013 |

(Continued)

OTHER PUBLICATIONS

"3Way Adjustable Concealed Hinge," Sugatsune, pp. 233-235, Sep. 11, 2009.

(Continued)

*Primary Examiner* — Steven M Marsh
(74) *Attorney, Agent, or Firm* — Ware, Fressola, Maguire & Barber LLP

(57) ABSTRACT

Exemplary embodiments of the present invention are directed to an adjustable retaining bracket that can be secured to a surface and adjusted in a first elevational direction relative to the surface, in a second direction along an axis substantially perpendicular to the first elevational direction and towards or away from the surface and in a third direction substantially perpendicular to the second direction. The adjustable retaining bracket may include a base brace and at least one adjusting bolt configured to secure the adjustable retaining bracket to the surface. The adjustable retaining bracket may also include an outer tube operationally engaged with the base brace and an adjusting rod configured to move the outer tube along the third direction, (Continued)

and an inner tube in telescoping relationship with the outer tube and configured for movement relative to the outer tube along the second direction.

8 Claims, 58 Drawing Sheets

(51) Int. Cl.
 *E04F 21/18* (2006.01)
 *E04B 1/41* (2006.01)
 *F16C 3/03* (2006.01)
 *F16M 11/04* (2006.01)
 *F16M 11/18* (2006.01)

(52) U.S. Cl.
 CPC ......... *F16M 11/046* (2013.01); *F16M 11/048* (2013.01); *F16M 11/18* (2013.01)

(58) Field of Classification Search
 USPC ............... 248/161, 244, 285.1, 286.1, 287.1, 248/295.11, 298.1
 See application file for complete search history.

(56) References Cited

U.S. PATENT DOCUMENTS

| 5,456,554 | A | 10/1995 | Barrett et al. |
| 5,462,269 | A | 10/1995 | Schroeder et al. |
| 5,533,839 | A | 7/1996 | Shimada |
| 5,657,593 | A | 8/1997 | Eriksen |
| 6,026,970 | A | 2/2000 | Sturm, Jr. et al. |
| 6,305,134 | B1 | 10/2001 | Robinson |
| 7,191,990 | B2 | 3/2007 | Hutter, III |
| 7,240,400 | B2 | 7/2007 | Bonham |
| 9,050,985 | B1* | 6/2015 | Chapman ................ B62B 3/001 |
| 9,239,126 | B2* | 1/2016 | Adamson ............. F16M 11/046 |
| 9,527,483 | B2* | 12/2016 | Preuss ...................... B60S 9/08 |
| 9,556,621 | B2* | 1/2017 | Pelc .................. E04F 15/02452 |
| 2002/0113176 | A1* | 8/2002 | Frank ...................... F16B 12/44 |
| | | | 248/125.8 |
| 2007/0130875 | A1 | 6/2007 | Detal |
| 2008/0035806 | A1* | 2/2008 | Sporay .................... B63B 49/00 |
| | | | 248/161 |
| 2009/0179123 | A1* | 7/2009 | Wacker ................. F16M 11/18 |
| | | | 248/161 |
| 2013/0221182 | A1 | 8/2013 | Renilson et al. |

FOREIGN PATENT DOCUMENTS

| EP | 0418769 A1 | 3/1991 |
| KR | 101324726 B1 | 11/2013 |
| KR | 20130128721 A | 11/2013 |

OTHER PUBLICATIONS

"Systems Scaffold Technical Manual," Safway, pp. 74, Apr. 12, 2011.

International Search Report and Written Opinion for International Application No. PCT/US2014/061305 dated Feb. 4, 2015.

Keighley, N., "Adjustable Mounting Bracket Kit—Type AB Installation Instructions," pp. 3, Jan. 28, 2014.

\* cited by examiner

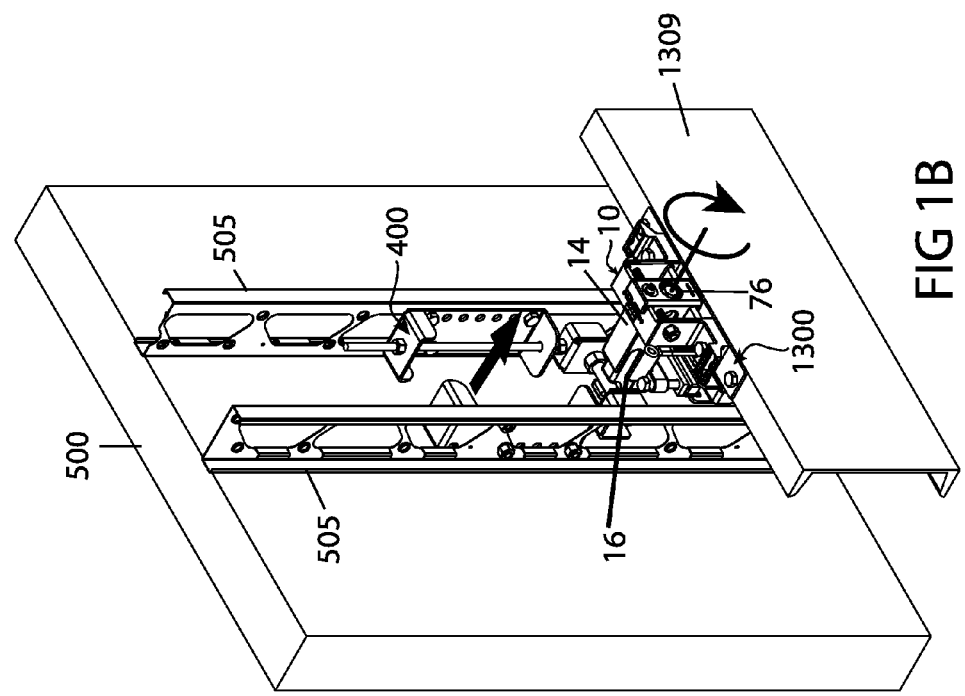
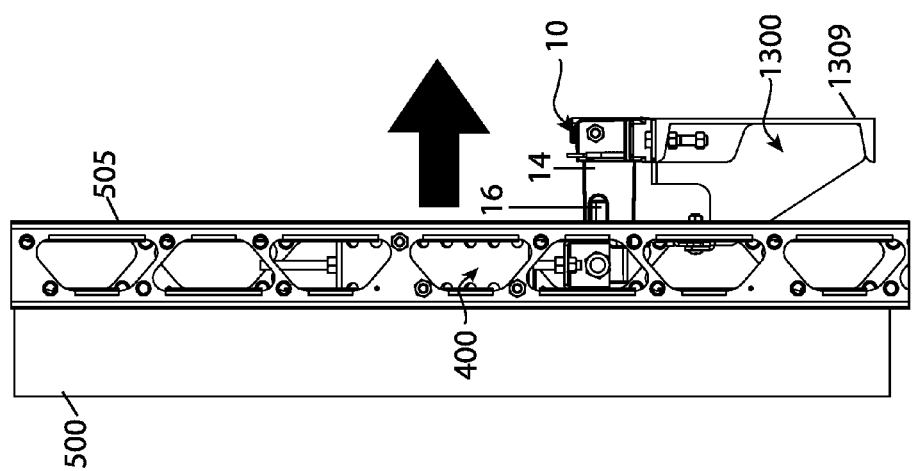

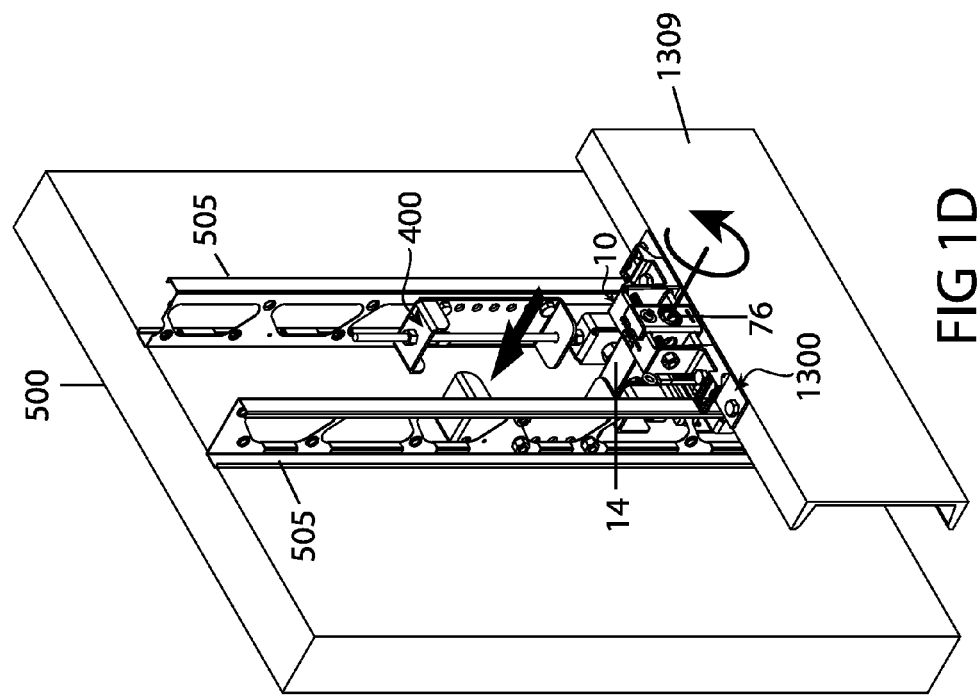
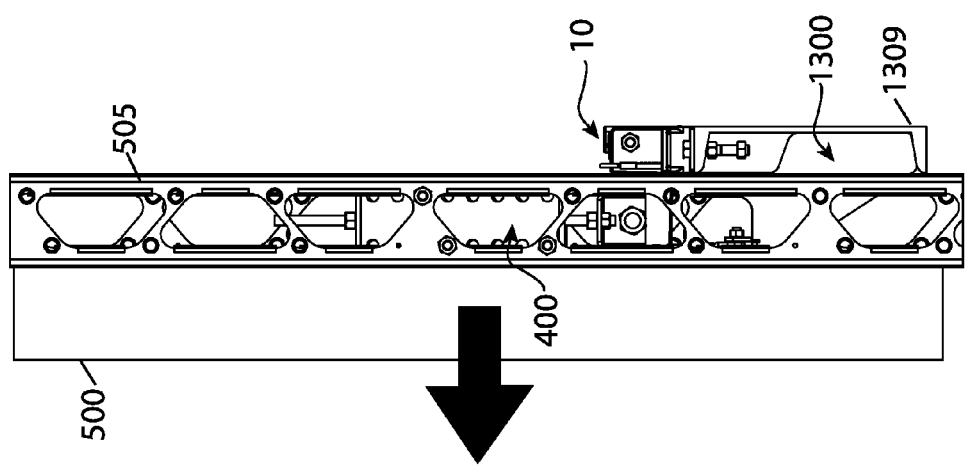

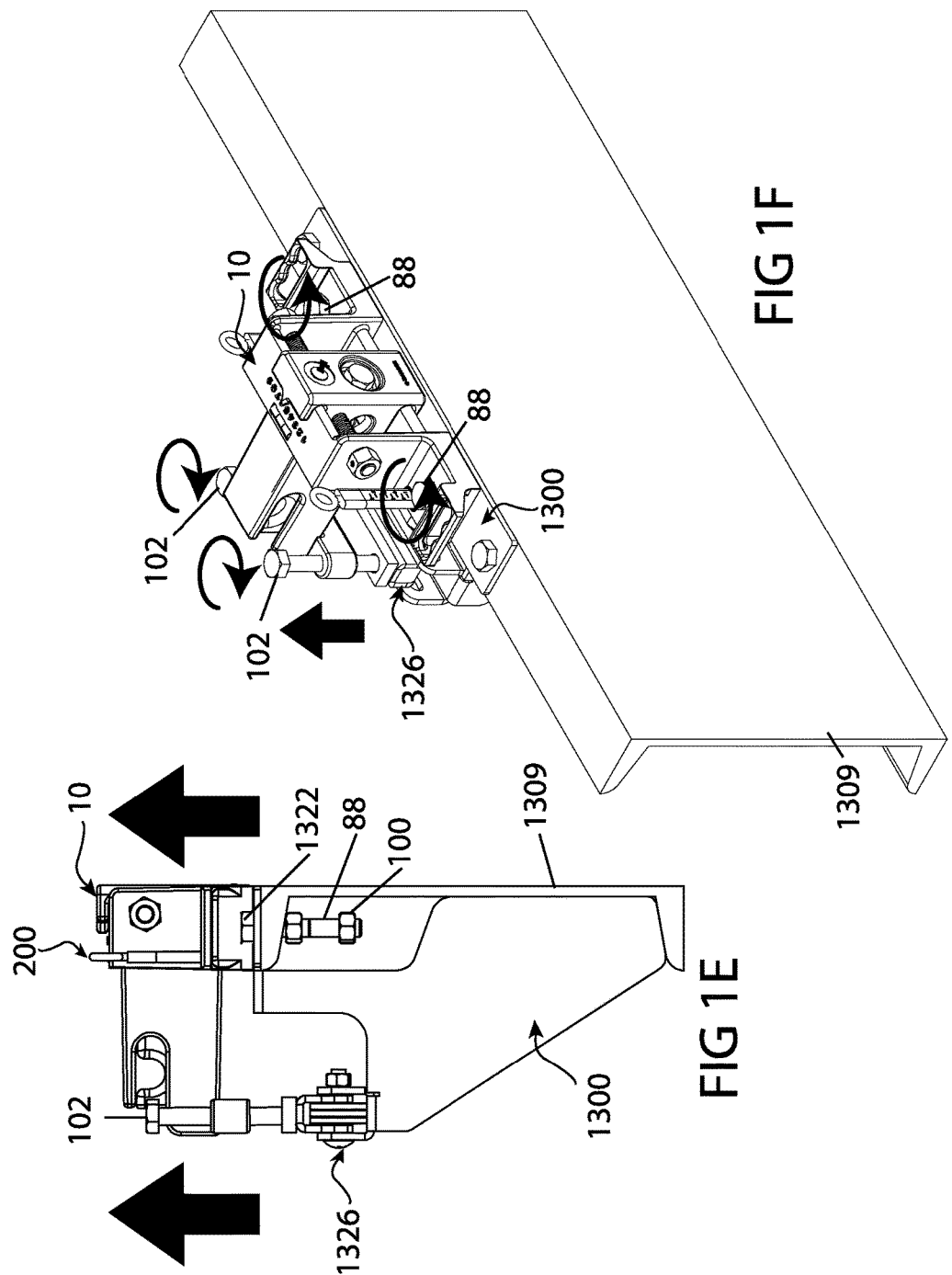

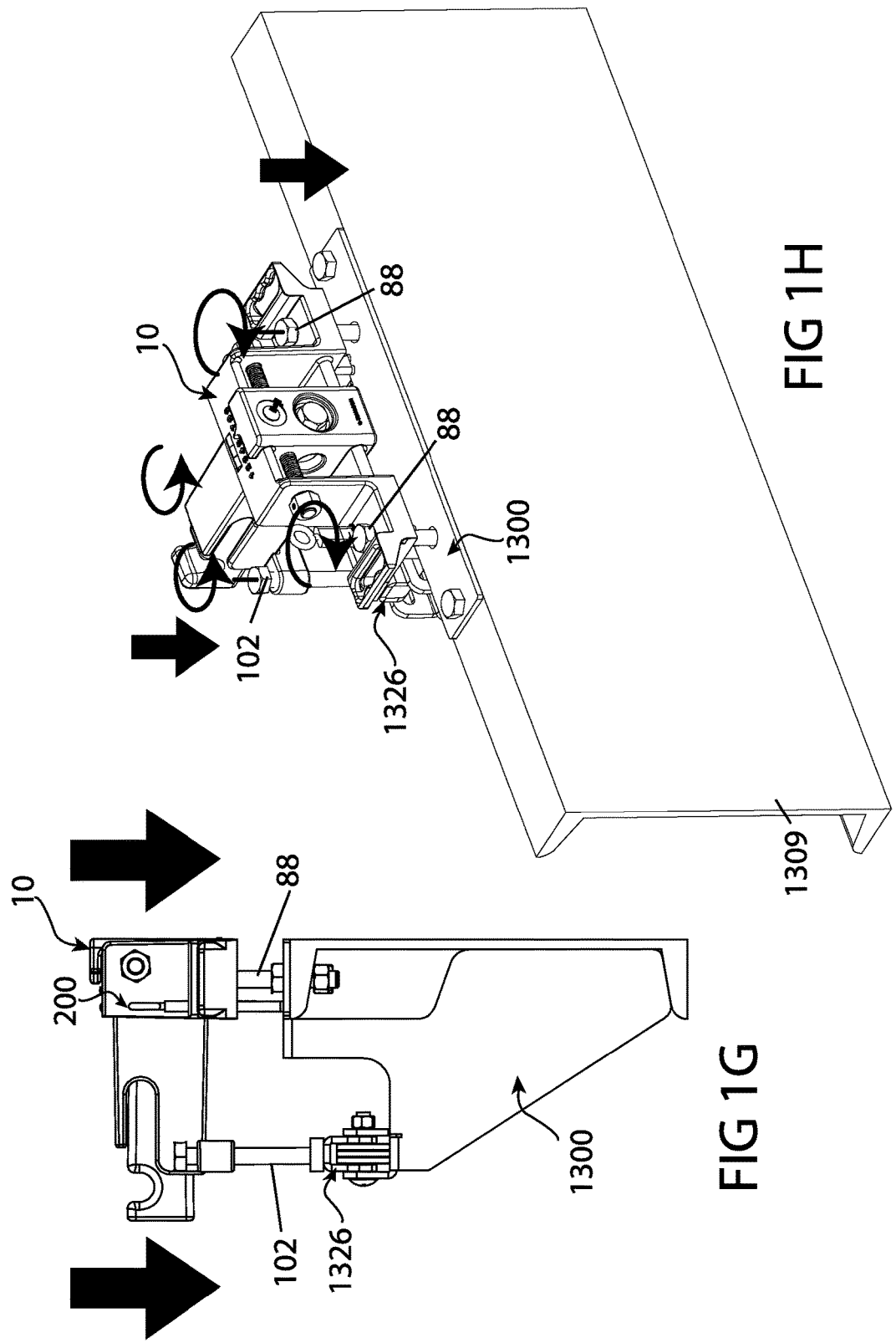

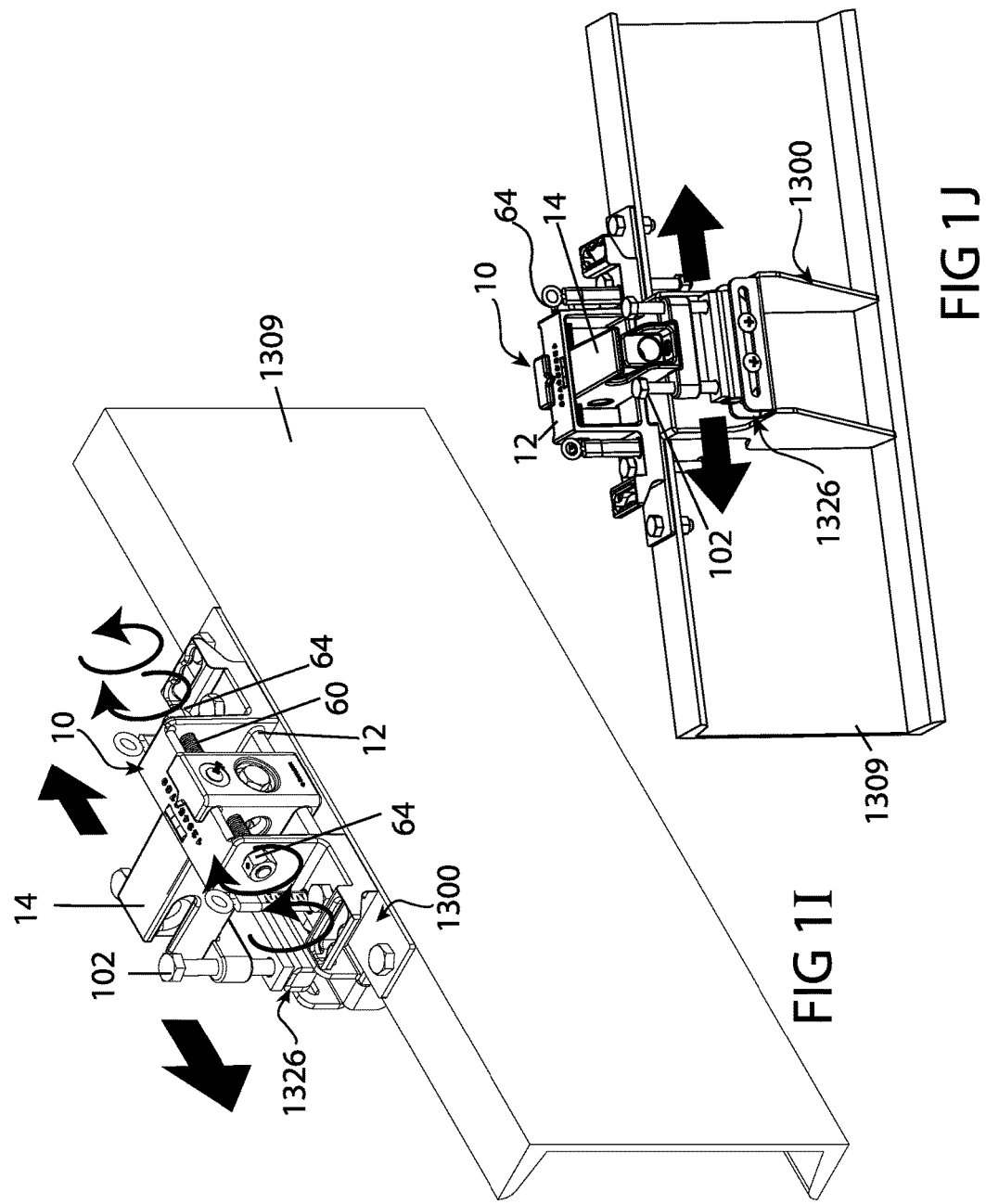

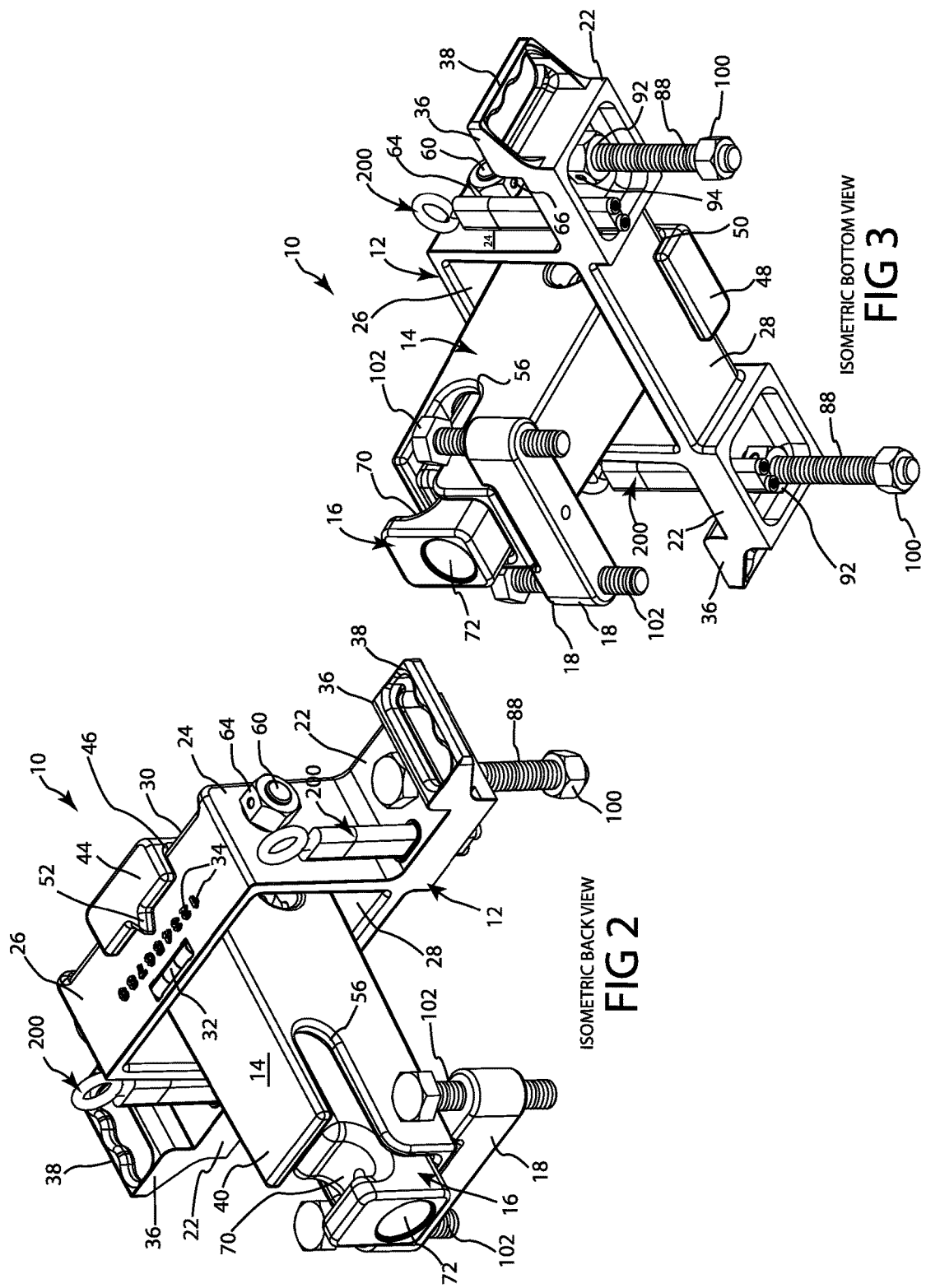

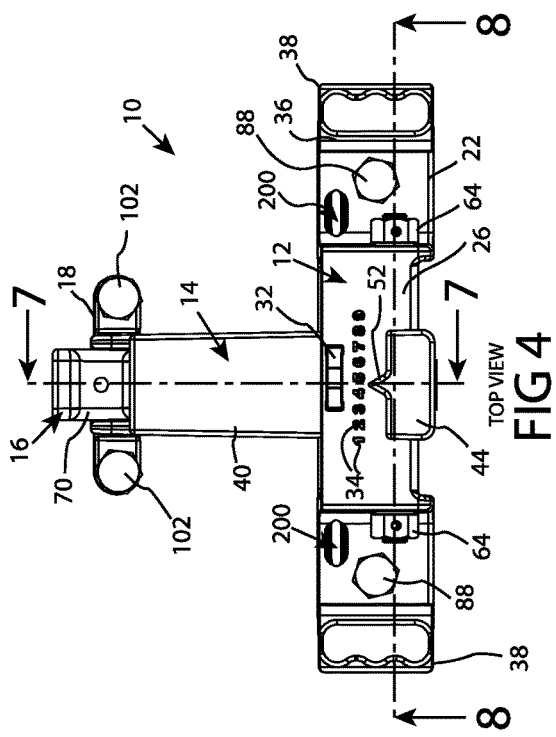
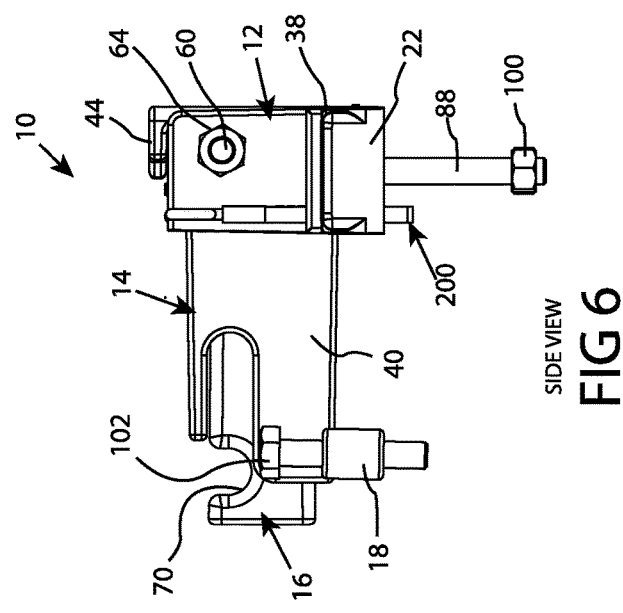

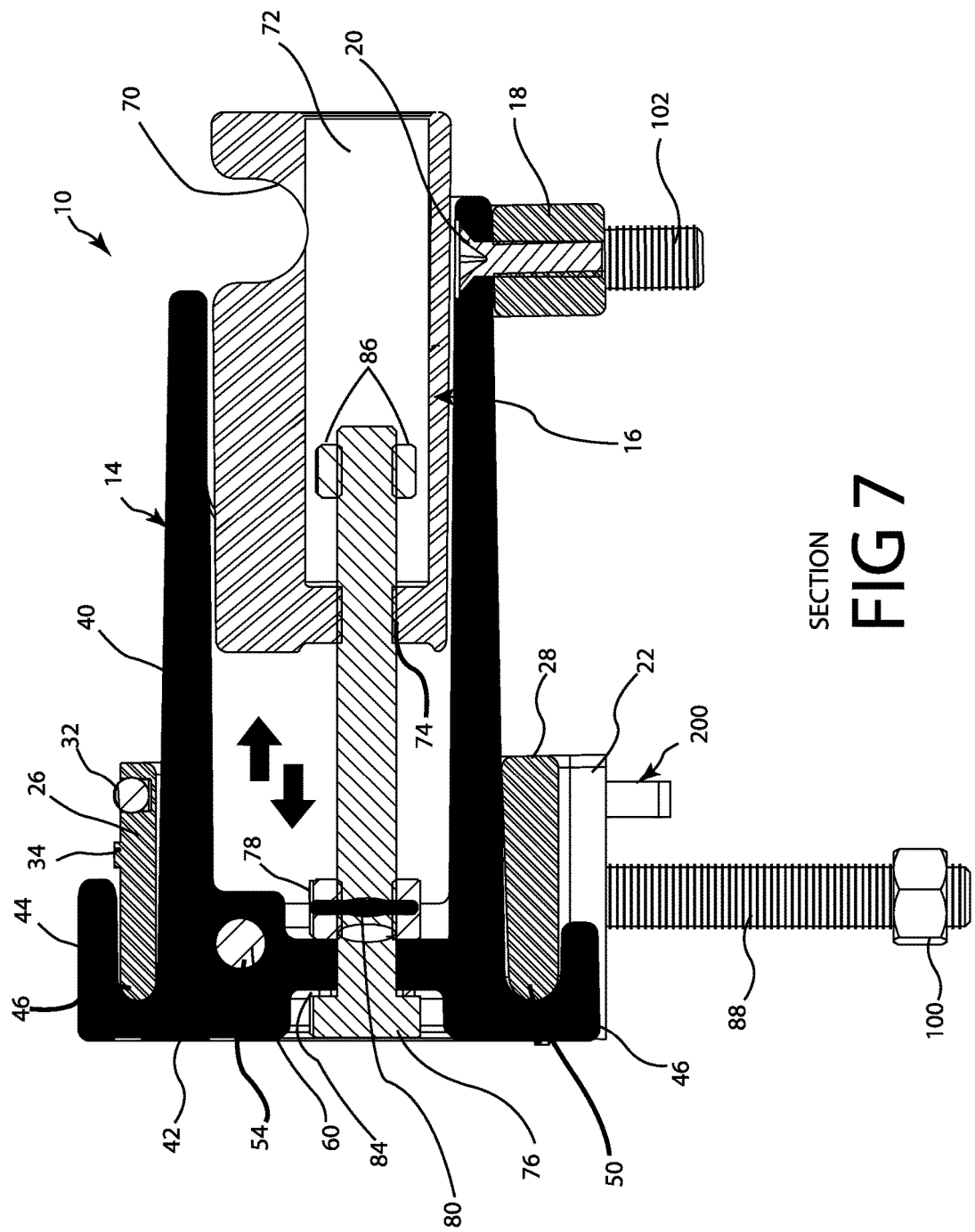

SECTION

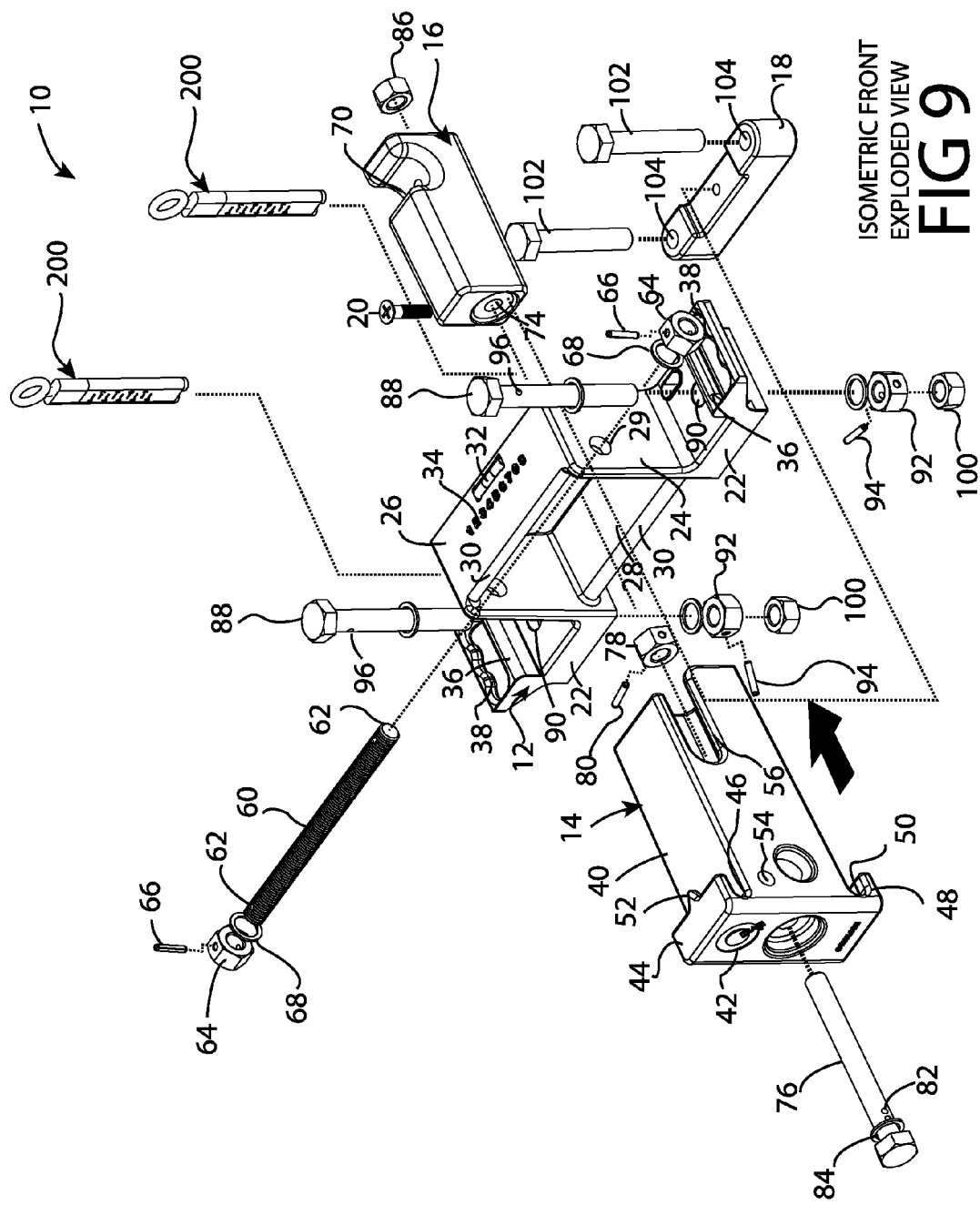

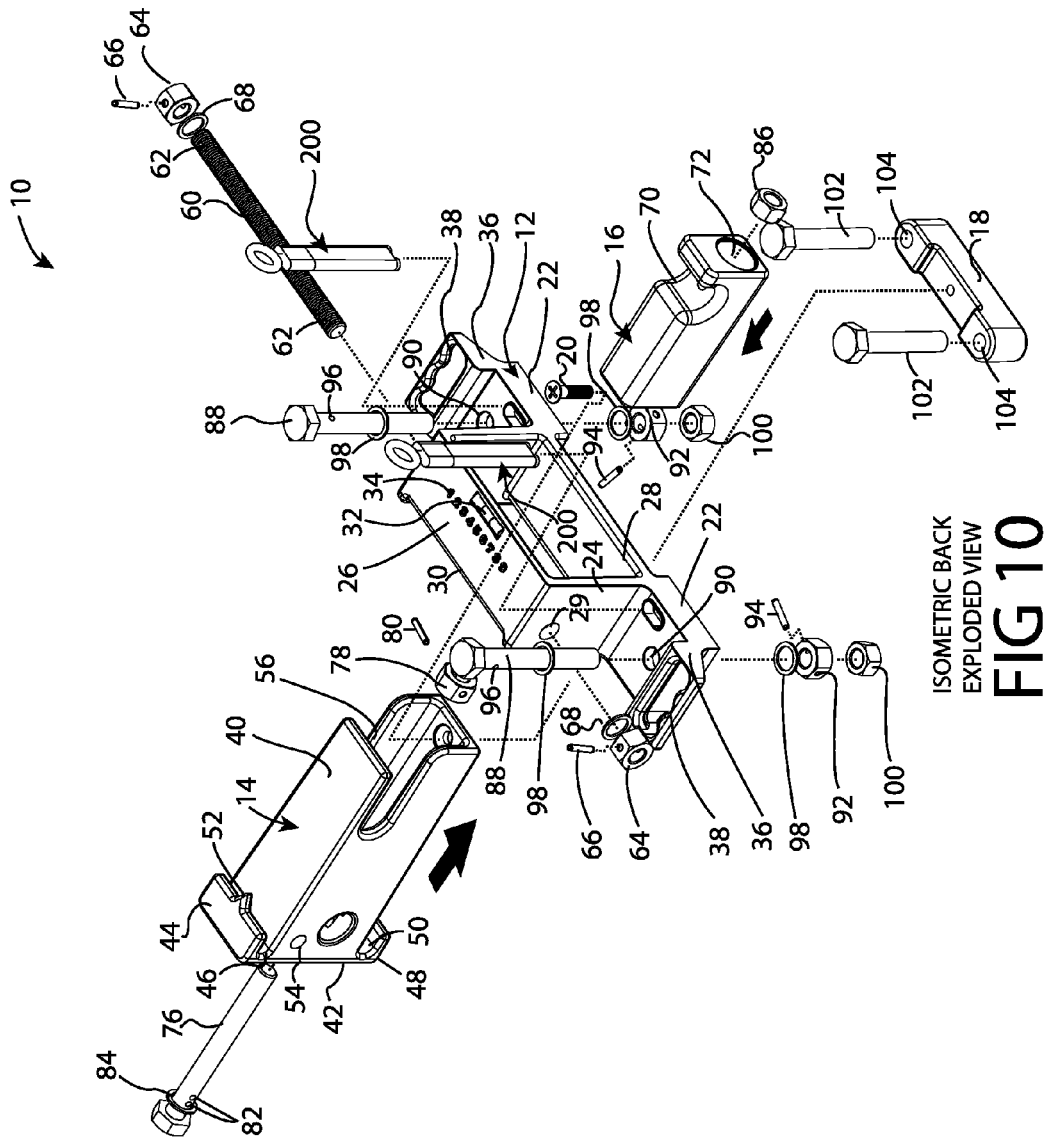

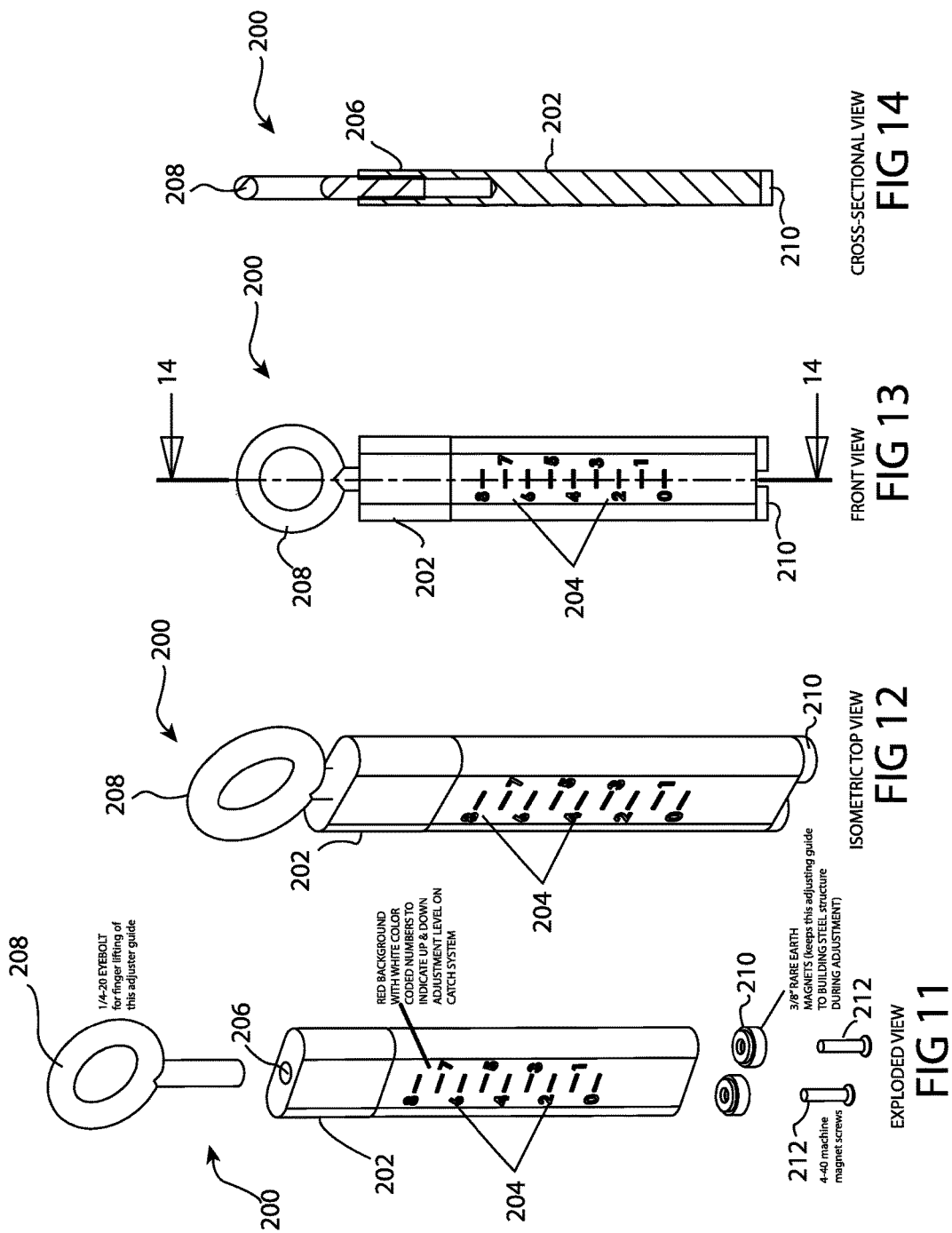

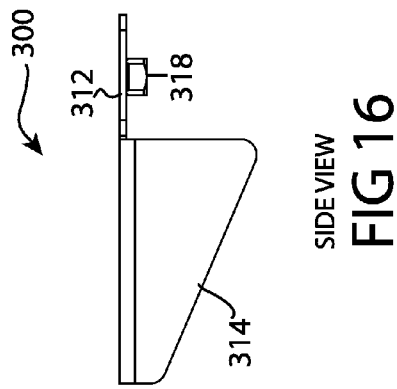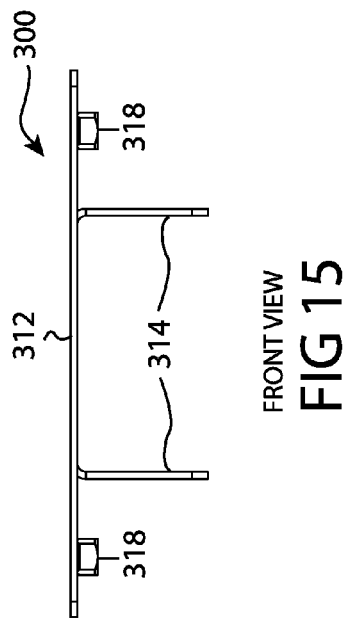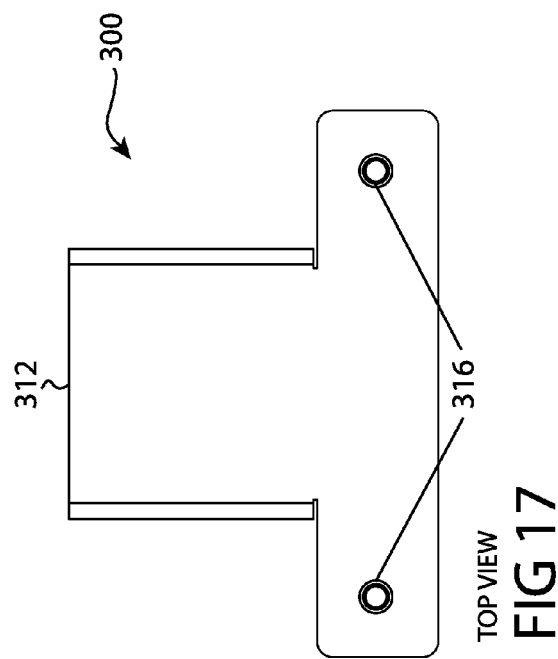

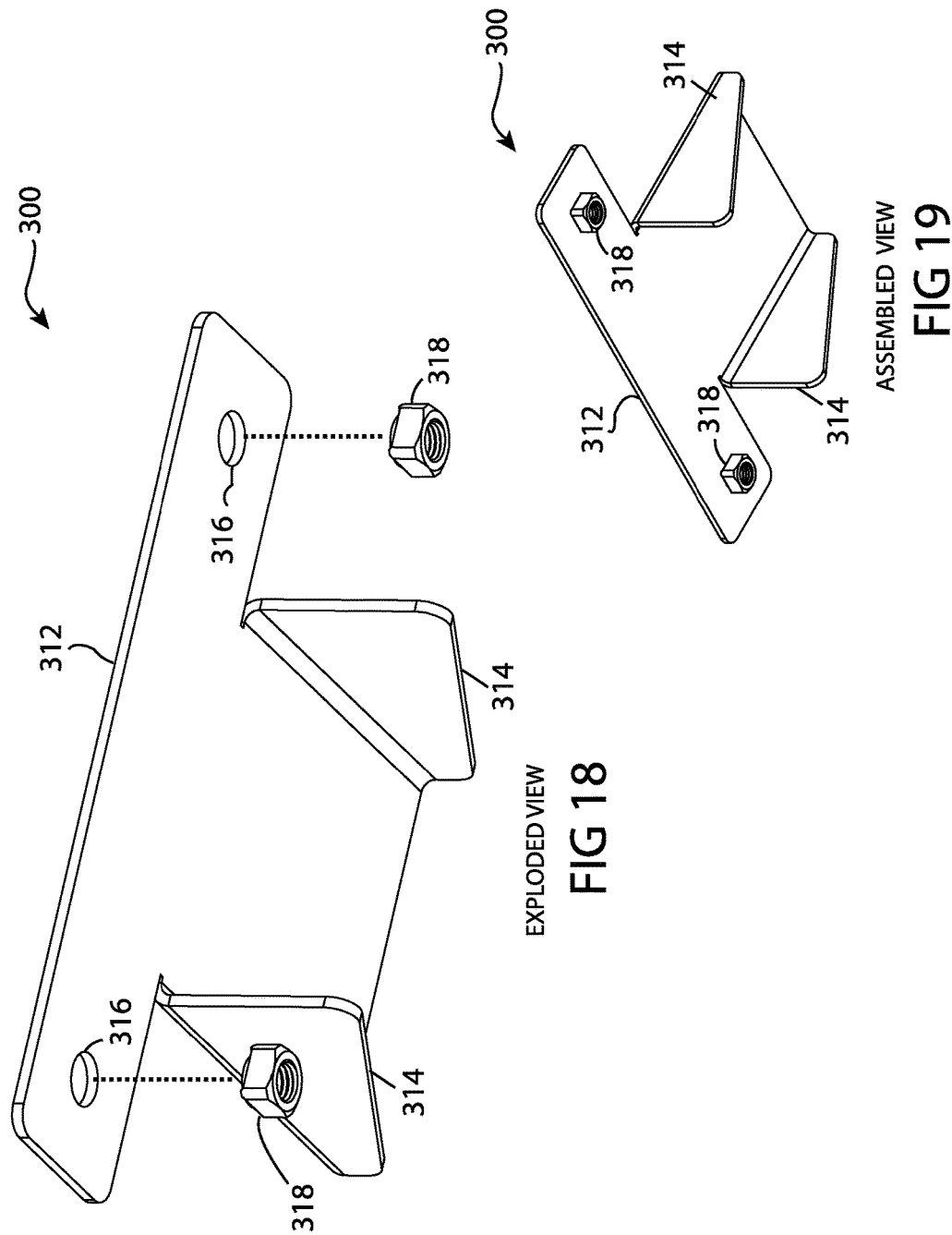

EXPLODED VIEW

INSTALLED TO BUILDING STEEL FRAME

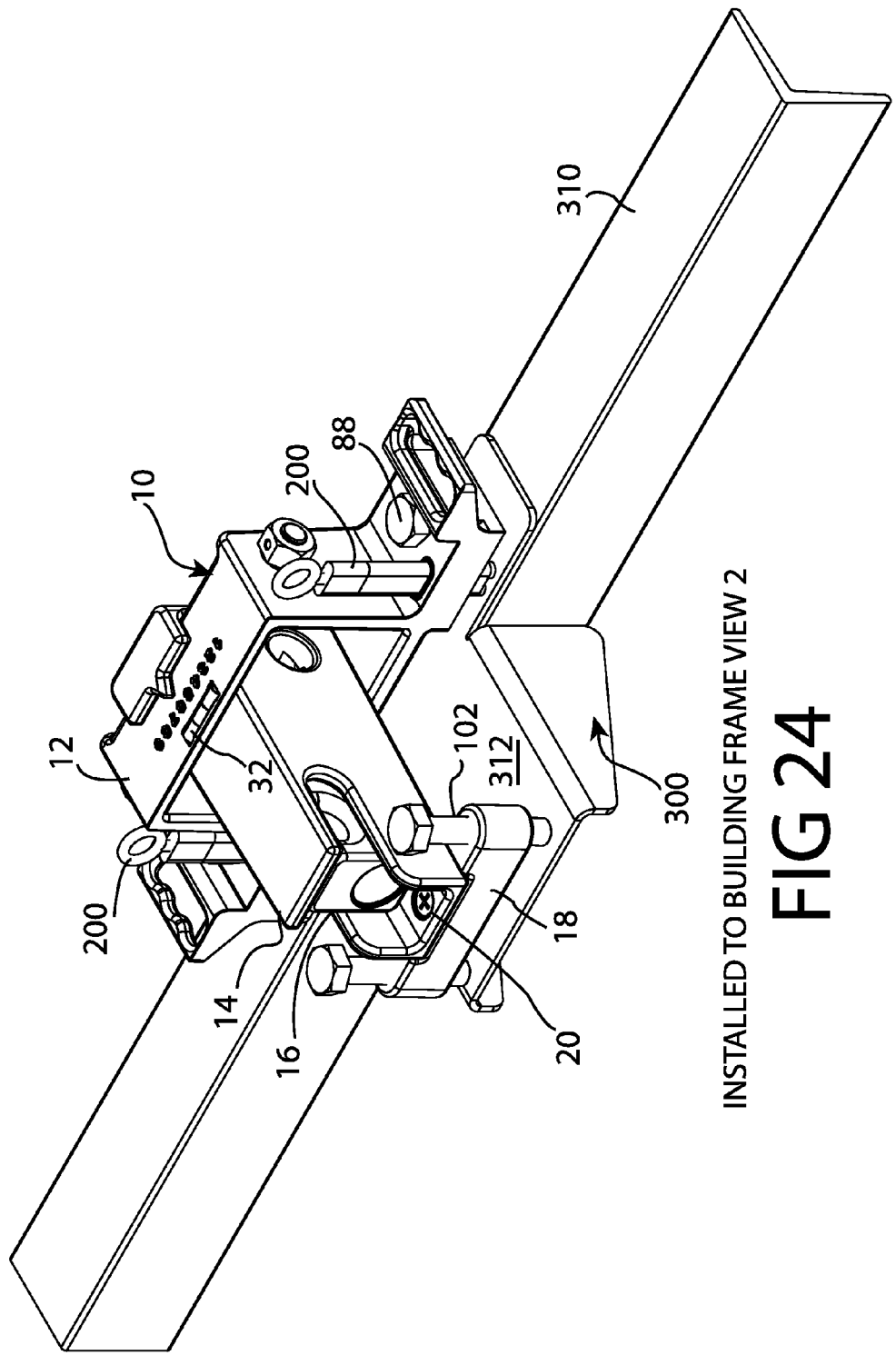

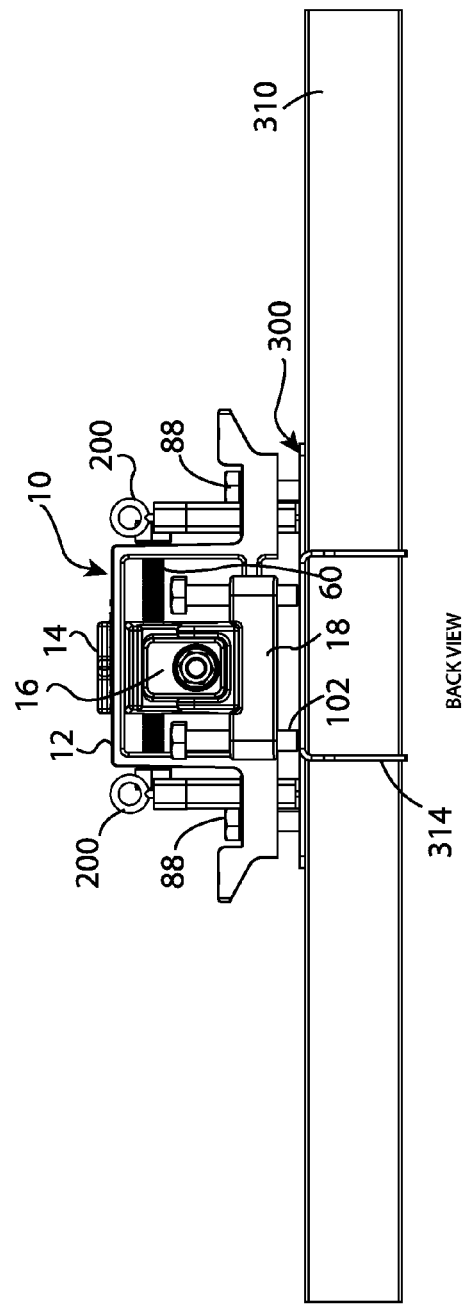
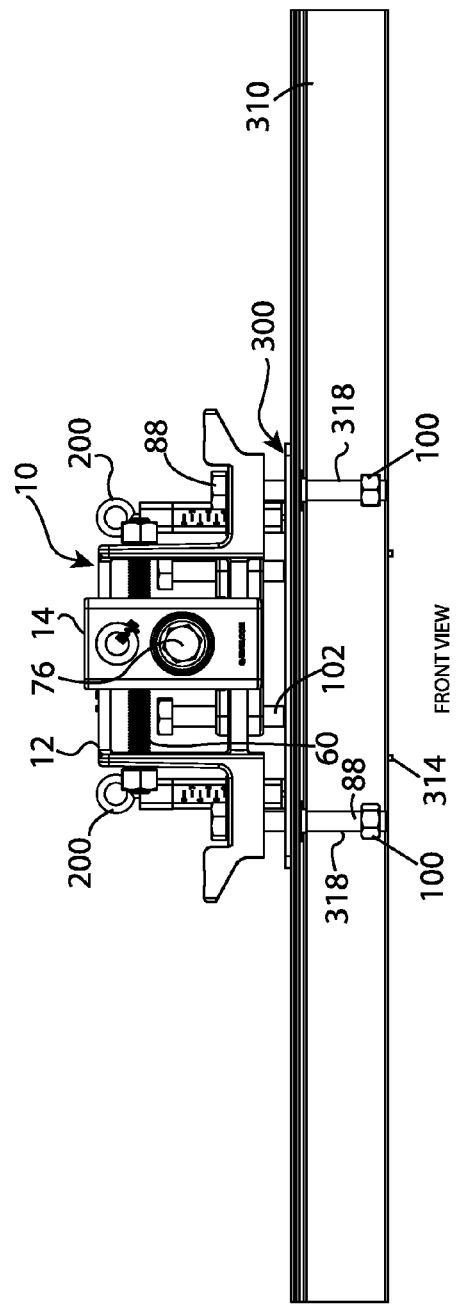

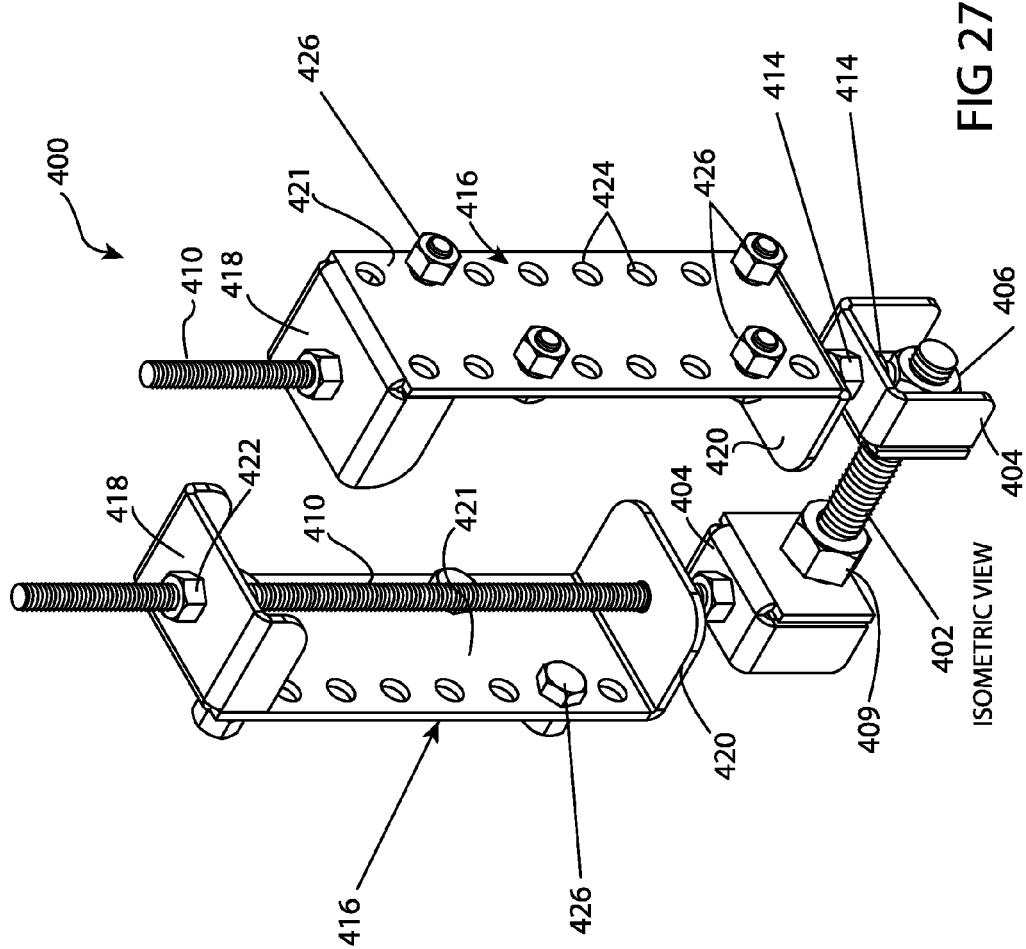

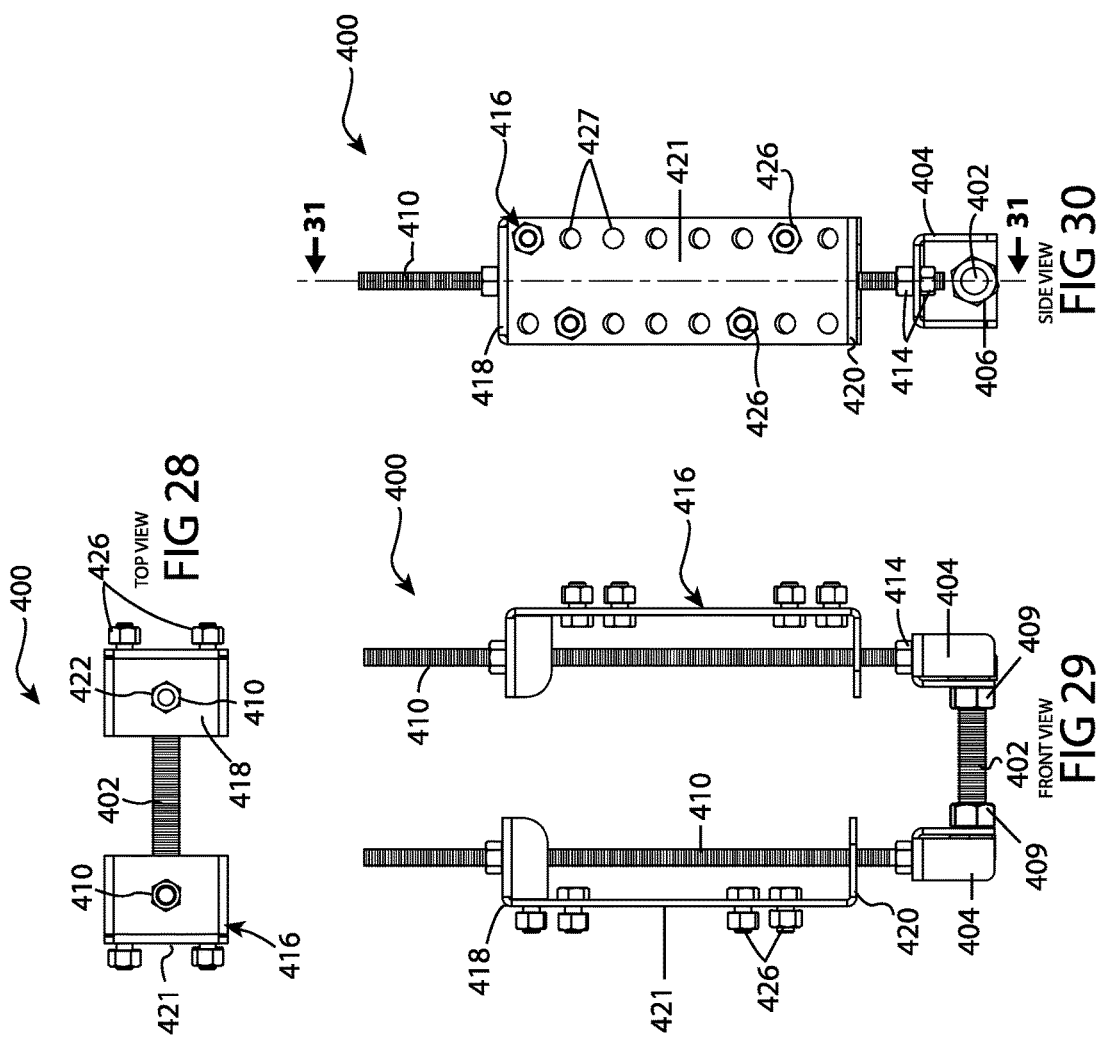

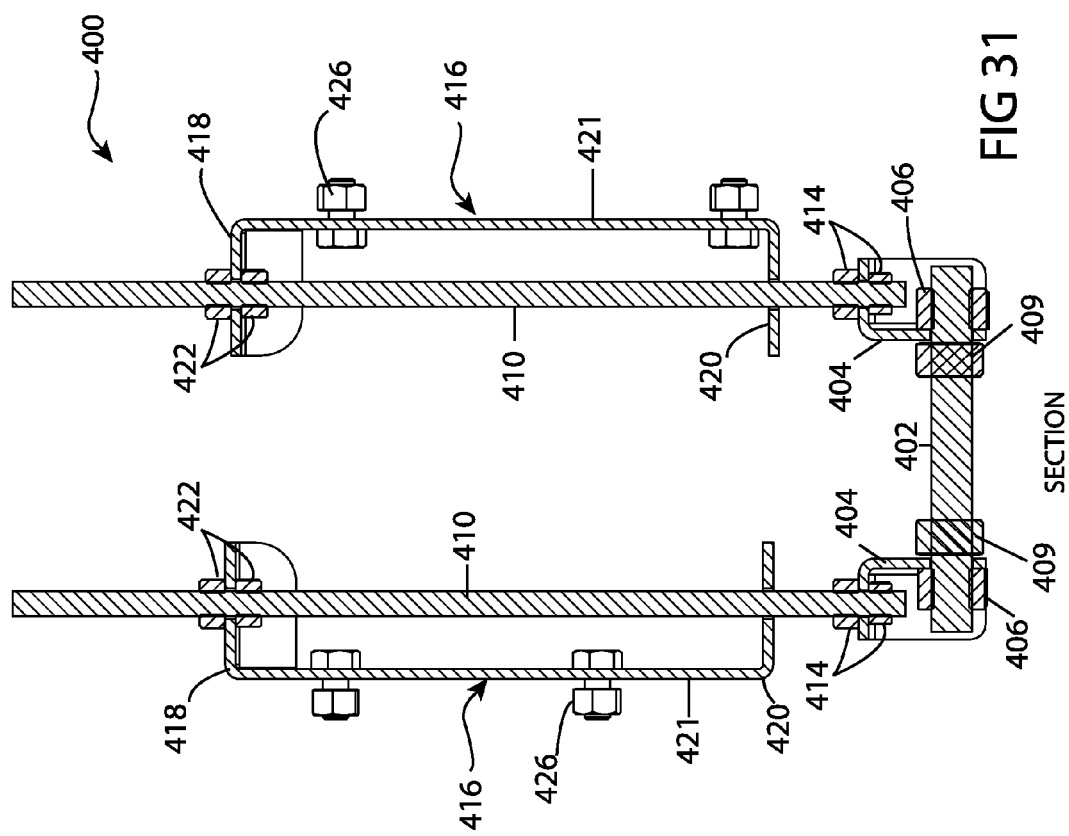

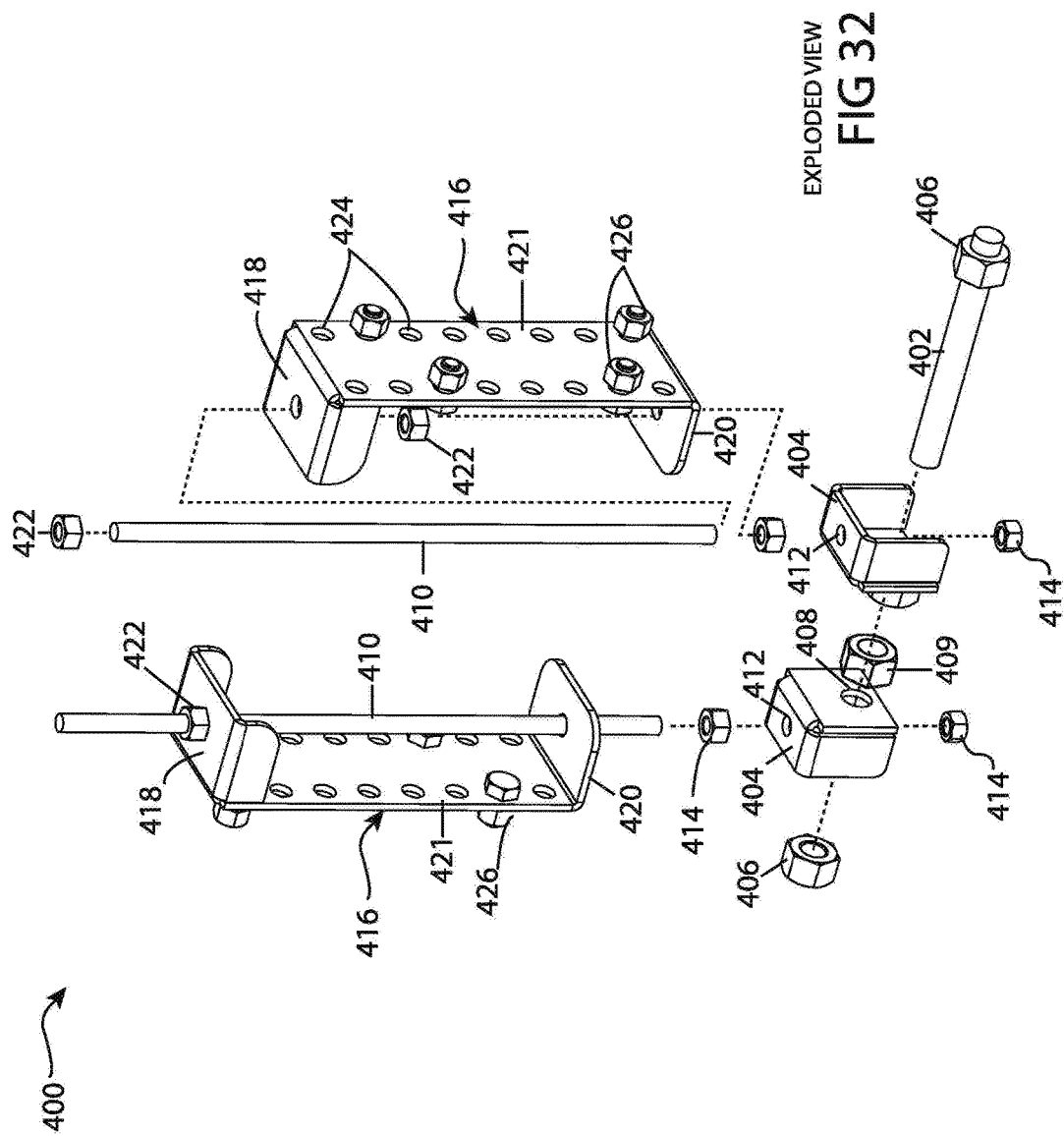

SIDE VIEW

FRONT VIEW

BOTTOM VIEW

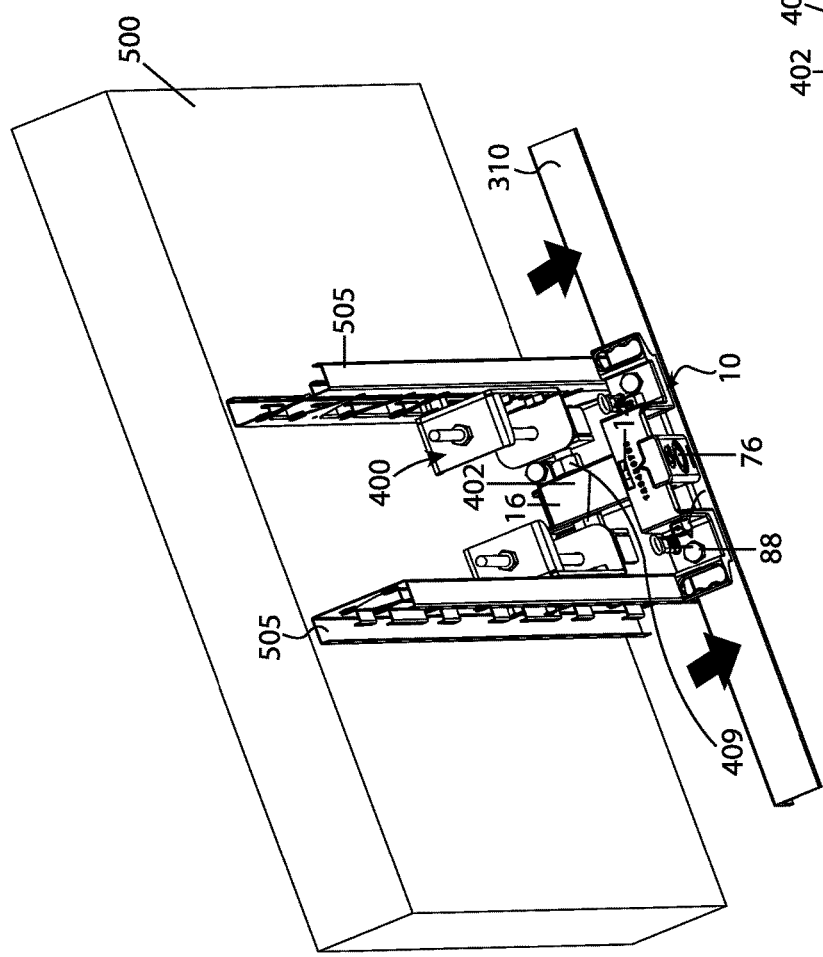
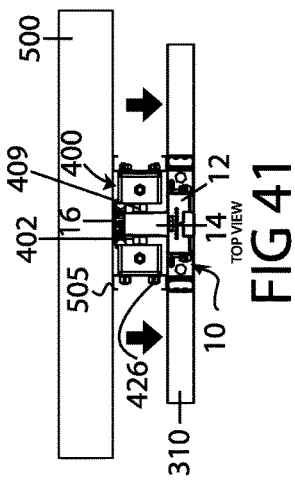
ISONAMETRIC VIEW
FIG 40
TOP VIEW
FIG 41

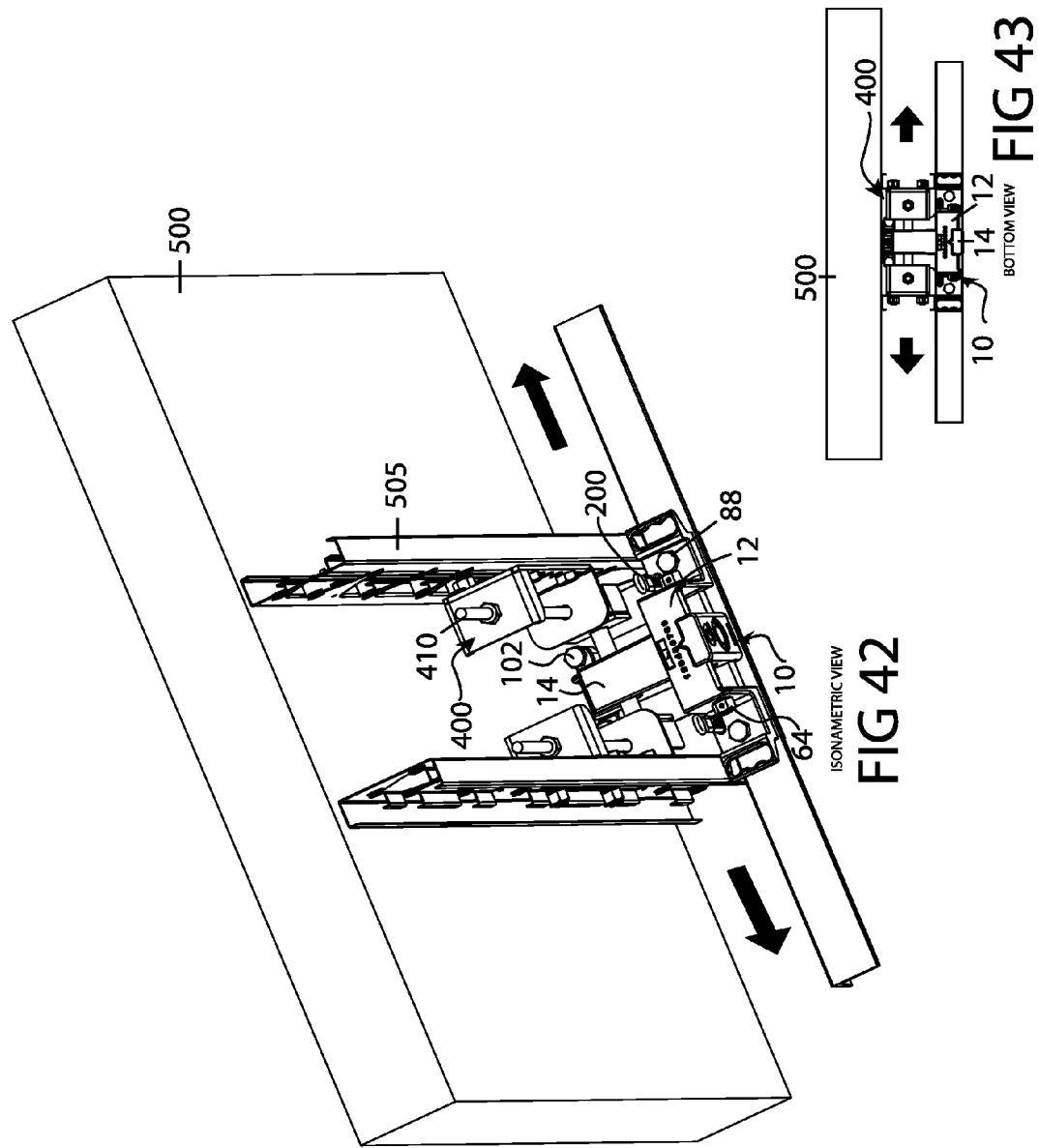

SIDE VIEW

ISOMETRIC FRONT VIEW

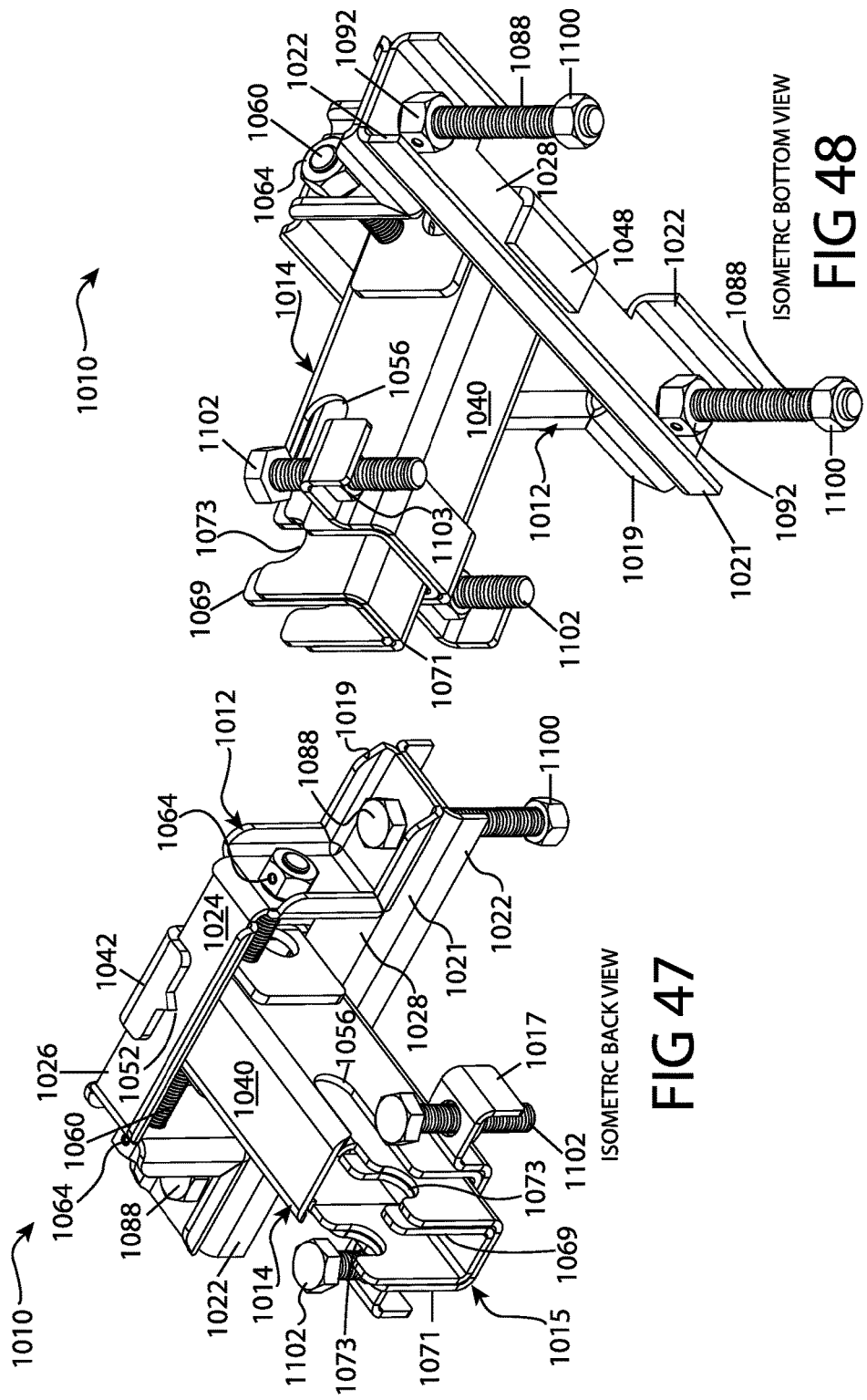

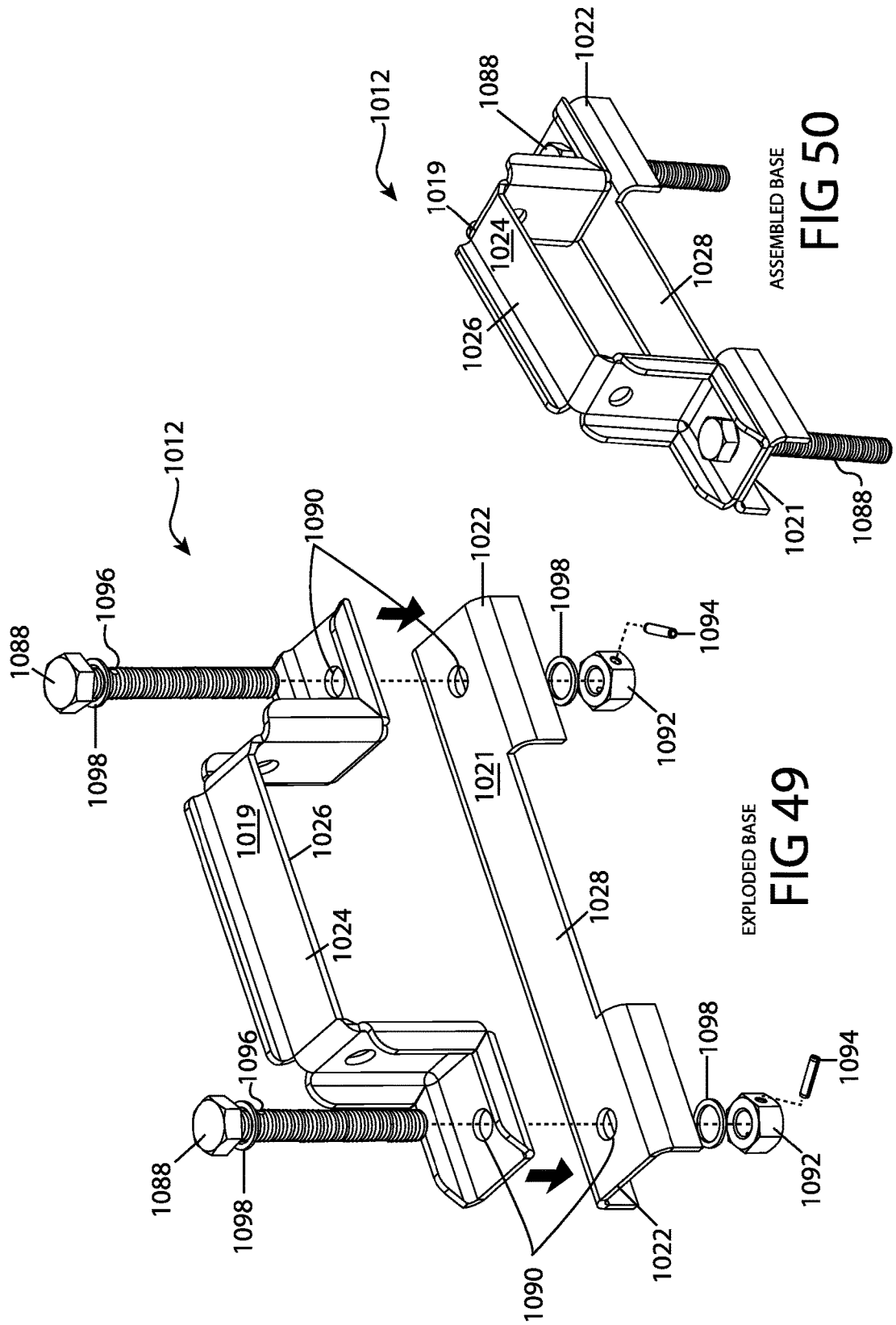

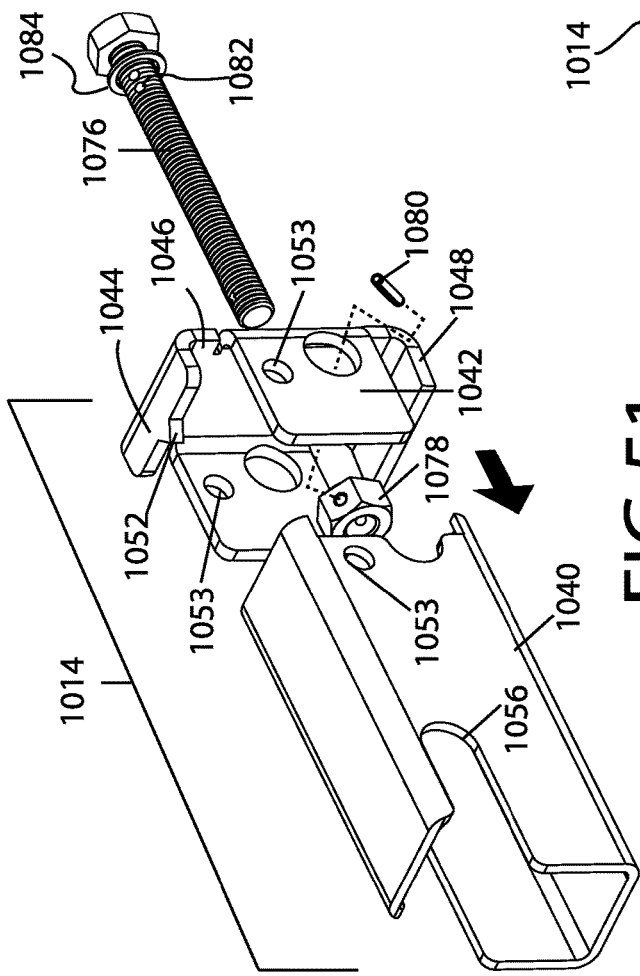
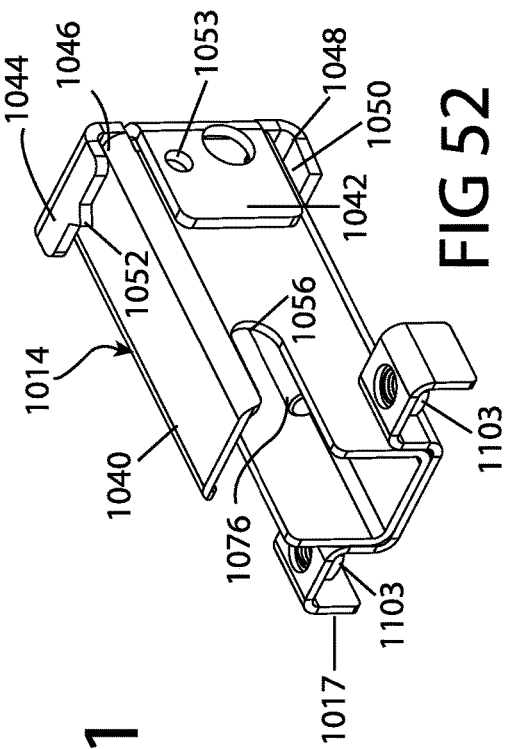
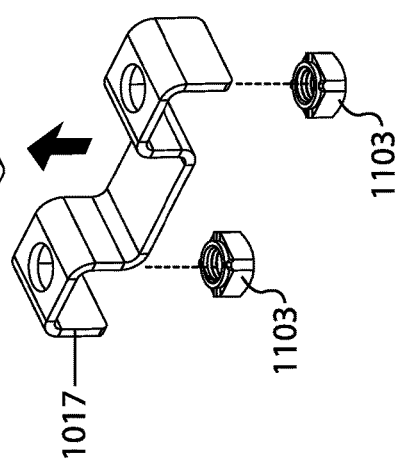

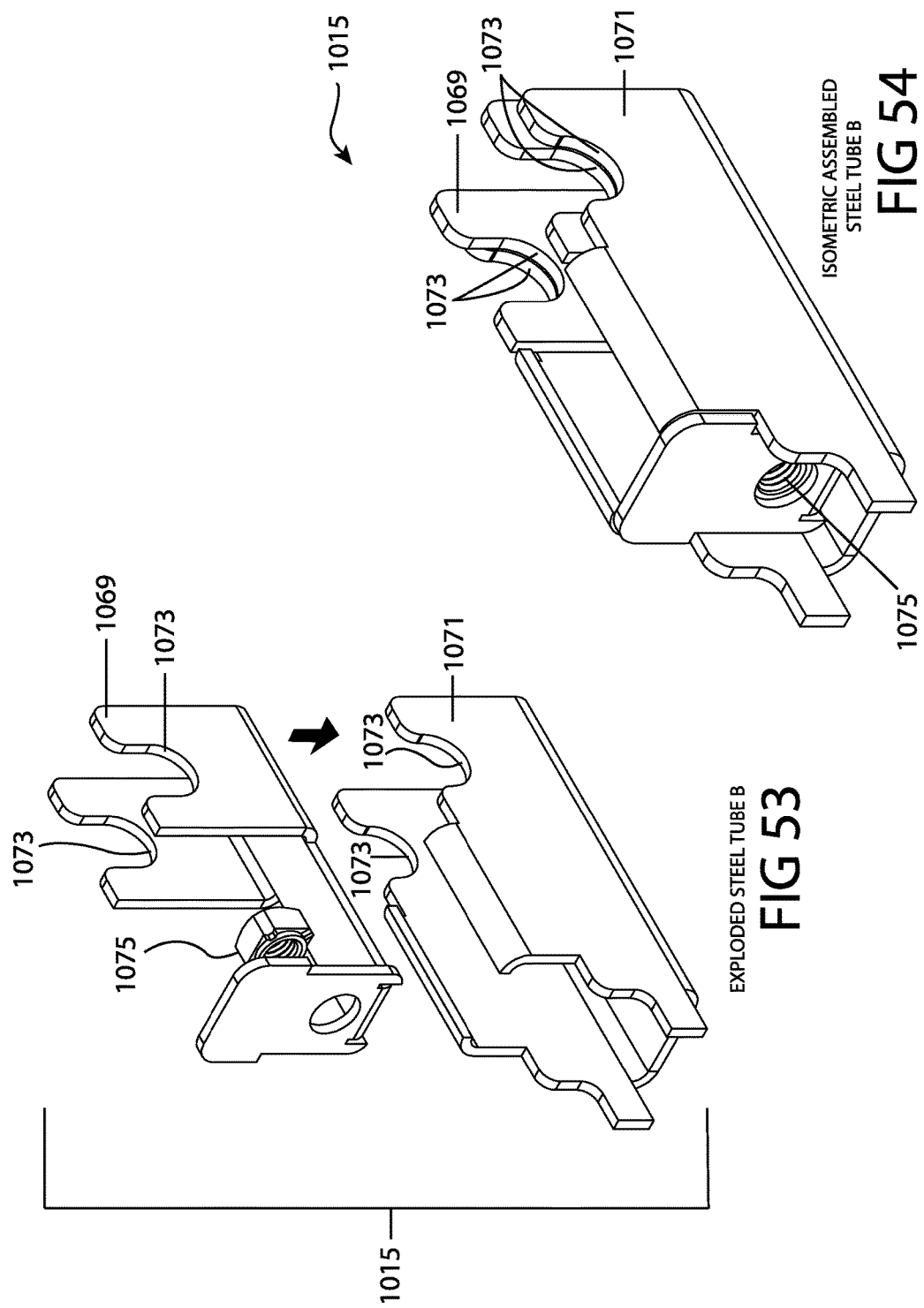

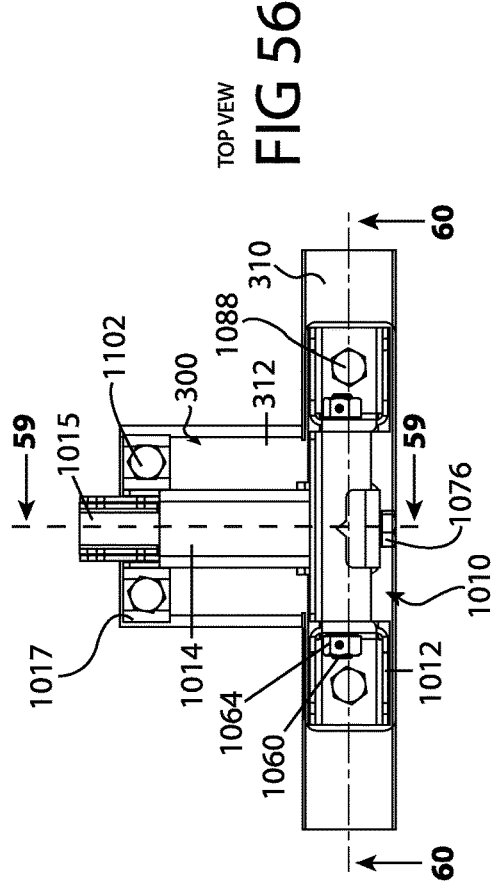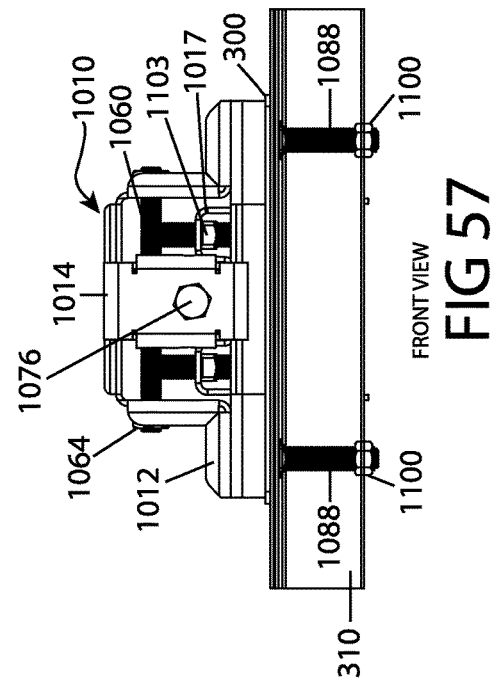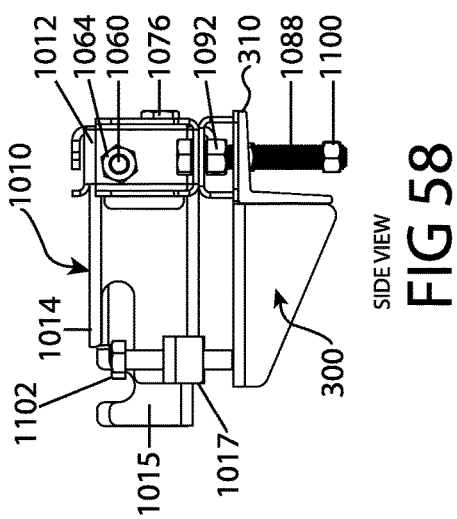

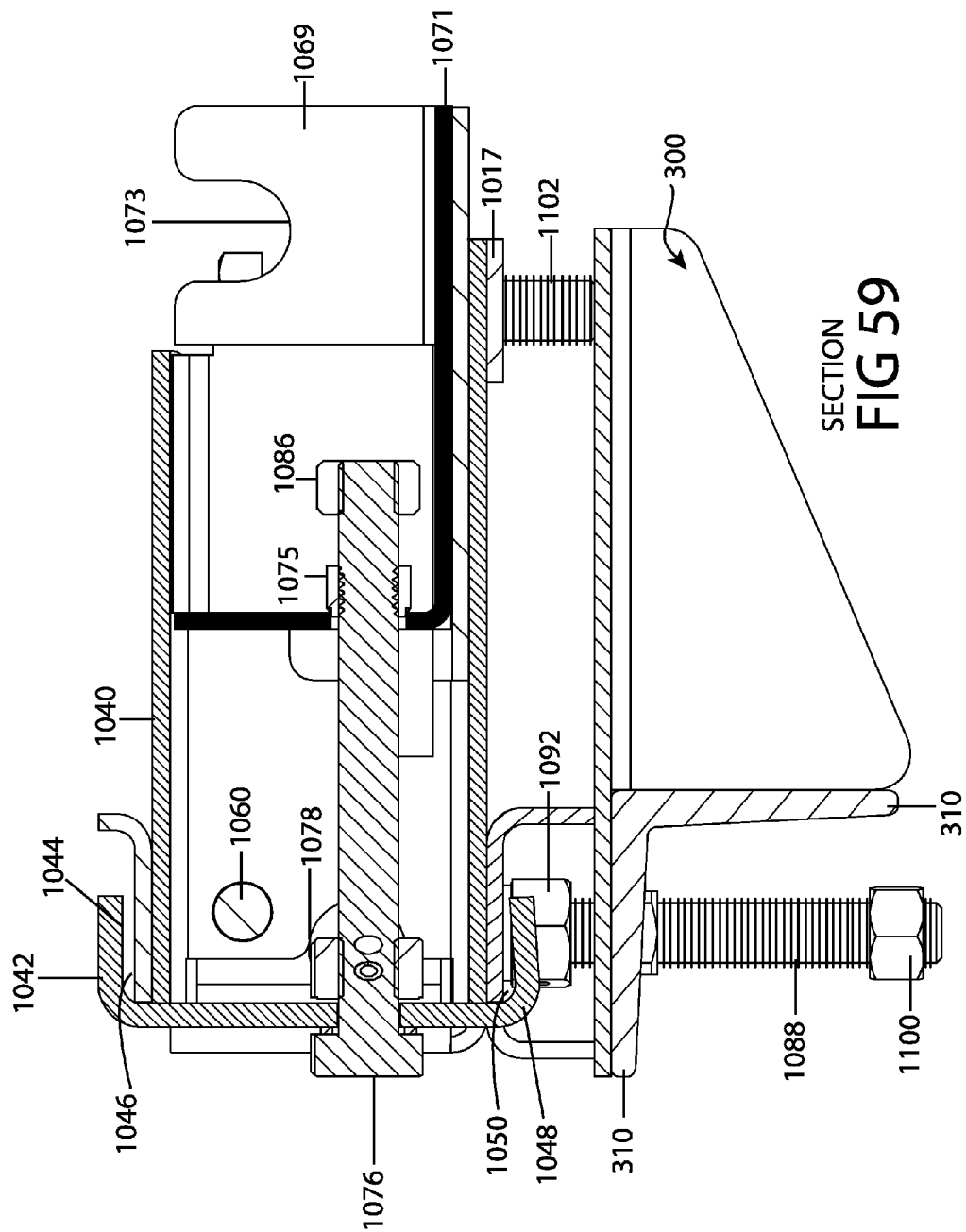

SECTION

ISOMETRIC BACK VIEW

ISOMETRIC VIEW

BACK VIEW

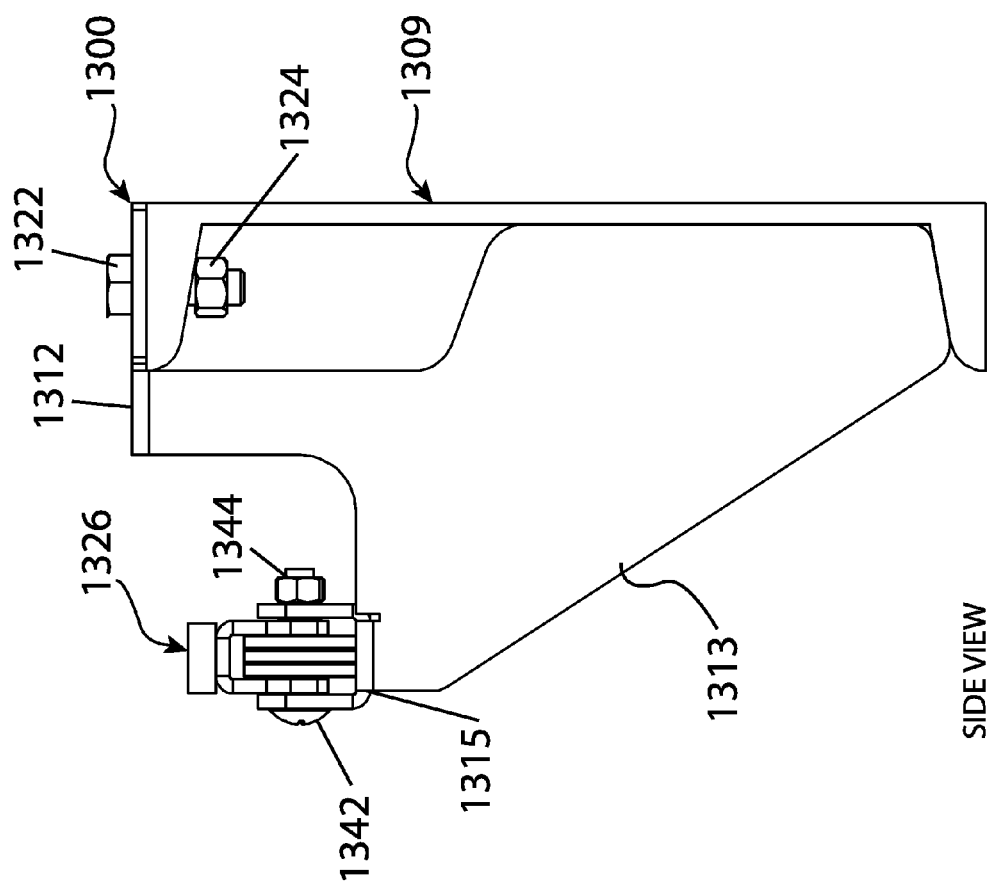

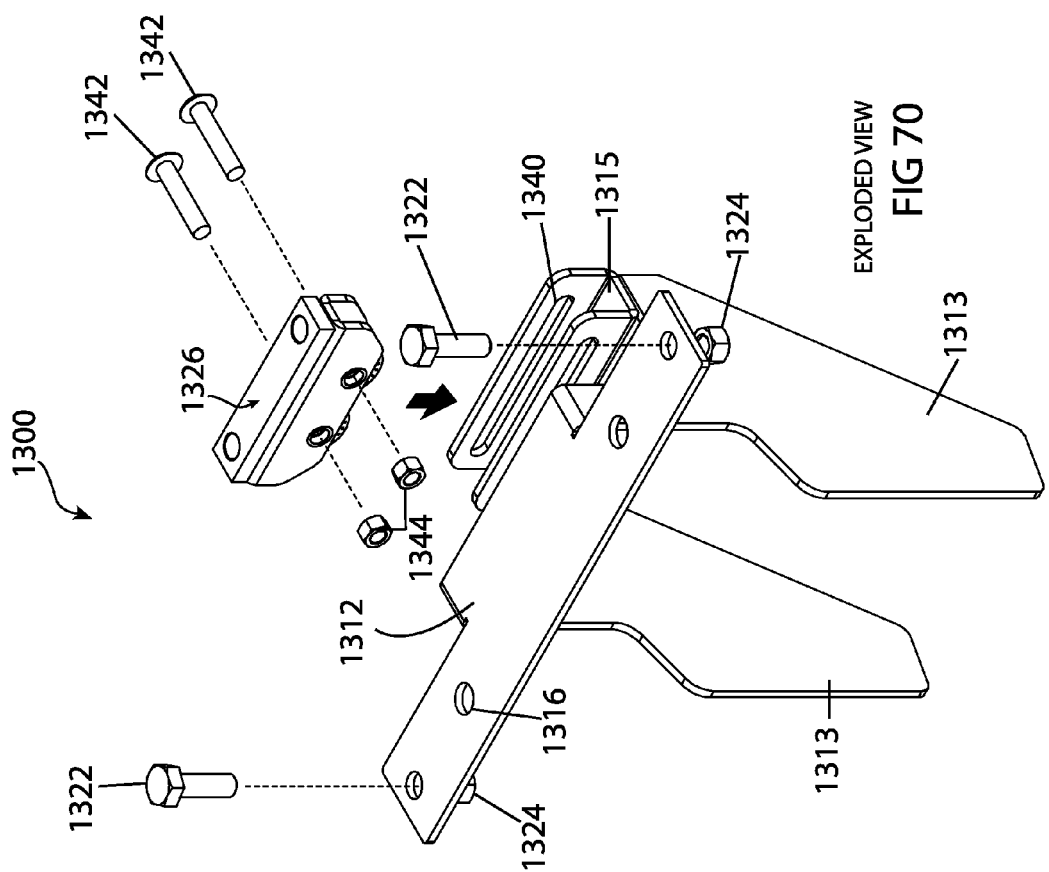

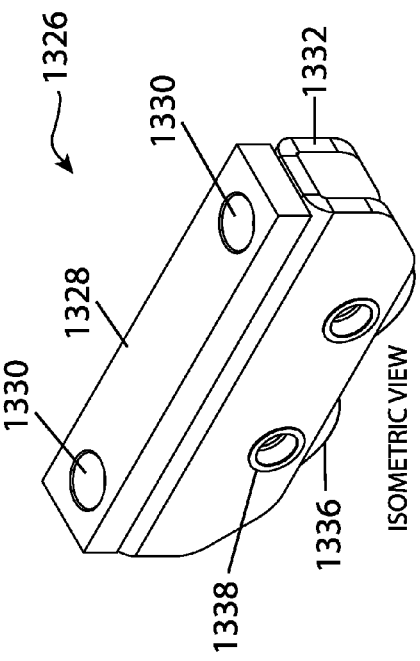
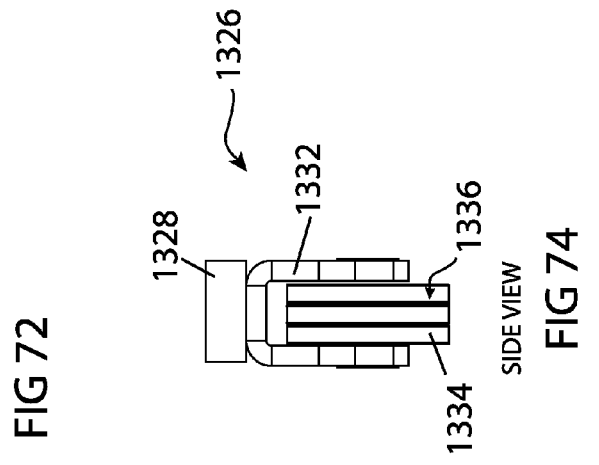
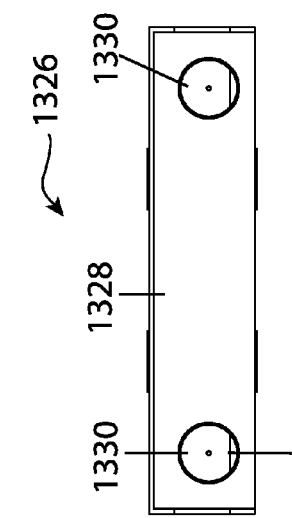
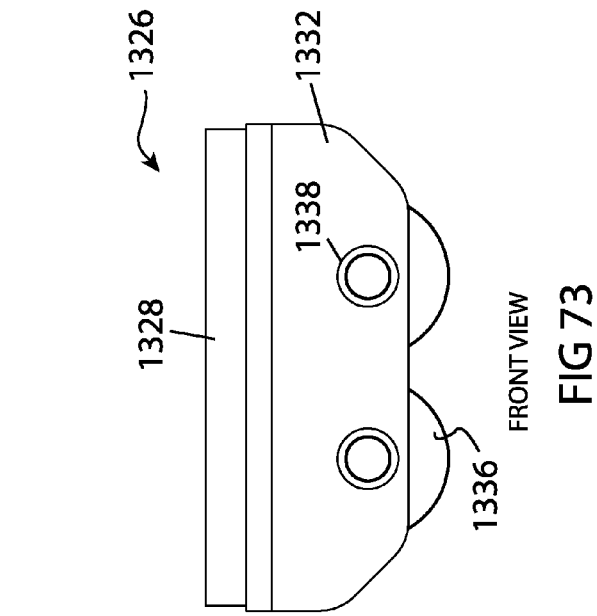

EXPLODED VIEW

ISOMETRIC VIEW

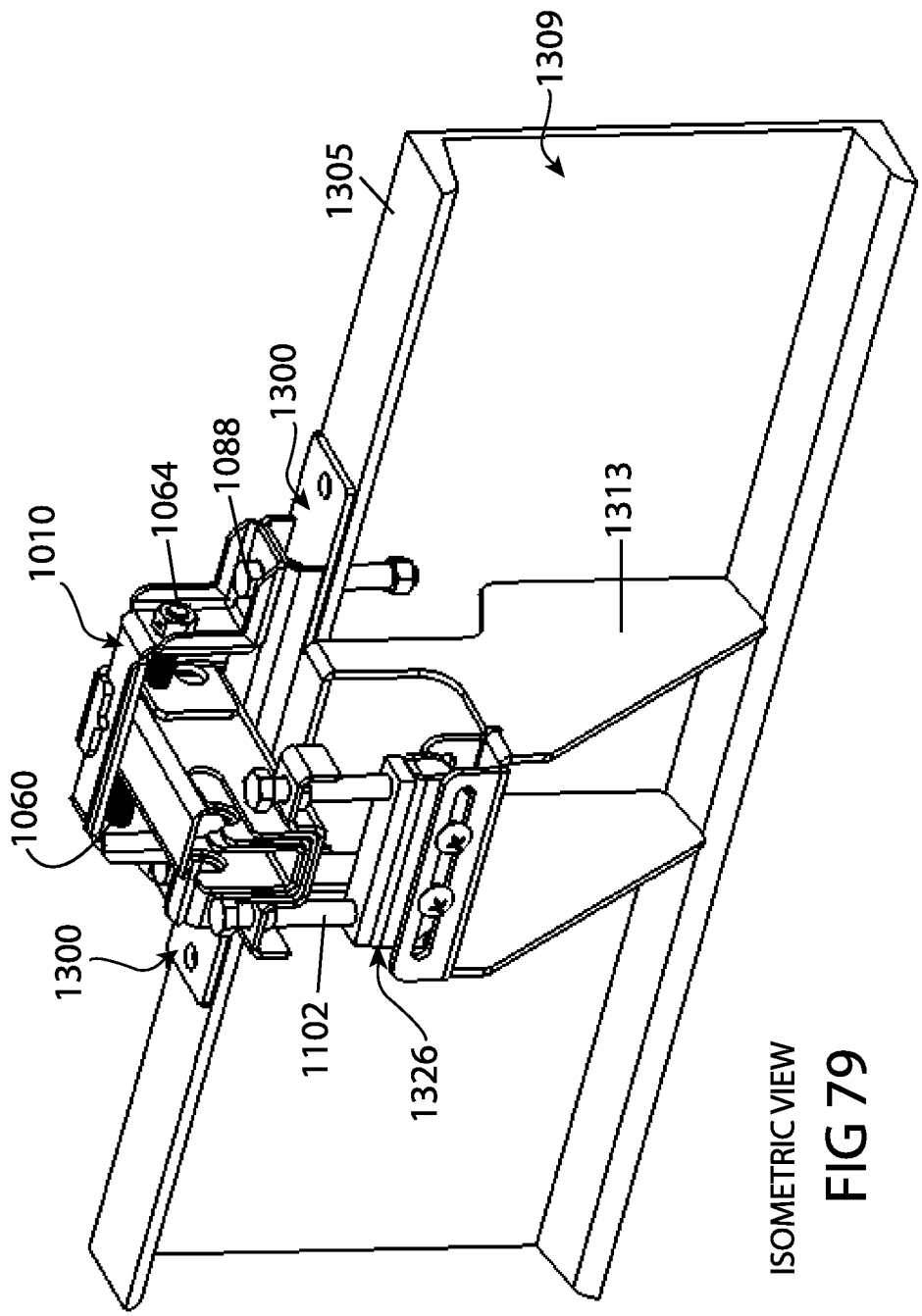

ADJUSTABLE RETAINING BRACKET

CROSS-REFERENCE TO RELATED APPLICATIONS

This application is based on and/or relates to U.S. Provisional Appl. No. 61/918,462 filed Dec. 19, 2013, which is hereby incorporated by reference in its entirety.

BACKGROUND OF THE INVENTION

1. Field of the Invention

The present invention generally relates to brackets for installation and/or retention of objects onto a structure, and more particularly relates to an adjustable retaining bracket and associated mounting bracket that may be configured to allow for installation, adjustment and/or retention of building components on a building structure.

2. Description of Related Art

Conventional mounting brackets and other construction fastening techniques do not provide for retention of the object that is to be fastened while adjustments are made to the object before final installation. Instead, the means for attaching the object for final installation are usually permanent and non-adjustable. Therefore, it is desirable to provide a bracket and mounting system that allows for retention of an object and efficient adjustment of the object prior to final installation of the object.

SUMMARY OF THE INVENTION

The present invention is designed to overcome the above noted limitations that are attendant upon the use of conventional brackets and, toward this end, it contemplates the provision of a novel adjustable retaining bracket and associated mounting brackets.

It is an object of the present invention to provide an adjustable retaining bracket that is configured for side-to-side movement relative to a structural member of a building structure, up-and-down elevational adjustment relative to the structural member and in-and-out movement of a portion of the building structural relative to the structural member.

It is still another object of the present invention to provide an adjustable retaining bracket that is configured for the movements and adjustments identified above while under load.

It is another object of the present invention to provide an adjustable retaining bracket that is configured to retain a portion of a building structure and allow for adjustment of the portion prior to final installation of the portion on the building structure.

It is yet another object of the present invention to provide an adjustable retaining bracket and mounting bracket that may be used in an adjustable system to construct a building structure.

The adjustable retaining bracket according to exemplary embodiments of the present invention may be configured to allow for movement and/or adjustment of an exemplary wall coupled to the adjustable retaining bracket in towards and away from the adjustable retaining bracket, including such movements and/or adjustments while the adjustable retaining bracket is under a load. The adjustable retaining bracket according to exemplary embodiments of the present invention may also be configured to allow for elevational movement and/or adjustment up and/or down relative to an exemplary structural member on which the adjustable retaining bracket is positioned. It is understood that such elevational movement and/or adjustment can be made while the adjustable retaining bracket is under a load. In addition, the adjustable retaining bracket according to exemplary embodiments of the present invention may also be configured to allow for right-left movement and/or adjustment.

It has now been found that the foregoing and related objects can be readily attained in an adjustable retaining bracket that can be secured to a surface and adjusted in a first elevational direction relative to the surface, in a second direction along an axis substantially perpendicular to the first elevational direction and towards or away from the surface and in a third direction substantially perpendicular to the second direction. The adjustable retaining bracket may include a base brace and at least one adjusting bolt configured to secure the adjustable retaining bracket to the surface and move the adjustable retaining bracket along the first elevational direction. The adjustable retaining bracket may also include an outer tube operationally engaged with the base brace and an adjusting rod configured to move the outer tube along the third direction. The adjustable retaining bracket may also include an inner tube in telescoping relationship with the outer tube and configured for movement relative to the outer tube along the second direction. The adjustable retaining bracket may also include a slot formed in the inner tube and configured to receive a mounting bracket that is configured for attachment to at least one building material of a building structure.

BRIEF DESCRIPTION OF THE SEVERAL VIEWS OF THE DRAWINGS

For a fuller understanding of the nature and object of the present invention, reference should be had to the following detailed description taken in connection with the accompanying drawings, in which:

FIG. 1A is a side view of the exemplary adjustable retaining bracket showing how the exemplary adjustable retaining bracket may be used to move an exemplary wall towards an exemplary structural member;

FIG. 1B is an isometric view of the exemplary adjustable retaining bracket showing how the exemplary adjustable retaining bracket may be used to move an exemplary wall towards an exemplary structural member;

FIG. 1C is a side view of the exemplary adjustable retaining bracket showing how the exemplary adjustable retaining bracket may be used to move an exemplary wall away from an exemplary structural member;

FIG. 1D is an isometric view of the exemplary adjustable retaining bracket showing how the exemplary adjustable retaining bracket may be used to move an exemplary wall away from an exemplary structural member;

FIG. 1E is a side view of the exemplary adjustable retaining bracket showing how the elevation of the exemplary adjustable retaining bracket may be adjusted away from an exemplary structural member;

FIG. 1F is an isometric view of the exemplary adjustable retaining bracket showing how the elevation of the exemplary adjustable retaining bracket may be adjusted away from an exemplary structural member;

FIG. 1G is a side view of the exemplary adjustable retaining bracket showing how the elevation of the exemplary adjustable retaining bracket may be adjusted towards an exemplary structural member;

FIG. 1H is an isometric view of the exemplary adjustable retaining bracket showing how the elevation of the exemplary adjustable retaining bracket may be adjusted towards from an exemplary structural member;

FIG. 1I is an isometric view of the exemplary adjustable retaining bracket showing how the exemplary adjustable retaining bracket may be adjusted side-to-side relative to an exemplary structural member;

FIG. 1J is an isometric view of the exemplary adjustable retaining bracket showing how the exemplary adjustable retaining bracket may be adjusted side-to-side relative to an exemplary structural member;

FIG. 2 is an isometric back view of the exemplary adjustable retaining bracket according to the present invention;

FIG. 3 is an isometric bottom view of the exemplary adjustable retaining bracket according to the present invention;

FIG. 4 is a top plan view of the exemplary adjustable retaining bracket according to the present invention;

FIG. 5 is a front view of the exemplary adjustable retaining bracket according to the present invention;

FIG. 6 is a side view of the exemplary adjustable retaining bracket according to the present invention;

FIG. 7 is a cross-sectional view taken along line 7-7 in FIG. 4 of the exemplary adjustable retaining bracket according to the present invention;

FIG. 9 is an exploded isometric front view of the exemplary adjustable retaining bracket according to the present invention;

FIG. 10 is an exploded isometric back view of the exemplary adjustable retaining bracket according to the present invention;

FIG. 11 is an exploded view of an exemplary adjusting guide that may be used with the exemplary adjustable retaining bracket according to the present invention;

FIG. 12 is an isometric view of the exemplary adjusting guide that may be used with the exemplary adjustable retaining bracket according to the present invention;

FIG. 13 is a front view of the exemplary adjusting guide that may be used with the exemplary adjustable retaining bracket according to the present invention;

FIG. 14 is a cross-sectional view taken along line 14-14 in FIG. 13 of the exemplary adjusting guide that may be used with the exemplary adjustable retaining bracket according to the present invention;

FIG. 15 a front view of an exemplary support structure that may be used with the exemplary adjustable retaining bracket according to the present invention;

FIG. 16 is a side view of the exemplary support structure that may be used with the exemplary adjustable retaining bracket according to the present invention;

FIG. 17 is a top plan view of the exemplary support structure that may be used with the exemplary adjustable retaining bracket according to the present invention;

FIG. 18 is an exploded isometric view of the exemplary support structure that may be used with the exemplary adjustable retaining bracket according to the present invention;

FIG. 19 is an isometric view of the exemplary support structure that may be used with the exemplary adjustable retaining bracket according to the present invention;

FIG. 24 is an isometric view of the exemplary adjustable retaining bracket according to the present invention installed on the exemplary support structure and structural member;

FIG. 25 is a back view of the exemplary adjustable retaining bracket according to the present invention installed on the exemplary support structure and structural member;

FIG. 26 is a front view of the exemplary adjustable retaining bracket according to the present invention installed on the exemplary support structure and structural member;

FIG. 27 is an isometric view of an exemplary mounting bracket that may be used with the exemplary adjustable retaining bracket according to the present invention;

FIG. 28 is a top plan view of the exemplary mounting bracket that may be used with the exemplary adjustable retaining bracket according to the present invention;

FIG. 29 is a front view of the exemplary mounting bracket that may be used with the exemplary adjustable retaining bracket according to the present invention;

FIG. 30 is a side view of the exemplary mounting bracket that may be used with the exemplary adjustable retaining bracket according to the present invention;

FIG. 31 is a cross-sectional view taken along line 31-31 in FIG. 30 of the exemplary mounting bracket that may be used with the exemplary adjustable retaining bracket according to the present invention;

FIG. 32 is an exploded view of the exemplary mounting bracket that may be used with the exemplary adjustable retaining bracket according to the present invention;

FIG. 40 is an isometric view showing installation of the exemplary mounting bracket and exemplary wall on the exemplary adjustable retaining bracket according to the present invention;

FIG. 41 is a top plan view showing installation of the exemplary mounting bracket and exemplary wall on the exemplary adjustable retaining bracket according to the present invention;

FIG. 42 is an isometric view showing adjustment of the exemplary mounting bracket and exemplary wall on the exemplary adjustable retaining bracket according to the present invention;

FIG. 43 is a top plan view showing adjustment of the exemplary mounting bracket and exemplary wall on the exemplary adjustable retaining bracket according to the present invention;

FIG. 47 is an isometric back view of the other exemplary adjustable retaining bracket according to the present invention;

FIG. 48 is an isometric bottom view of the other exemplary adjustable retaining bracket according to the present invention;

FIG. 49 is an isometric exploded view of an exemplary base brace that may be used with the other exemplary adjustable retaining bracket according to the present invention;

FIG. 50 is an isometric view of the exemplary base brace that may be used with the other exemplary adjustable retaining bracket according to the present invention;

FIG. 51 is an isometric exploded view of an exemplary outer tube and support frame that may be used with the other exemplary adjustable retaining bracket according to the present invention;

FIG. 52 is an isometric view of the exemplary outer tube and support frame that may be used with the other exemplary adjustable retaining bracket according to the present invention;

FIG. 53 is an isometric exploded view of an exemplary inner catch beam that may be used with the other exemplary adjustable retaining bracket according to the present invention;

FIG. 54 is an isometric view of the exemplary inner catch beam that may be used with the other exemplary adjustable retaining bracket according to the present invention;

FIG. 56 is a top plan view of the other exemplary adjustable retaining bracket according to the present invention installed on the exemplary support structure and structural member;

FIG. 57 is a front view of the other exemplary adjustable retaining bracket according to the present invention installed on the exemplary support structure and structural member;

FIG. 58 is a side view of the other exemplary adjustable retaining bracket according to the present invention installed on the exemplary support structure and structural member;

FIG. 59 is a cross-sectional view of the other exemplary adjustable retaining bracket according to the present invention installed on the exemplary support structure and structural member taken along line 59-59 in FIG. 56;

FIG. 69 is side view of the alternative exemplary support structure that may be used with the exemplary adjustable retaining bracket according to the present invention installed on the structural member;

FIG. 70 is an exploded isometric view of the alternative exemplary support structure that may be used with the exemplary adjustable retaining bracket according to the present invention;

FIG. 71 is a top plan view of an exemplary roller component of the alternative exemplary support structure that may be used with the exemplary adjustable retaining bracket according to the present invention;

FIG. 72 is an isometric view of the exemplary roller component of the alternative exemplary support structure that may be used with the exemplary adjustable retaining bracket according to the present invention;

FIG. 73 is a front view of the exemplary roller component of the alternative exemplary support structure that may be used with the exemplary adjustable retaining bracket according to the present invention;

FIG. 74 is a side view of the exemplary roller component of the alternative exemplary support structure that may be used with the exemplary adjustable retaining bracket according to the present invention;

FIG. 79 is an isometric view showing the other exemplary adjustable retaining bracket installed on the alternative exemplary support structure according to the present invention.

DETAILED DESCRIPTION OF THE INVENTION

Figure 1:
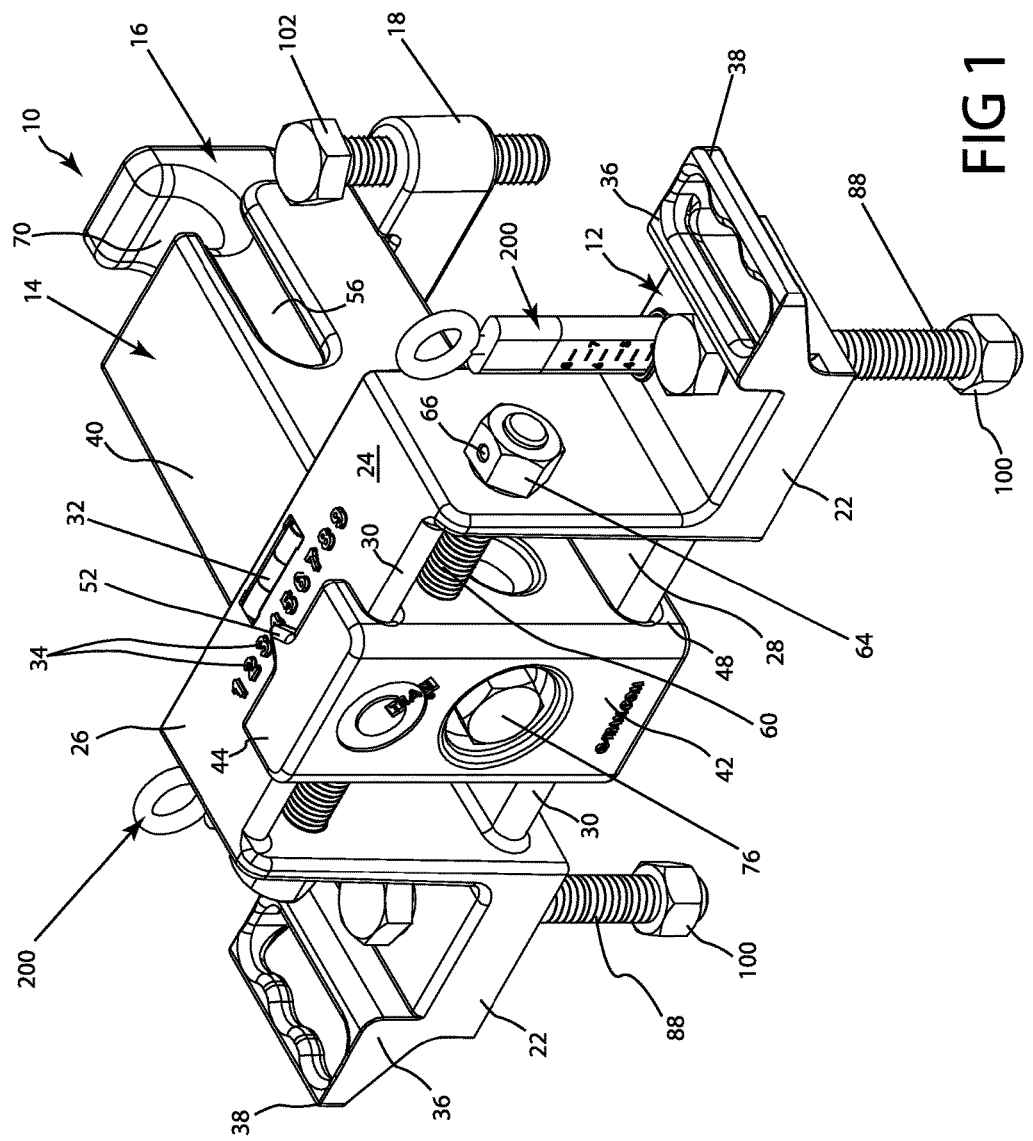
FIG. 1 is an isometric front view of an exemplary adjustable retaining bracket according to the present invention.
Figure 8:
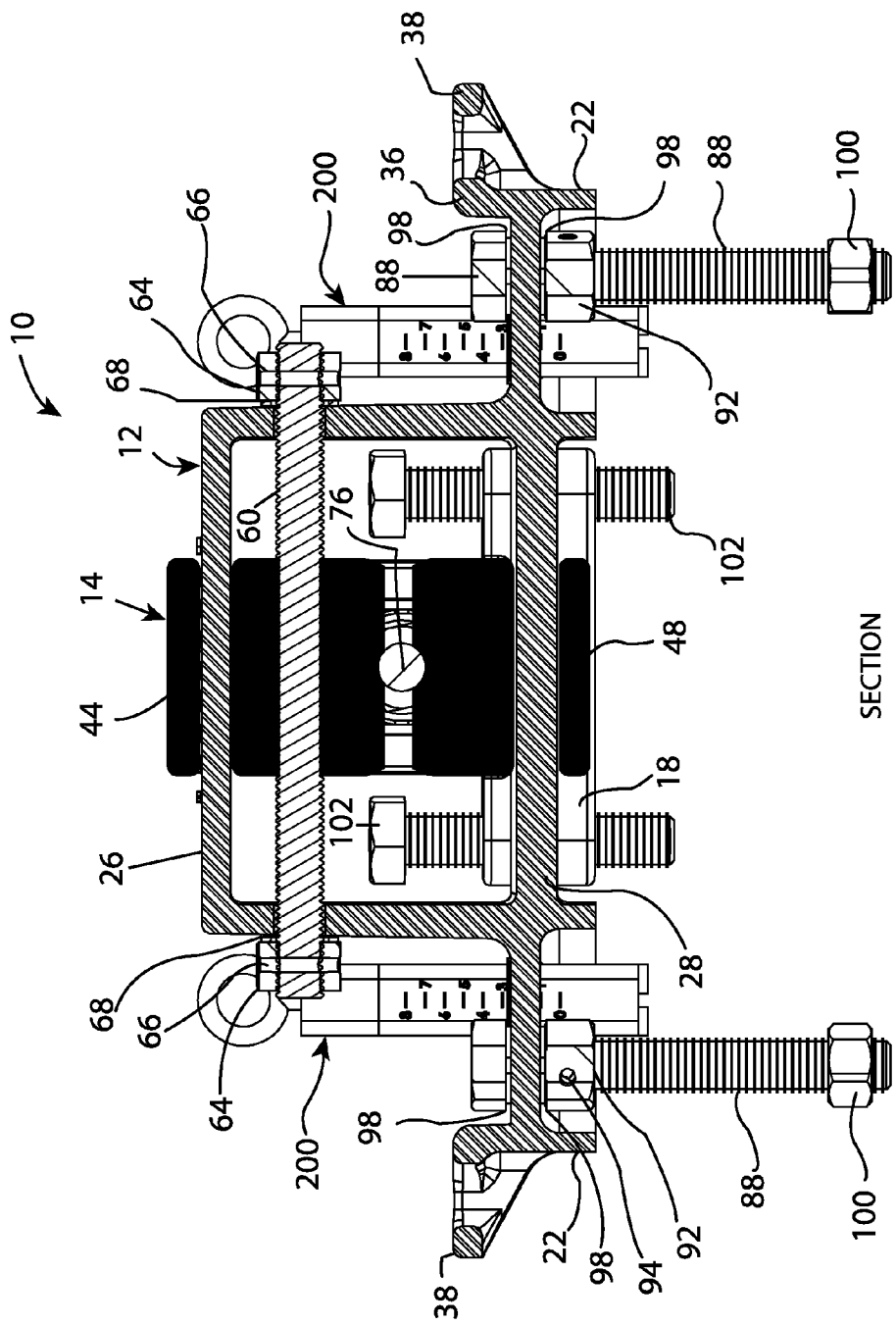
FIG. 8 is a cross-sectional view taken along line 8-8 in FIG. 4 of the exemplary adjustable retaining bracket according to the present invention.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Referring now to FIGS. 1, 1A, 1B, 1C, 1D, 1E, 1F, 1G, 1H, 1I and 1J, movement and/or adjustments that may be made to an exemplary embodiment of an adjustable retaining bracket, generally indicated by reference numeral 10, according to the present invention will now be discussed. As shown in FIGS. 1A, 1B, 1C and 1D, the adjustable retaining bracket 10 is configured to allow for movement and/or adjustment of an exemplary wall 500 coupled to the adjustable retaining bracket 10 in towards and away from the adjustable retaining bracket 10, including such movements and/or adjustments while the adjustable retaining bracket 10 is under a load, such as the load from the exemplary wall 500. As shown for example in FIGS. 1A and 1B, clockwise rotation of a longitudinally extending bolt 76 causes telescopic retraction of an inner tube 16 relative to an outer tube 14, which results in pulling of the exemplary wall 500 in towards the adjustable retaining bracket 10. As shown for example in FIGS. 1C and 1D, counter-clockwise rotation of the longitudinally extending bolt 76 causes telescopic extension of the inner tube 16 relative to the outer tube 14, which results in pushing the exemplary wall 500 away from the adjustable retaining bracket 10. Furthermore, as shown in FIGS. 1E, 1F, 1G and 1H, the adjustable retaining bracket 10 is configured to allow for elevational movement and/or adjustment up and/or down relative to an exemplary structural member 1309 on which the adjustable retaining bracket 10 is positioned. It is understood that such elevational movement and/or adjustment can be made while the adjustable retaining bracket is under a load. For example, as shown in FIGS. 1E and 1F, the elevation and/or level of the adjustable retaining bracket 10 can be moved and/or adjusted up away from the structural member 1309. As shown in FIG. 1F, clockwise rotation of the level supporting bolts 102 and counter-clockwise rotation of the elevation adjusting bolts 88 causes the adjustable retaining bracket 10 to move up away from the structural member 1309. As shown in FIGS. 1G and 1H, the elevation and/or level of the adjustable retaining bracket 10 can be moved and/or adjusted down towards the structural member 1309. FIG. 1H demonstrates that counter-clockwise rotation of the level supporting bolts 102 and clockwise rotation of the elevation adjusting bolts 88 causes the adjustable retaining bracket 10 to move down towards the structural member 1309. It is understood that any combination of rotation of the level supporting bolts 102 and the elevation adjusting bolts 88 can be used to adjust the elevation and/or level of the adjustable retaining bracket 10, and the present invention is not limited to the combination of movements shown in the figures.

In addition, as shown in FIGS. 1I and 1J, the adjustable retaining bracket 10 is configured to allow for right-left movement and/or adjustment. For example, clockwise or counter-clockwise rotation of locking nut 64 attached to a transverse adjusting rod 60 causes left or right movement of the outer tube 14 relative to a base brace 12 of the adjustable retaining bracket 10. Depending upon the configuration of the adjustable retaining bracket 10, and the thread direction of the transverse adjusting rod, clockwise rotation of the locking nut 64 will either cause the outer tube 14 to move left or right along the base brace 12, and counter-clock rotation of the locking nut 64 will cause the outer tube 14 to move sideways in the opposite direction along the base brace 12. It is understood that the left-right movement of the outer tube 14 is transferred to the level supporting bolts 102, which are coupled to a rolling support 1326. Such transfer of the left-right movement to the rolling support 1326 causes the rolling support 1326 to move left-right relative to a support structure 1300 containing the rolling support. It is further understood that such left-right movement of the outer tube 14 relative to the base brace 12 and such left-right movement of the rolling support 1326 relative to the support structure 1300 can be made while the adjustable retaining bracket 10 is under a load. It is also understood that the other exemplary embodiment of the adjustable retaining bracket, referred to by reference numeral 1010, and discussed with respect to FIGS. 46-64 is configured to movement and/or adjustment in the same manner as the adjustable retaining bracket 10.

Referring now to FIGS. 1-10, therein illustrated is an exemplary embodiment of an adjustable retaining bracket, generally indicated by reference numeral 10, according to the present invention. The adjustable retaining bracket 10 may include a base brace 12, an outer tube 14 operatively engaged with the base brace, and an inner tube 16 configured for positioning within the outer tube 14. The adjustable retaining bracket 10 may also include a support column 18 configured for attachment to the outer tube 14 through the use of a fastener 20. The fastener 20 may be any suitable screw, bolt or pin. The base brace 12 of the adjustable retaining bracket 10 may include a pair of feet 22 positioned on either side of a housing 24 that includes an upper support band 26 and a lower support band 28. The housing 24 of the base brace 12 may also include holes 29 formed through the sides of the housing 24. At least one end of each of the upper support band 26 and the lower support band 28 may have a substantially rounded edge 30. A bubble level 32 and one or more indicia 34 may also be placed on the upper support band 26 of the base brace 12. The base brace 12 may also include a shoulder extension 36 extending from each of the feet 22, and the shoulder extensions 36 may each include a hand-hold 38 configured to facilitate movement and positioning of the adjustable retaining bracket 10. The outer tube 14 of the adjustable retaining bracket 10 may include a hollow body portion 40 and an end portion 42. The end portion 42 may include a first flange 44 extending towards the hollow body portion 40 to form a first groove 46 between the first flange 44 and the hollow body portion 40, and a second flange 48 extending towards the hollow body portion 40 to form a second groove 50 between the second flange 46 and the hollow body portion 40. The first flange 44 may include a triangular extension 52 extending from the first flange 44 in a direction towards the indicia 34 on the base brace 12. The outer tube 14 may also include a threaded bore 54 formed therein and passing through from one side of the outer tube 14 to the other. The outer tube 14 may also include a recess formation 56 positioned in the hollow body portion 40 at the opposite end of the hollow body portion 40 as the end portion 42.

Still referring to FIGS. 1-10, the outer tube 14 may be adjustably secured to the base brace 12 by a transverse adjusting rod 60 so that the first flange 44 and first groove 46 of the outer tube 14 are positioned for slidable engagement with the upper support band 26 of the base brace 12, and the second flange 48 and second groove 50 are positioned for slidable engagement with the lower support band 28 of the base brace 12. The transverse adjusting rod 60 may be inserted through one of the holes 29 of the housing 24 of the base brace 12 and then threadenly engage with the threaded bore 54 of the outer tube 14 until the transverse adjusting rod 60 extends through the other hole 29 of the housing 24. The transverse adjusting rod 60 includes a bore 62 at each end of the transverse adjusting rod 60, and the transverse adjusting rod 60 may be adjustably secured to the base brace 12 and outer tube 14 by the locking nuts 64 attached to both ends of the transverse adjusting rod 60. The locking nuts 64 may be any suitable fastening device that will prevent, resist and/or reduce removal of the locking nuts 64 during rotation of the transverse adjusting rod 60. For example, the locking nuts 64 may include a hole configured to receive a pin 66 that when aligned with the bore 62 in the ends of the transverse adjusting rod 60 prevent rotation of the locking nuts 64 relative to the transverse adjusting rod 60 so that the locking nuts 64 will not come loose from the transverse adjusting rod 60. The pin 66 may be a spring pin, cotter pin, clevis pin, taper pin or any other suitable retaining pin. The locking nut 64 may also be a slotted or castle nut (not shown). A washer 68 may also be positioned between each of the locking nuts 64 and the housing 24 of the base brace 12 in order to facilitate rotation of the transverse adjusting rod 60 relative to the housing 24. It is also understood that a flange (not shown) may be included on the locking nuts 64, which may be used instead of the washer 68.

Still referring to FIGS. 1-10, the hollow body portion 40 of the outer tube 14 is configured to receive the inner tube 16, which includes an arching slot 70 and an inner cavity 72 formed therein. At one end of the inner cavity 72 of the inner tube 16 is a threaded orifice 74 that extends from the inner cavity 72 to an outside surface of the inner tube 16. The inner tube 16 may be adjustably secured to the outer tube 14 by a longitudinally extending bolt 76. The longitudinally extending bolt 76 is secured to the outer tube 14 by inserting the longitudinally extending bolt 76 through an opening in the end portion 42 of the outer tube 14, and a locking nut 78 is threaded onto the longitudinally extending bolt 76 until the locking nut 78 reaches the end portion 42 of the outer tube 14. The locking nut 78 may be any suitable fastening device that will prevent, resist and/or reduce removal of the locking nut 78 during rotation of the longitudinally extending bolt 76. For example, the locking nut 78 may include a hole configured to receive a pin 80 that when aligned with a bore 82 formed in the longitudinally extending bolt 76 prevent rotation of the locking nut 78 relative to the longitudinally extending bolt 76 so that the locking nut 78 will not come loose from the longitudinally extending bolt 76. The pin 80 may be a spring pin, cotter pin, clevis pin, taper pin or any other suitable retaining pin. The locking nut 78 may also be a slotted or castle nut (not shown). A washer 84 may be placed between the head of the longitudinally extending bolt 76 and the outer tube 14, and/or between (not shown) the locking nut 78 and the outer tube 14 order to facilitate rotation of the longitudinally extending bolt 76 relative to the outer tube 14. Once the longitudinally extending bolt 76 has been secured to the outer tube 14 the inner tube 16 can be inserted into the hollow body portion 40 of the outer tube 14, and the longitudinally extending bolt 76 rotated so that the longitudinally extending bolt 76 threadenly engages with the threaded orifice 74 of the inner tube 16. This threaded engagement between the longitudinally extending bolt 76 and threaded orifice of the inner tube 16 allows for movement of the inner tube 16 along the hollow body portion 40 of the outer tube 14, as discussed further below. A stop nut 86, for example a nylon insert locking nut, may be placed on the end of the longitudinally extending bolt 76 within the inner cavity 72 of the inner tube 16.

Still referring to FIGS. 1-10, the adjustable retaining bracket 10 may also include a pair of elevation adjusting bolts 88 that are configured to secure the adjustable retaining bracket 10 to a surface (not shown) and adjust the elevation of the adjustable retaining bracket 10 relative to the surface, as discussed further below. Each the pair of elevation adjusting bolts 88 may be inserted through a hole 90 in each foot 22 of the base brace 12 positioned on opposing sides of the housing 24, and a locking nut 92 may be threaded onto each of the pair of elevation adjusting bolts 88. The locking nut 92 may be any suitable fastening device that will prevent, resist and/or reduce removal or loosening of the locking nut 92 during rotation of the elevation adjusting bolt 88. For example, the locking nut 92 may include a hole configured to receive a pin 94 that when aligned with a bore 96 formed in the elevation adjusting bolt 88 to prevent rotation of the locking nut 92 relative to the elevation adjusting bolt 88 so that the locking nut 92 will not come loose from the elevation adjusting bolt 88. The pin 94 may be a spring pin, cotter pin, clevis pin, taper pin or any other suitable retaining pin. The locking nut 92 may also be a slotted or castle nut (not shown). A washer 98 may be placed between the head of the elevation adjusting bolt and the foot 22, and/or between the locking nut 92 and the foot 22 order to facilitate rotation of the elevation adjusting bolts 88 relative to the feet 22 of the base brace 12. A stop nut 100, for example a nylon insert lock nut, may be placed on the end of each elevation adjusting bolt 88. The adjustable retaining bracket 10 may also include a pair of level supporting bolts 102 that may be threadenly received into threaded holes 104 of the support column 18 of the adjustable retaining bracket 10. These level supporting bolts 102 may be configured to provide support for the adjustable retaining bracket 10 and allow for adjustment of the elevation of the adjustable retaining bracket relative to the surface, as discussed further below.

Still referring to FIGS. 1-10, the adjustable retaining bracket 10 may include one or more removable adjusting guides 200 that may be positioned within openings of the adjustable retaining bracket 10 in order to provide an indication as to the elevation of the adjustable retaining bracket 10 relative to the surface on which the adjustable retaining bracket 10 may be installed, as discussed further below. Referring now particularly to FIGS. 11-14, therein illustrated is an exemplary embodiment of the adjusting guide, generally indicated by reference numeral 200, that may be used with the adjustable retaining bracket 10 according to the present invention. The adjusting guide 200 may include a columnar body 202 that has one or more graduation indicia 204 positioned, formed, imprinted or marked thereon. The graduation indicia 204 are configured to provide a relative height of one surface to another, as discussed further below. The columnar body 202 of the adjusting guide 200 may also include a threaded opening 206 that is configured to receive a handle 208 for the adjusting guide 200, which may be for example an eyebolt. The handle 208 may also be formed integral with the columnar body 202, such by as casting or extruding the handle 208 as part of the columnar body 202. The handle 208 may be threaded into the columnar body 202, but it is also contemplated that the handle 208 may be affixed to the columnar body 202 by other means, such as press-fit or an adhesive. The adjusting guide 200 may also include one or more magnets 210 that each may be secured to the columnar body 202 of the adjusting guide 200 by a fastener 212, such as a screw or bolt. The one or more magnets 210 may be rare Earth magnets, such as neodymium magnets, and are configured to allow the adjusting guide 200 to be removably secured to a metallic surface so that the adjusting guide 200 maintains is position during adjustment of the adjustable retaining bracket 10.

Figure 20:
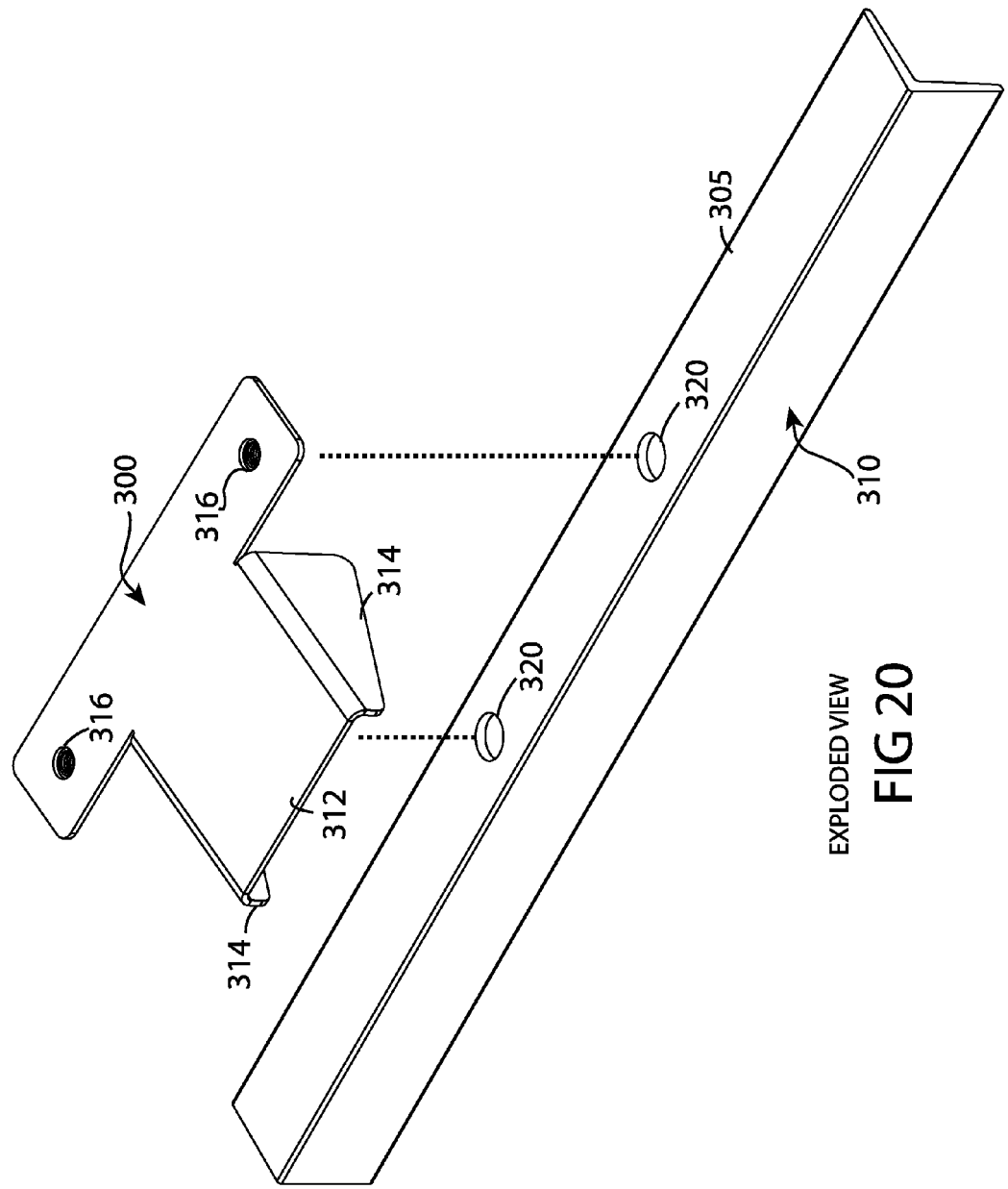
FIG. 20 is an exploded isometric view of the exemplary support structure that may be used with the exemplary adjustable retaining bracket according to the present invention installed on a structural member.
Figure 21:
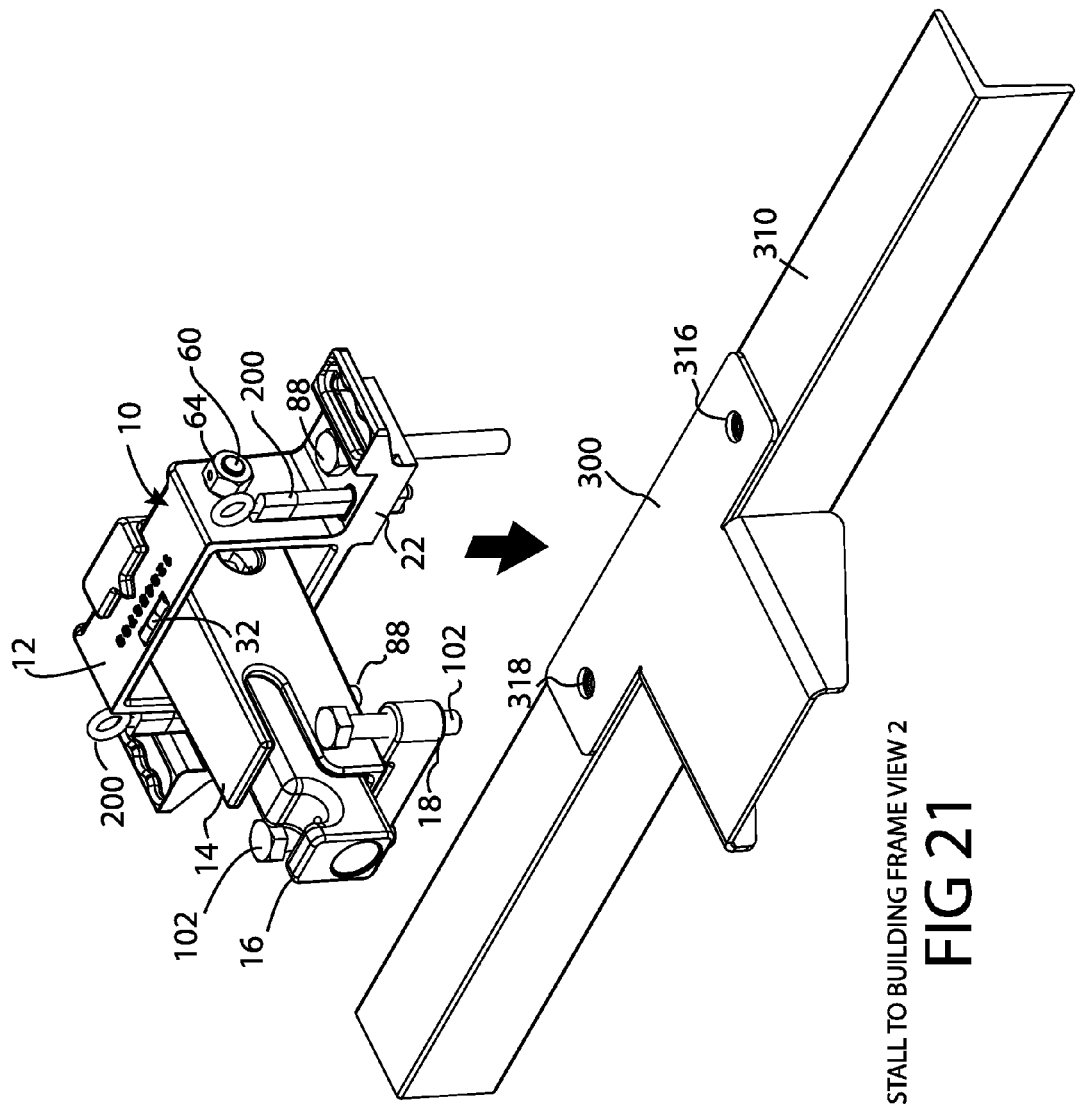
FIG. 21 is an exploded isometric view showing installation of the exemplary adjustable retaining bracket according to the present invention on the exemplary support structure and structural member.
Figure 22:
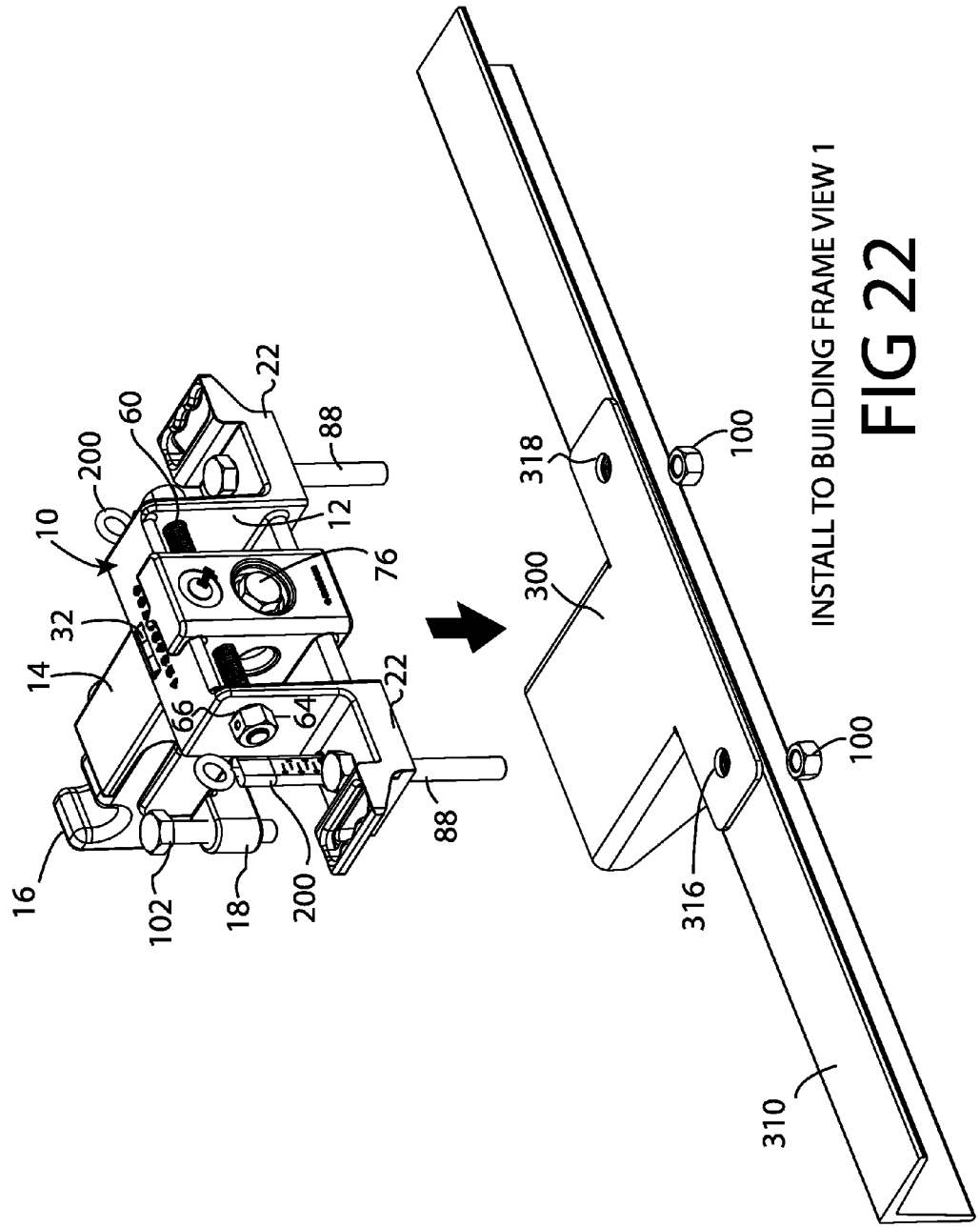
FIG. 22 is an exploded isometric view showing installation of the exemplary adjustable retaining bracket according to the present invention on the exemplary support structure and structural member.
Figure 23:
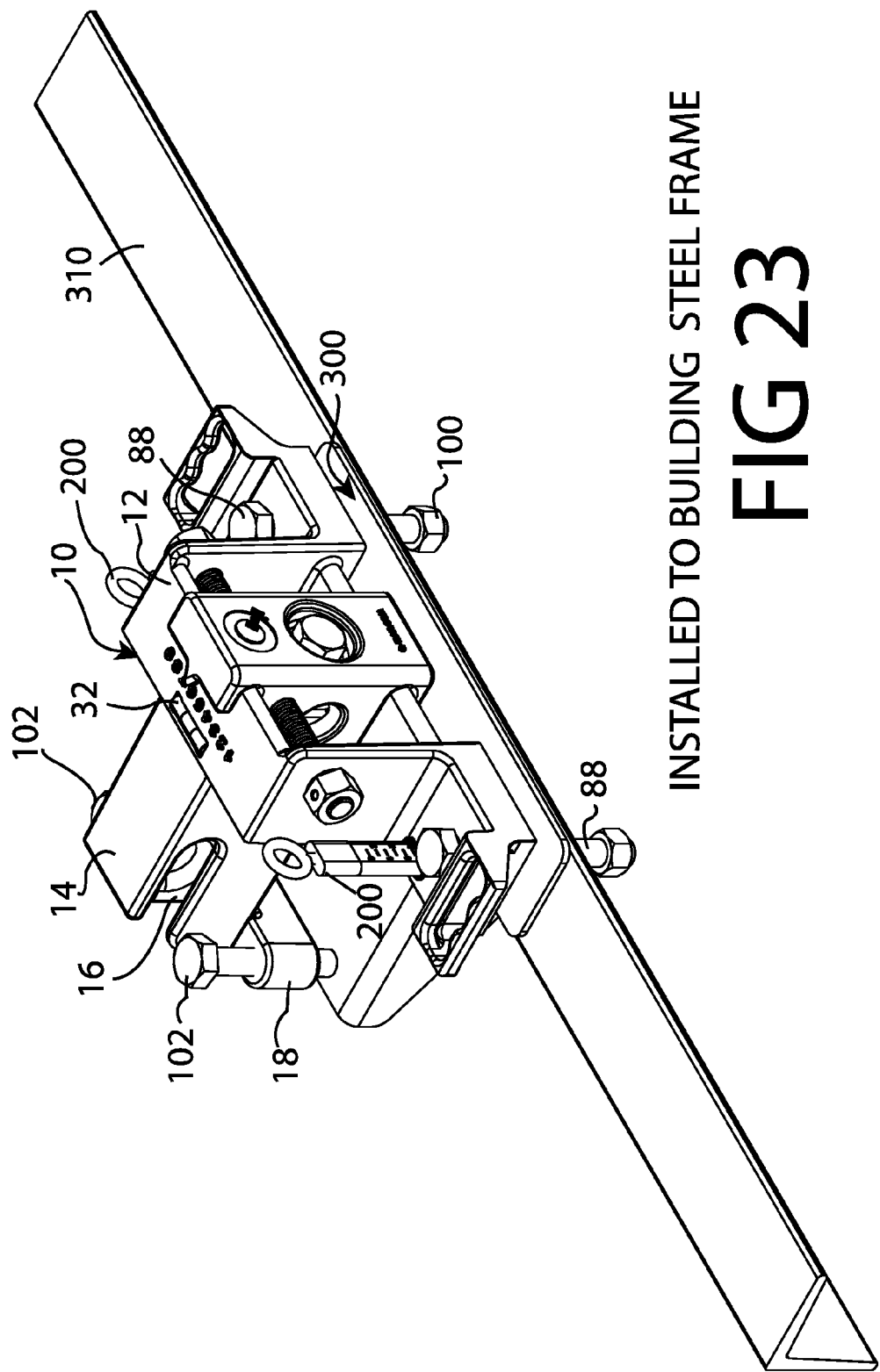
FIG. 23 is an isometric view of the exemplary adjustable retaining bracket according to the present invention installed on the exemplary support structure and structural member.
Figure 33:
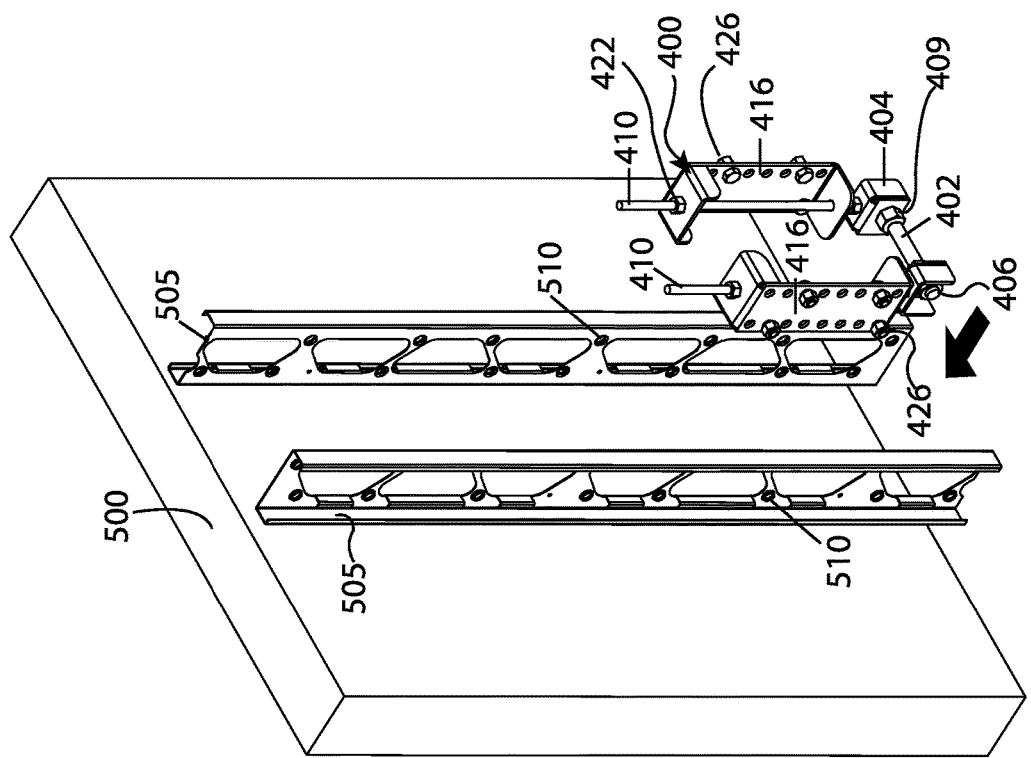
FIG. 33 is an isometric view of the exemplary mounting bracket showing installation on an exemplary wall.
Figure 34:
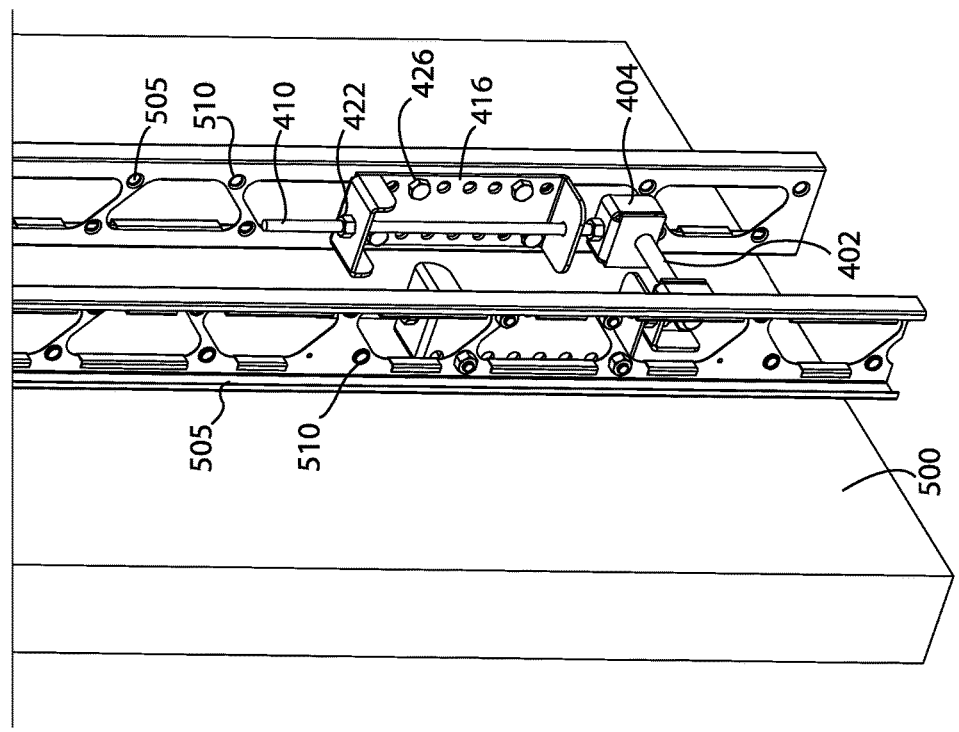
FIG. 34 is an isometric view of the exemplary mounting bracket installed on the exemplary wall.
Figure 37:
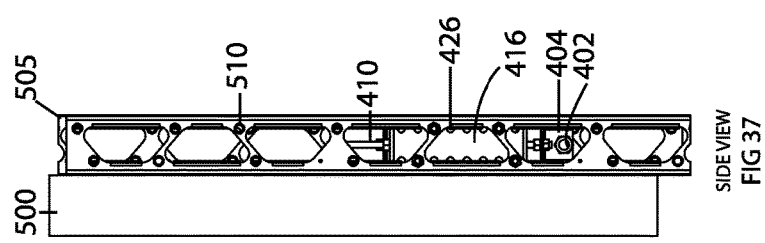
FIG. 37 is a side view of the exemplary mounting bracket installed on the exemplary wall.
Figure 36:
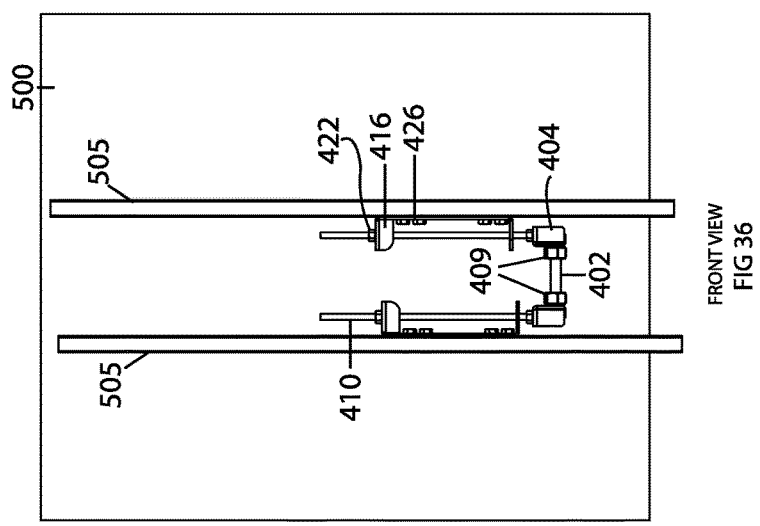
FIG. 36 is a front view of the exemplary mounting bracket installed on the exemplary wall.
Figure 35:
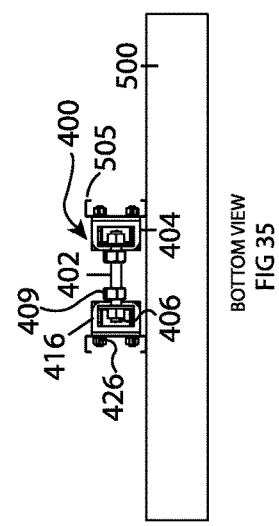
FIG. 35 is a bottom plan view of the exemplary mounting bracket installed on the exemplary wall.
Figure 38:
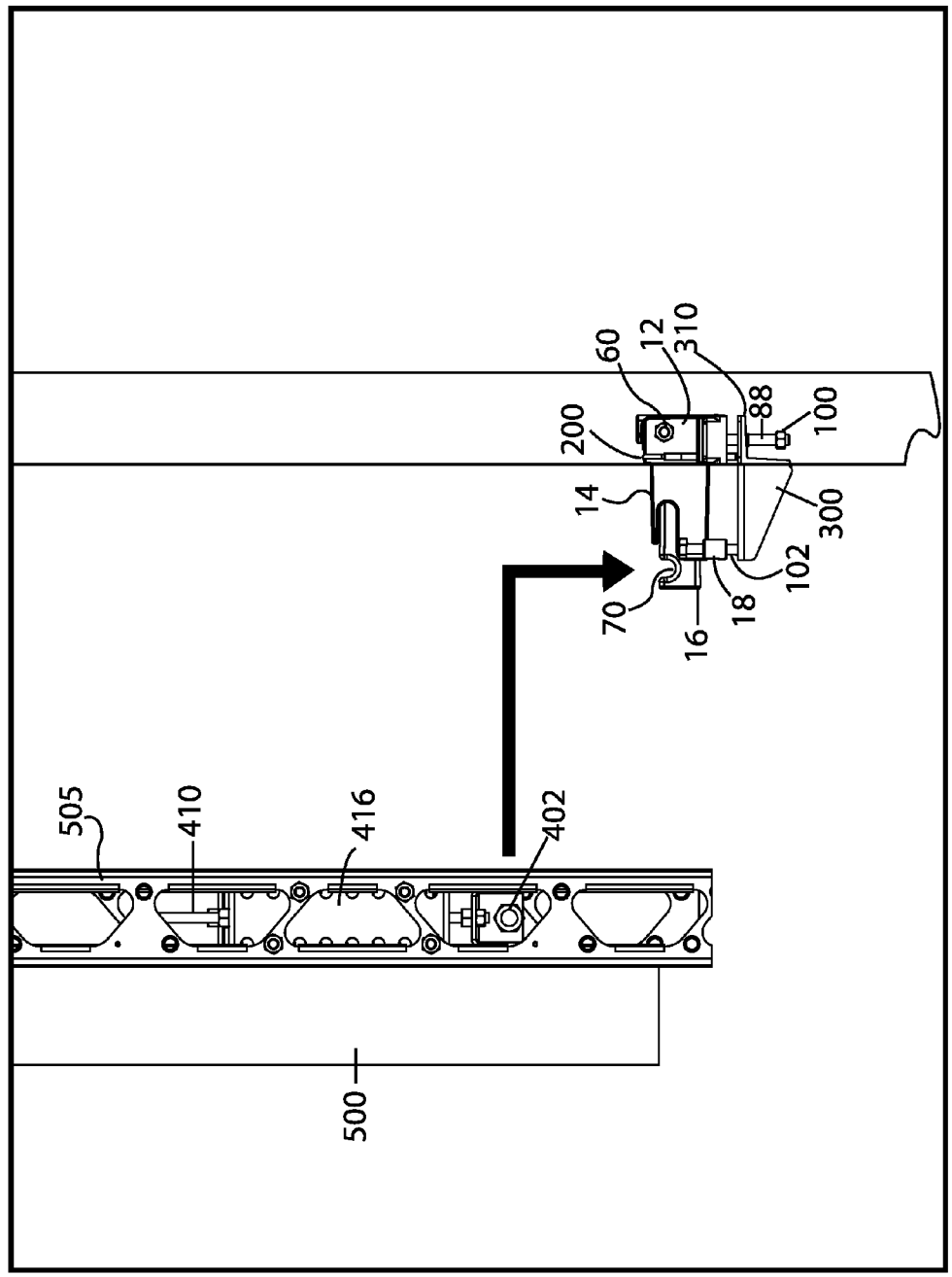
FIG. 38 is a side view showing installation of the exemplary mounting bracket and exemplary wall on the exemplary adjustable retaining bracket according to the present invention.
Figure 39:
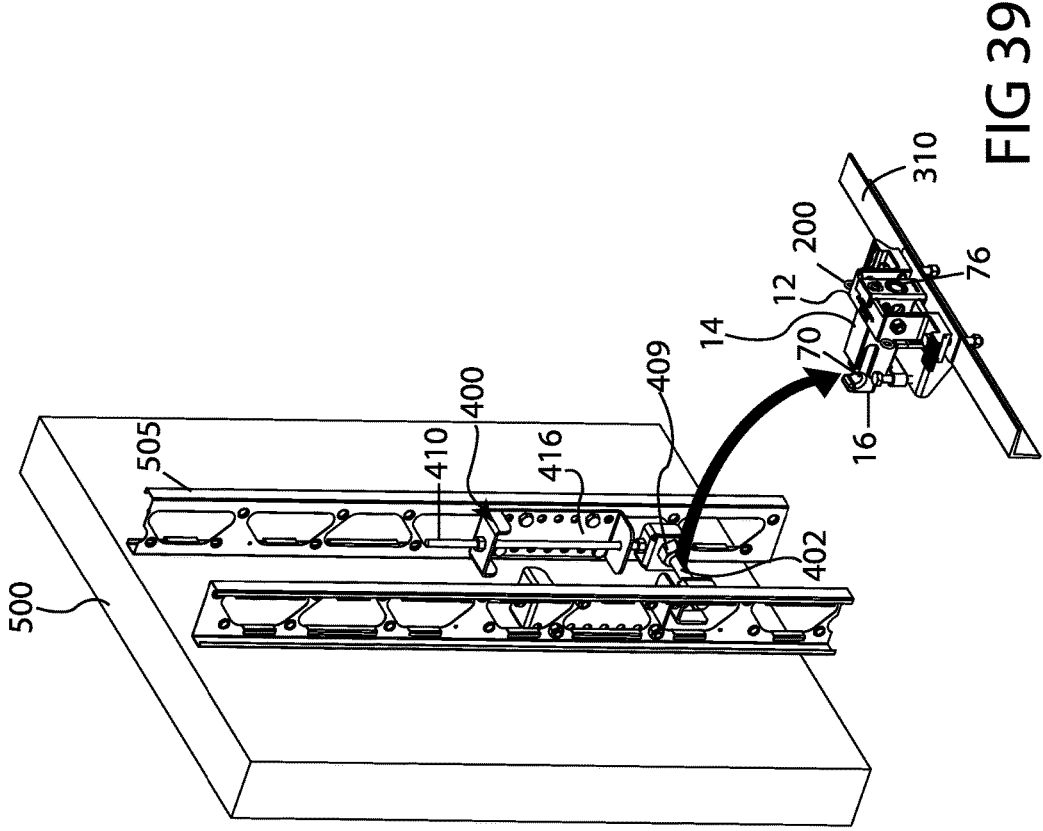
FIG. 39 is an isometric view showing installation of the exemplary mounting bracket and exemplary wall on the exemplary adjustable retaining bracket according to the present invention.
Figure 44:
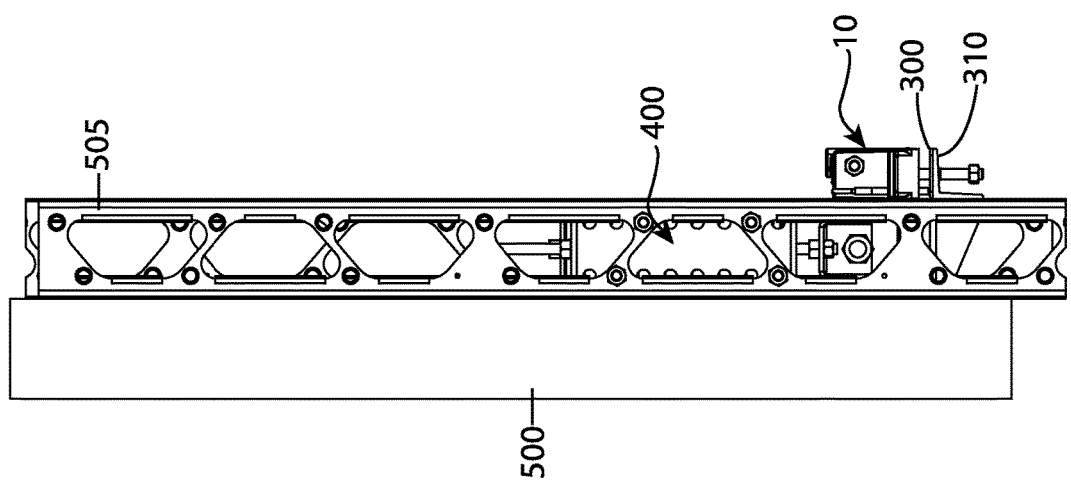
FIG. 44 is a side view showing the exemplary mounting bracket and exemplary wall installed on the exemplary adjustable retaining bracket according to the present invention.
Figure 45:
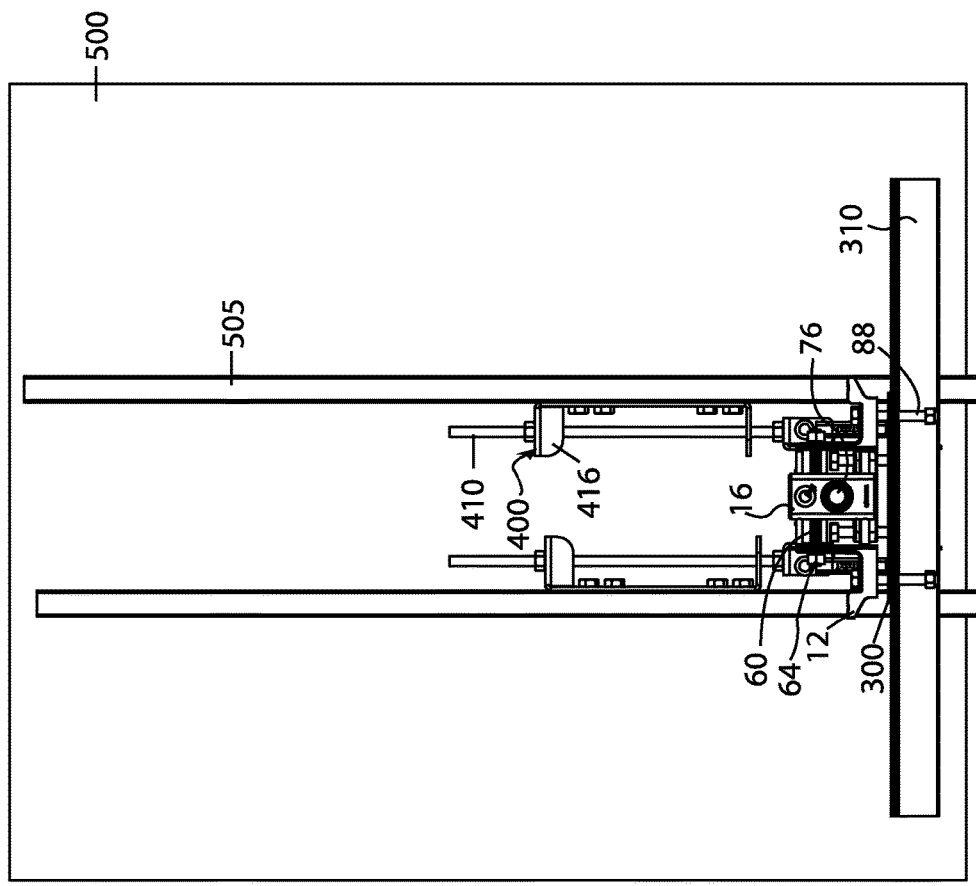
FIG. 45 is a front view showing the exemplary mounting bracket and exemplary wall installed on the exemplary adjustable retaining bracket according to the present invention.
Figure 46:
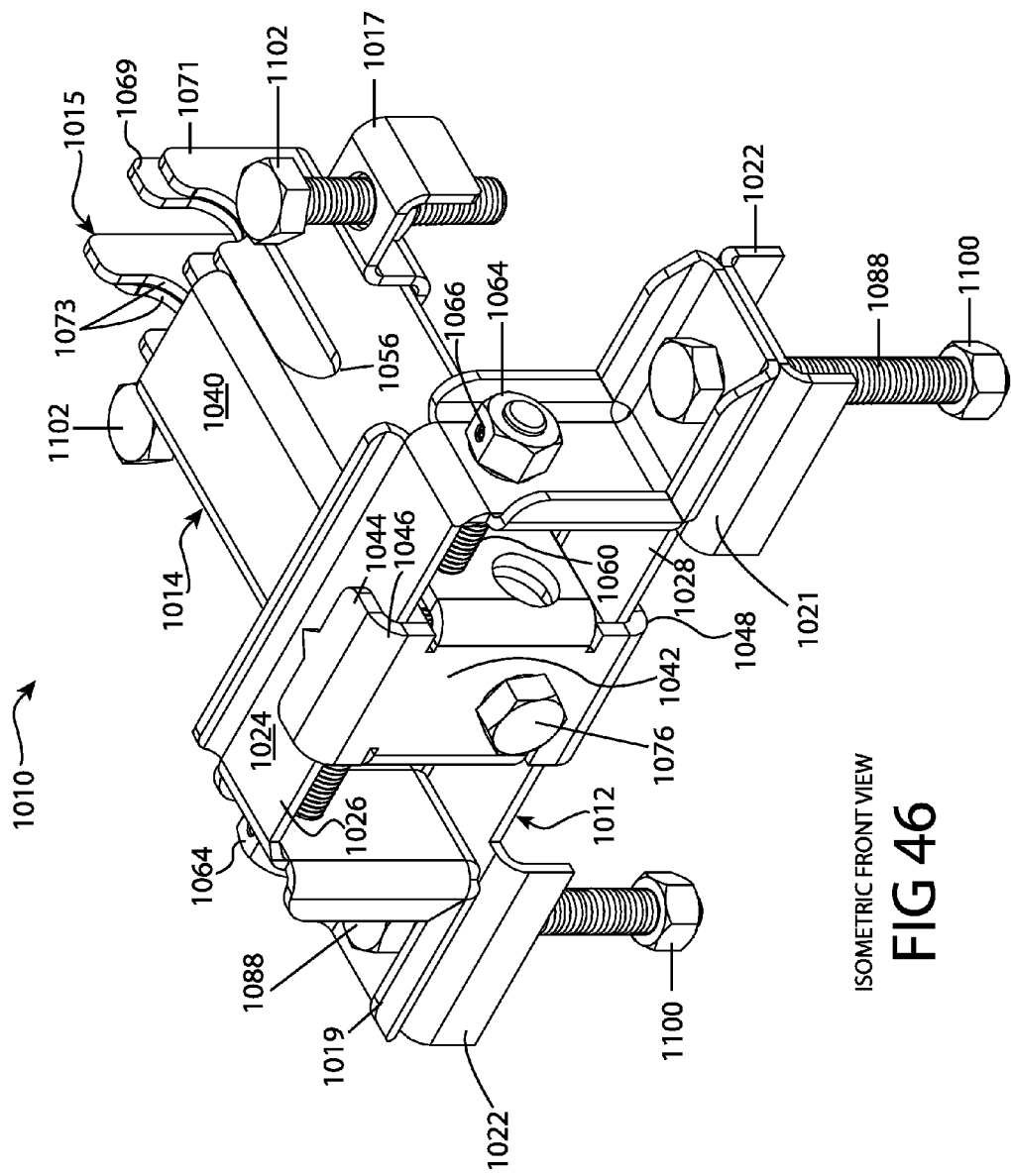
FIG. 46 is an isometric front view of another exemplary adjustable retaining bracket according to the present invention.
Figure 55:
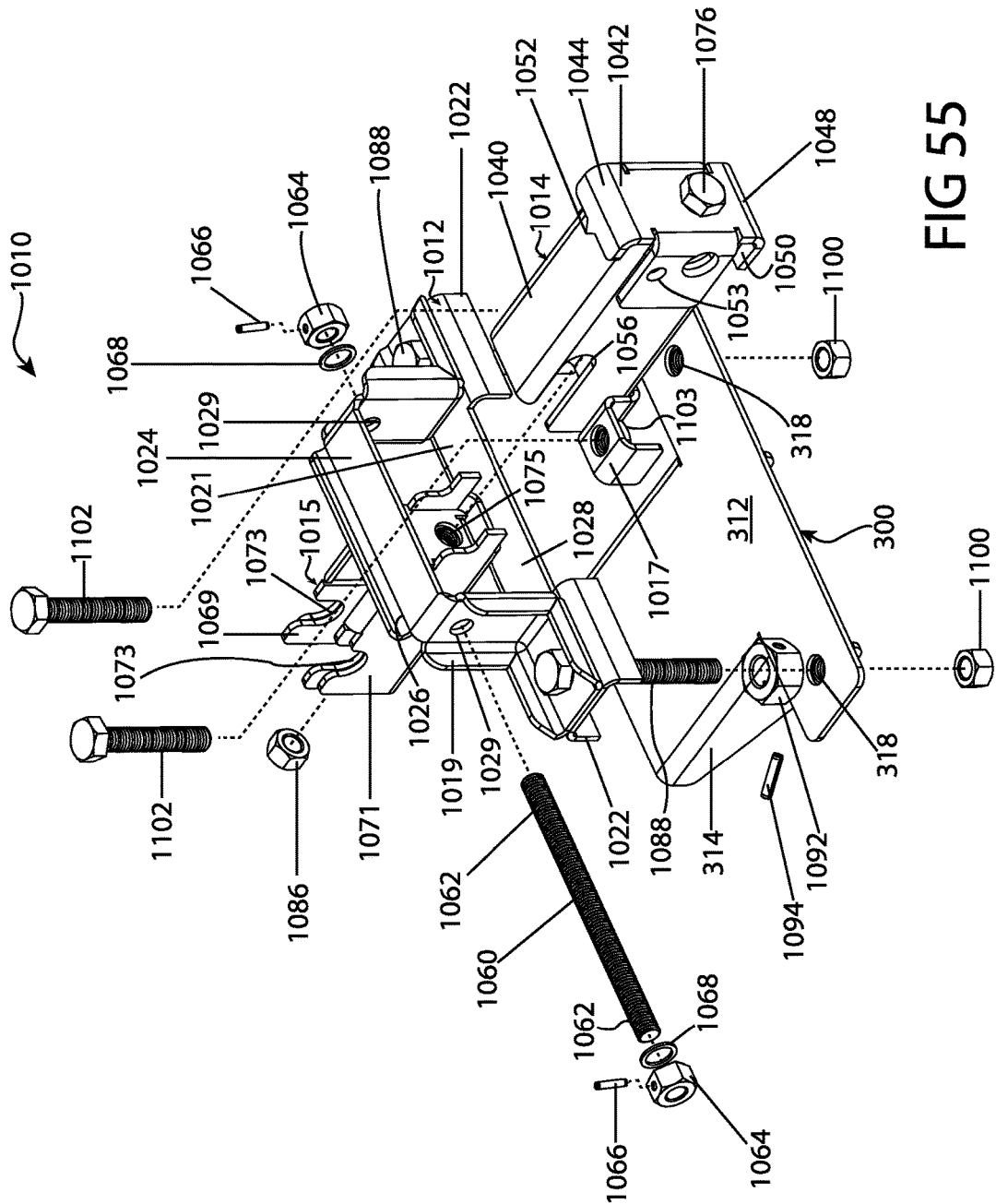
FIG. 55 is an isometric exploded view of the other exemplary adjustable retaining bracket according to the present invention and exemplary support structure.
Figure 60:
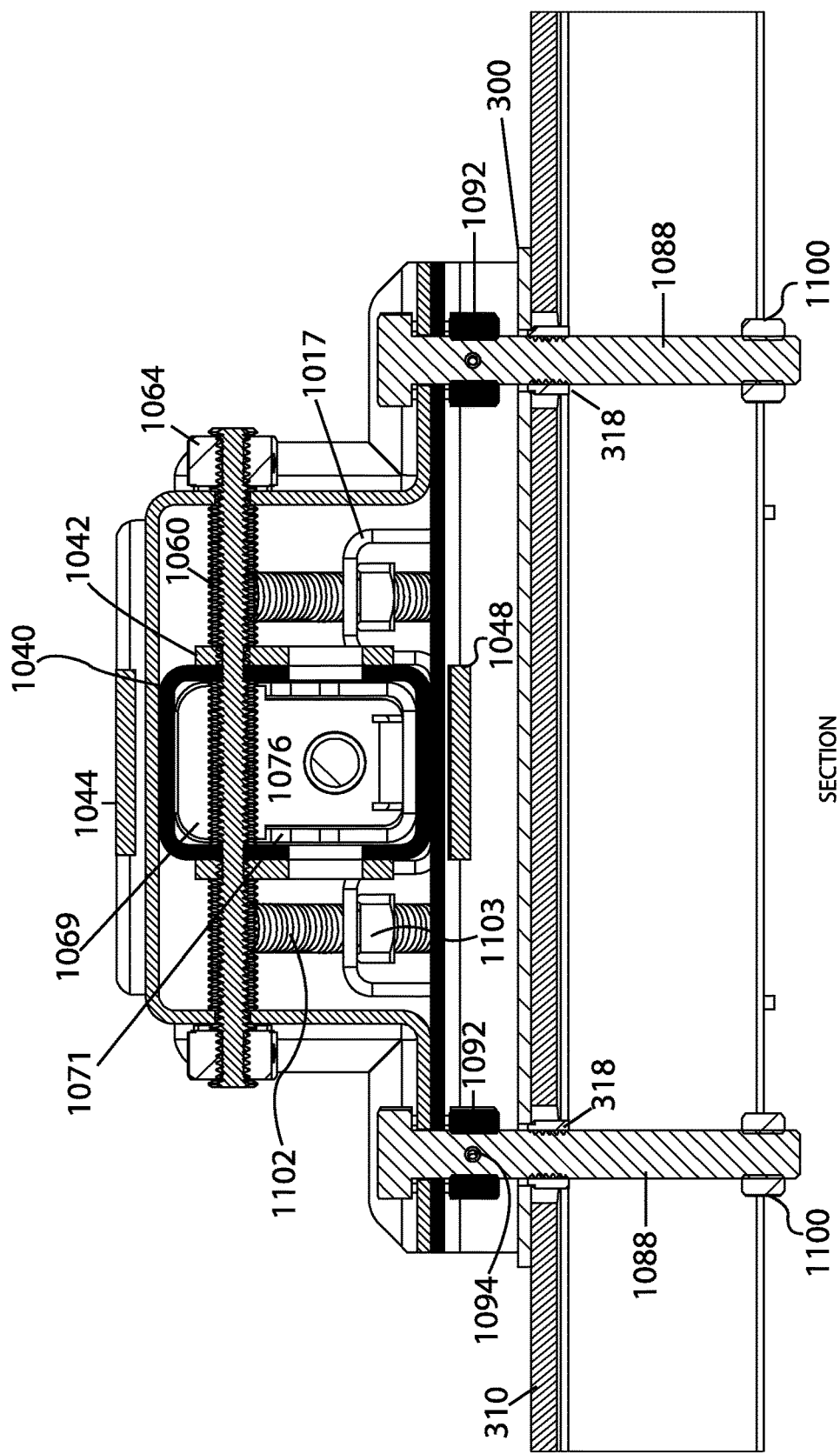
FIG. 60 is a cross-sectional view of the other exemplary adjustable retaining bracket according to the present invention installed on the exemplary support structure and structural member taken along line 60-60 in FIG. 56.
Figure 61:
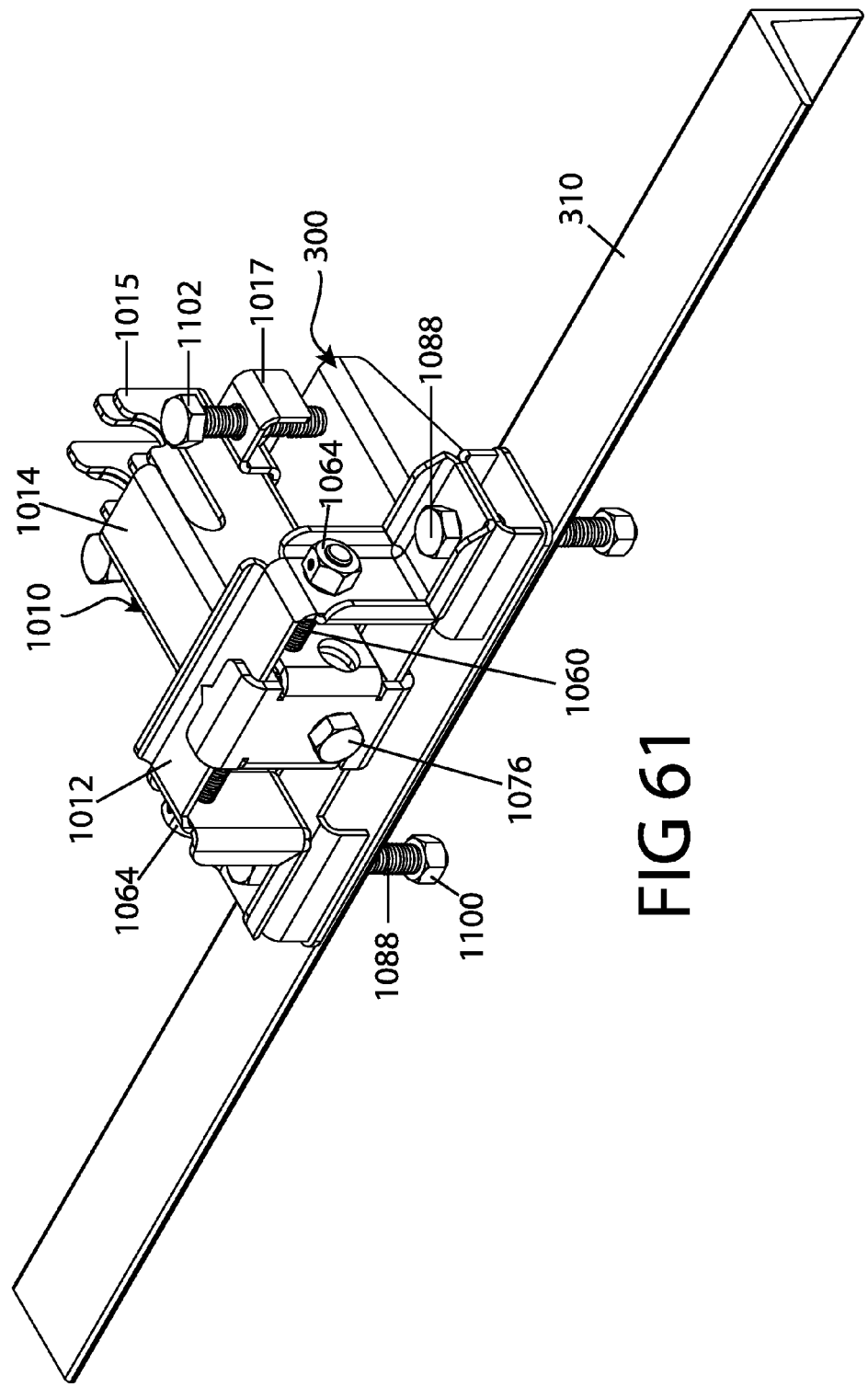
FIG. 61 is an isometric font view of the other exemplary adjustable retaining bracket according to the present invention installed on the exemplary support structure and structural member.
Figure 62:
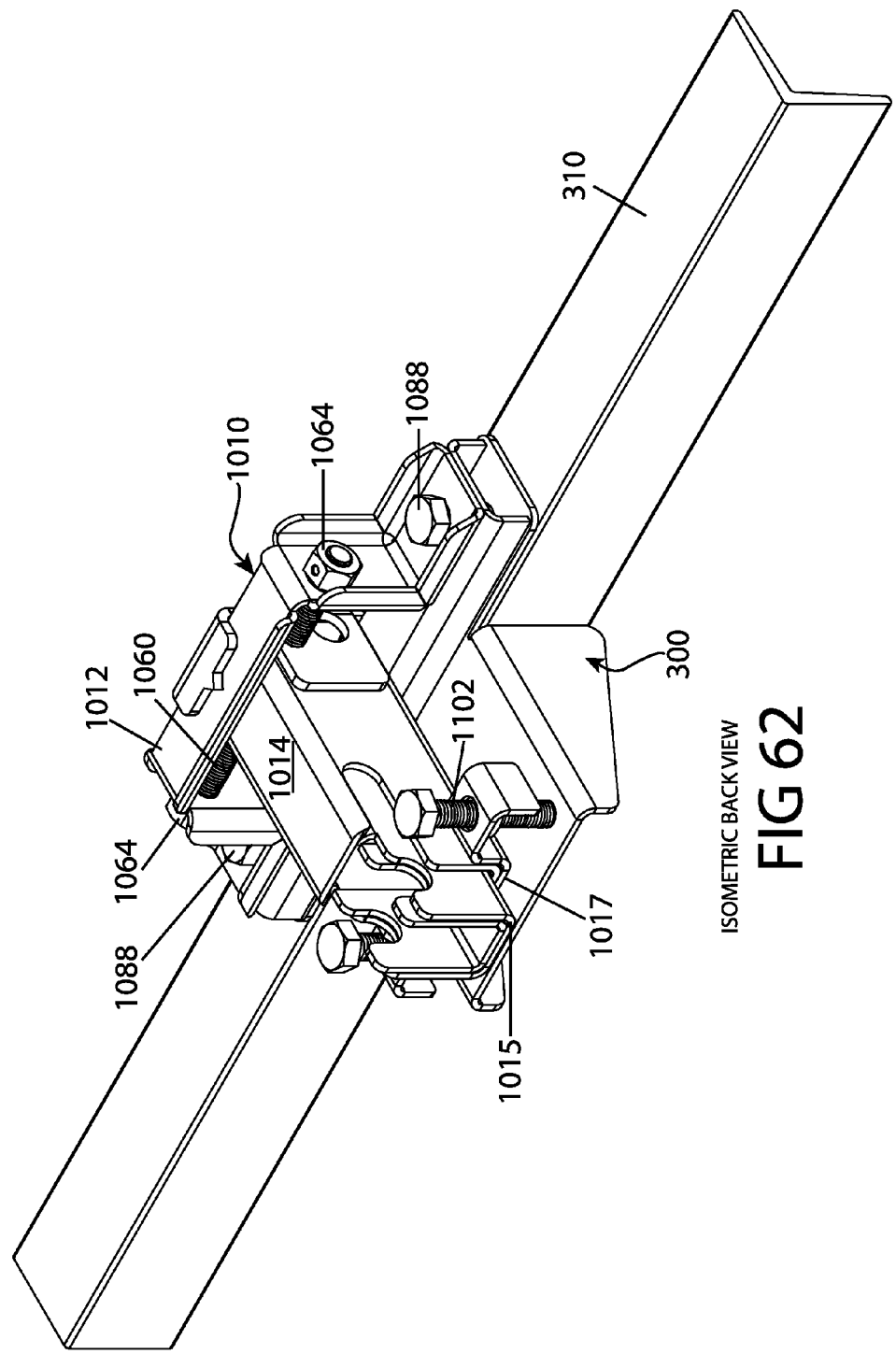
FIG. 62 is an isometric rear view of the other exemplary adjustable retaining bracket according to the present invention installed on the exemplary support structure and structural member.

Referring now to FIGS. 15-20, therein illustrated is an exemplary embodiment of a support structure, generally indicated by reference numeral 300, that may be used with the adjustable retaining bracket 10 according to the present invention. As discussed further below, the adjustable retaining bracket 10 may be installed and/or mounted on a surface to allow for adjustable positioning of the adjustable retaining bracket 10 and any object captured by the adjustable retaining bracket 10. Accordingly, the support structure 300 may be provided in order to facilitate installation, mounting and/or adjustment of the adjustable retaining bracket 10 relative to a surface, such as a surface 305 of a structural member 310 as shown in FIG. 20. The support structure 300 may include a mounting plate 312 and a pair of support fins 314 positioned on opposing sides of the mounting plate 312. The mounting plate 312 may also include one or more openings 316 that may have welded nuts 318 secured to on one side of the mounting plate 312 of the support structure 300. The support structure 300 may be secured to the structural member 310 by any suitable securing mechanism. For example, if the structural member 310 is made of steel, the support structure 300 may be welded to the structural member 310. As an alternative or in addition to welding the support structure 300 to the structural member 310, other suitable securing mechanisms may include, but are not limited to, screws, bolts, rivets, epoxies, adhesives and/or any combination thereof. Holes 320 should be positioned in the surface 305 of the structural member 310 in order to accommodate the welded nuts 318 of the support structure 300.

Referring now to FIGS. 27-32, therein illustrated is an exemplary embodiment of a mounting bracket, generally indicated by reference numeral 400, that may be used with the adjustable retaining bracket 10 according to the present invention. As discussed further below, the mounting bracket 400 may be used in order to couple a wall to the adjustable retaining bracket 10. The mounting bracket 400 may include a catch rod 402 and a pair of platforms 404 each secured to one end of the catch rod 402 by a lock nut 406, for example a nylon insert lock nut. The platforms 404 each include a catch rod hole 408 through which the catch rod 402 may be positioned, and allow for the platforms 404 to be adjusted along the longitudinal axis of the catch 402, but secured by the lock nut 406 from movement away from each other. The mounting bracket 400 may also include one or more positioning nuts 409 that may be placed along the catch rod 402 between the pair of platforms 404. The positioning nuts 409 are configured to facilitate adjustment of a wall or other object secured to the mounting bracket 400 by the adjustable retaining bracket 10. The mounting bracket 400 may also include a pair of threaded control rods 410, and each control rod 410 is secured to a corresponding platform 404 to allow for substantially parallel positioning of the control rods 410 relative to each other. Each platform 404 may include an opening 412 for receiving the control rod 410, and the control rod 410 may be secured to the platform 404 by a pair of nuts 414. The mounting bracket 400 may also include a catch system upright 416 positioned around each control rod 410. The catch system upright 416 may include an upper shelf 418 and a lower shelf 420, and each of the upper shelf 418 and lower shelf 420 may include a hole for receiving the control rod 410 through the catch system upright 416. The lower shelf 420 may be formed in a similar manner as the upper shelf 418, and have a structure that is the reverse of the upper shelf 418. The upper shelf 418 and the lower shelf 420 may be connected by a plate 421. The control rod 410 may be adjustably secured to the catch system upright 416 by positioning a nut 422 on each side of the upper shelf 418. In this configuration, the lower shelf 420 acts to maintain appropriate spacing between the plate 421 of the catch system upright 416 and the control rod 410, but it is understood that nuts (not shown) may also be positioned on either side or both sides of the lower shelf 420 so as to provide an additional bearing surface as a result of the nuts (not shown) acting on the control rod 410. The catch system upright 416 of the mounting bracket 400 may also include one or more openings 424 positioned in the plate 426 of the catch system upright 416, and each of the openings 424 may be configured to receive a fastener 426 that may be used to secure the mounting bracket 400 to a wall or other structure. For example, the fastener 426 may be a bolt and a lock nut, for example a nylon insert lock nut.

The installation, operation and use of the adjustable retaining bracket 10 in combination with the support structure 300 and mounting bracket 400 will now be discussed with reference to FIGS. 21-26 and 33-45. Referring particularly to FIGS. 21-26, the installation of the adjustable retaining bracket 10 to the support structure 300 and structural member 310 is shown. The adjustable retaining bracket 10 is aligned with the support structure 300 once the support structure 300 has been secured to the structural member 310 so that the elevation adjusting bolts 88 can be received by the openings 316 and welded nuts 318 of the support structure 300. Each of the elevation adjusting bolts 88 are threaded into the corresponding opening 316 and welded nut 318 in order to move the adjustable retaining bracket 10 into position over the support structure 300 as shown in FIGS. 23-26. Once the elevation adjusting bolts 88 have been threaded through the welded nuts 318 the stop nuts 100 can be threaded onto the elevation adjusting bolts 88 in order to prevent removal of the adjustable retaining bracket 10 from the support structure 300 without removal of the stop nuts 100. It is understood that the elevation adjusting bolt 88 is free to rotate about its longitudinal axis relative to the adjustable retaining bracket 10 as a result of the locking nut 92 and pin 94 retaining the elevation adjusting bolt 88 on the adjustable retaining bracket 10. It is further understood that the elevation adjusting bolts 88 in cooperation with the welded nuts 318 provide support for the adjustable retaining bracket 10, and it is not necessary for the feet 22 of the base brace 12 to come into contact with the support structure 300 in order to support the adjustable retaining bracket 10 in position. The elevation of the adjustable retaining bracket 10 relative to the support structure 300 can be determined through use of the one or more adjusting guides 200, and the elevation of one side of the base brace 12 to the other side of the base brace 12 can also be determined through use of the one or more adjusting guides 200 as well. In addition, the bubble level 32 may be used in order to ensure that the adjustable retaining bracket 10 is level in a direction along the length of the base brace 12. Once the appropriate height of the adjustable retaining bracket 10 has been obtained through use of the elevation adjusting bolts 88, the level supporting bolts 102 can be adjusted so that they each come into contact with the mounting plate 312 of the support structure 300 so as to provide additional support for the adjustable retaining bracket 10. It is contemplated that an additional bubble level (not shown) or a bubble level that provides for a two-direction level indication may also be included on the adjustable retaining bracket 10 so as to provide an indication as to the level of the adjustable retaining bracket 10 in a direction along the length of the outer tube 14.

Referring now specifically to FIGS. 33-37, the installation of the mounting bracket 400 on an exemplary wall 500 is shown, and will now be discussed. The exemplary wall 500 may include one or more wall supports 505 to which the mounting bracket 400 may be attached. The wall supports 505 may be an industry standard steel stud or a formed metal stud, for example a roll formed and stamped steel stud such as a DELTASTUD available from Steelform Building Products Inc, or any other suitable wall supporting construction material, such as wooden lumber studs. The mounting bracket 400 may be adjusted through use of the catch rod 402, platforms 404 and lock nuts 406 so that the catch system uprights 416 are positioned adjacent to each respective wall support 505. The fasteners 426 may then be used to secure each of the catch system uprights 416 a respective wall support 505 by using either pre-existing or formed holes 510 in the wall support 505. The catch system uprights 416 may be adjusted along the control rod 410 so that the appropriate number of openings 424 in the catch system upright 416 align with the appropriate number of holes 510 in the wall supports 505. This adjustment can be performed by rotating the nuts 422 so that they travel along the control rod 410, and then tightening the nuts 422 relative to each other so as to retain the catch system upright 416 in the desired position. Once the mounting bracket 400 has been secured to the wall 500, the mounting bracket 400 and wall 500 can be installed on the adjustable retaining bracket 10 and the adjustable retaining bracket 10 can be used to make adjustments for installation of the wall 500 on a building structure (not shown) as shown in FIGS. 38-45.

Referring now to FIGS. 38-45, the mounting bracket 400 may be installed on the adjustable retaining bracket 10 by inserting the catch rod 402 into the arching slot 70 of the inner tube 16. It is understood that each one of the one or more positioning nuts 409 should be located on the catch rod 402 so as to be positioned on either side of the inner tube 16 when the catch rod 402 is inserted into the arching slot 70. Once the catch rod 402 has been positioned so as to be cradled by the arching slot 70 of the inner tube 16, the longitudinally extending bolt 76 may be rotated about its longitudinal axis in order to telescopically withdraw the inner tube 16 into the hollow body portion 40 of the outer tube 14 (see also FIGS. 1A and 1B). During withdrawal of the inner tube 16 into the outer tube 14 the catch rod 402 is further received and retained within the recess formation 56 of the hollow body portion 40 which allows the inner tube 16 with the catch rod 402 received thereon to be brought into the outer tube 14 and provides for a cover to retain the catch rod 402 to prevent movement out of the arching slot 70 of the inner tube 16. Therefore, it is understood that the adjustable retaining bracket 10 is positionable between a telescopically extended position of the inner tube 16 relative to the outer tube 14 (FIGS. 38-41) and a telescopically withdrawn position of the inner tube 16 relative to the outer tube 14 (FIGS. 42-43). Once the adjustable retaining bracket 10 has been positioned into the telescopically withdrawn position the one or more positioning nuts 409 may be tightened on the catch rod 402 relative to the outer tube 14. As shown particularly in FIGS. 42-43, the adjustable retaining bracket 10 is configured to adjust the mounting bracket 400 and wall 500 in a direction substantially perpendicular to the direction that the inner tube 16 is configured to extend from and retract to the outer tube 14, by adjustment of nut 76. Either of the locking nuts 64 secured to the transverse adjusting rod 60 may be rotated, which will cause the treads on the transverse adjusting rod 60 to engage with the threaded bore 54 of the outer tube 14 resulting in movement of the outer tube 14 along the traverse adjusting rod 60 and base brace 12 (see also FIGS. 1I and 1G). It is understood that the upper support band 26 and the lower support band 28 of the housing 24 of the base brace 12 act as guides and supports for the first flange 44 and second flange 48 respectively of the inner tube 16 so that the first groove 46 and second groove 50 slide along the substantially rounded edges 30 of the housing 24. Since the catch rod 402 has been captured in the adjustable retaining bracket 10 and the positioning nuts 409 have been secured about the outer tube 14, the movement of the inner tube 16 and outer tube 14 is transferred to the catch rod 402 and one of the positioning nuts thereby moving the mounting bracket 400 and the wall 500 attached to the mounting bracket 400 in the desired direction. In this manner, the wall 500 attached to the mounting bracket 400 can be adjusted during installation of the wall 500 on a building structure without requiring additional equipment for final installation and/or adjustment of the wall 500. While the above discussion mentioned that the adjustable retaining bracket 10 could be positioned in the telescopically withdrawn position prior to tightening the one or more positioning nuts 409, the present invention is not limited to such sequence of events, and it is contemplated that the one or more positioning nuts 409 can be tightened about the inner tube 16 while the adjustable retaining bracket 10 is in the telescopically extended position in order to allow for adjustment of the adjustable retaining bracket 10 in the direction substantially perpendicular to the inner tube 16 prior to withdrawal and/or adjustment of the adjustable retaining bracket 10 in the direction parallel to the inner tube 16.

It is understood that the adjustable mounting bracket 10, support structure 300 and mounting bracket 400 and the components thereof described above may be made from any suitable materials for their intended purposes. For example, the adjustable mounting bracket 10 may be made from a cast metal, such as aluminum or steel, and the support structure 300 and mounting bracket 400 and components thereof may be made from sheet steel of any desired thickness.

Referring now to FIGS. 46-48 and 55, therein illustrated is another exemplary embodiment of an adjustable retaining bracket, generally indicated by reference numeral 1010, according to the present invention. The adjustable retaining bracket 1010 may include a base brace 1012, an outer tube 1014 operatively engaged with the base brace, and an inner catch beam 1015 configured for positioning within the outer tube 1014. The adjustable retaining bracket 1010 may also include a support frame 1017 configured for attachment to the outer tube 1014 by suitable means, for example by welding the support frame 1017 to the outer tube 1014. As mentioned above, it is understood that the adjustable retaining bracket 1010 is configured to movement and/or adjustment, including movement and/or adjustment under a load, in the same manner as adjustable retaining bracket 10 discussed above with respect to FIGS. 1A, 1B, 1C, 1D, 1E, 1F, 1G, 1H, 1I and 1J.

Referring now to FIGS. 46-50 and 55, the base brace 1012 of the adjustable retaining bracket 1010 may include an upper support 1019 and a lower support 1021. The lower support 1021 that may include a pair of feet 1022 that are positioned on either side of a housing 1024 that is formed when the upper support 1019 and lower support 1021 are joined together by suitable means, such as by welding. The housing 1024 of the base brace 1012 may include an upper support band 1026 and a lower support band 1028, and may also include holes 1029 formed through the sides of the housing 1024. A bubble level (not shown) and one or more indicia (not shown) may also be placed on the upper support band 1026 of the base brace 1012. The base brace 1012 may also include a shoulder extension (not shown) extending from each of the feet 1022, and the shoulder extensions (not shown) may each include a hand-hold (not shown) configured to facilitate movement and positioning of the adjustable retaining bracket 1010.

Referring now to FIGS. 46-48, 51-52 and 55, the outer tube 1014 of the adjustable retaining bracket 1010 may include a hollow body portion 1040 and an end portion 1042 secured to the hollow body portion 1040 by welding or other suitable means. The end portion 1042 may include a first flange 1044 extending towards the hollow body portion 1040 to form a first groove 1046 between the first flange 1044 and the hollow body portion 1040, and a second flange 1048 extending towards the hollow body portion 1040 to form a second groove 1050 between the second flange 1046 and the hollow body portion 1040. The first flange 1044 may include a triangular extension 1052 extending from the first flange 1044 in a direction towards optional indicia (not shown) on the base brace 1012. The outer tube 1014 may also include threaded holes 1053 formed on either side of the outer tube 1014, and passing though the hollow body portion 1040 and the end portion 1042. The outer tube 1014 may also include a recess formation 1056 positioned in the hollow body portion 1040 at the opposite end of the hollow body portion 1040 as the end portion 1042.

Referring again to FIGS. 46-48 and 55, the outer tube 1014 may be adjustably secured to the base brace 1012 by a transverse adjusting rod 1060 so that the first flange 1044 and first groove 1046 of the outer tube 1014 are positioned for slidable engagement with the upper support band 1026 of the base brace 1012, and the second flange 1048 and second groove 1050 are positioned for slidable engagement with the lower support band 1028 of the base brace 1012. The transverse adjusting rod 1060 may be inserted through one of the holes 1029 of the housing 1024 of the base brace 1012 and then threadenly engage with the threaded holes 1053 of the outer tube 1014 until the transverse adjusting rod 1060 extends through the other hole 1029 of the housing 1024. The transverse adjusting rod 1060 may include a bore 1062 at each end of the transverse adjusting rod 1060, and the transverse adjusting rod 1060 may be adjustably secured to the base brace 1012 and outer tube 1014 by the locking nuts 1064 attached to both ends of the transverse adjusting rod 1060. The locking nuts 1064 may be any suitable fastening device that will prevent, resist and/or reduce removal of the locking nuts 1064 during rotation of the transverse adjusting rod 1060. For example, the locking nuts 1064 may include a hole configured to receive a pin 1066 that when aligned with the bore 1062 in the ends of the transverse adjusting rod 1060 prevent rotation of the locking nuts 1064 relative to the transverse adjusting rod 1060 so that the locking nuts 1064 will not come loose from the transverse adjusting rod 1060. The pin 1066 may be a spring pin, cotter pin, clevis pin, taper pin or any other suitable retaining pin. The locking nut 1064 may also be a slotted or castle nut (not shown). A washer 1068 may also be positioned between each of the locking nuts 1064 and the housing 1024 of the base brace 1012 in order to facilitate rotation of the transverse adjusting rod 1060 relative to the housing 1024. It is also understood that a flange (not shown) may be included on the locking nuts 1064, which may be used instead of the washer 1068.

Referring now to FIGS. 46-48 and 51-55, the hollow body portion 1040 of the outer tube 1014 is configured to receive the inner catch beam 1015, which includes an inner cradle 1069 and an outer cradle 1071. The inner cradle 1069 is configured to fit into the outer cradle 1071 and be secured to the outer cradle 1071 by welding or the like to form the inner catch beam 1015. It is also understood that the configurations of each of the inner cradle 1069 and the outer cradle 1071 are such that movement of the inner cradle 1069 in a longitudinal direction will be transferred to the outer cradle 1071, such that it is not necessary to secure the inner cradle 1069 to the outer cradle 1071 in order to have the inner catch beam 1015 move in such direction. Each the inner cradle 1069 and the outer cradle 1071 has a pair of opposing arching cutouts 1073 that are aligned when the inner cradle 1069 is placed within the outer cradle 1071 to form the inner catch beam 1015. The inner catch beam 1015 may also include a weld nut 1075 secured to an opening in the inner cradle 1069, that permits the inner catch beam 1069 to be adjustably secured to the outer tube 1014 by a longitudinally extending bolt 1076. The longitudinally extending bolt 1076 is secured to the outer tube 1014 by inserting the longitudinally extending bolt 1076 through an opening in the end portion 1042 of the outer tube 1014, and a locking nut 1078 is threaded onto the longitudinally extending bolt 1076 until the locking nut 1078 reaches the end portion 1042 of the outer tube 1014. The locking nut 1078 may be any suitable fastening device that will prevent, resist and/or reduce removal of the locking nut 1078 during rotation of the longitudinally extending bolt 1076. For example, the locking nut 1078 may include a hole configured to receive a pin 1080 that when aligned with a bore 1082 formed in the longitudinally extending bolt 1076 prevent rotation of the locking nut 1078 relative to the longitudinally extending bolt 1076 so that the locking nut 1078 will not come loose from the longitudinally extending bolt 1076. The pin 1080 may be a spring pin, cotter pin, clevis pin, taper pin or any other suitable retaining pin. The locking nut 1078 may also be a slotted or castle nut (not shown). A washer 1084 may be placed between the head of the longitudinally extending bolt 1076 and the outer tube 1014, and/or between (not shown) the locking nut 1078 and the outer tube 1014 order to facilitate rotation of the longitudinally extending bolt 1076 relative to the outer tube 1014. Once the longitudinally extending bolt 1076 has been secured to the outer tube 1014 the inner catch beam 1015 can be inserted into the hollow body portion 1040 of the outer tube 1014, and the longitudinally extending bolt 1076 rotated so that the longitudinally extending bolt 1076 threadenly engages with the threaded weld nut 1075 of the inner catch beam 1015. This threaded engagement between the longitudinally extending bolt 1076 and the weld nut 1075 allows for movement of the inner catch beam 1015 along the hollow body portion 1040 of the outer tube 1014, as discussed further below. A stop nut 1086, for example a nylon insert locking nut, may be placed on the end of the longitudinally extending bolt 1076 once the longitudinally extending bolt 1076 is engaged with the inner catch beam 1015 and extends out of the weld nut 1075.

Referring now to FIGS. 46-50 and 55, the adjustable retaining bracket 1010 may also include a pair of elevation adjusting bolts 1088 that are configured to secure the adjustable retaining bracket 1010 to the support structure 300 and adjust the elevation of the adjustable retaining bracket 1010 relative to the upper surface of the mounting plate 312 of the support structure 300, as discussed further below. Each the pair of elevation adjusting bolts 1088 may be inserted through a hole 1090 in each foot 1022 of the base brace 1012 positioned on opposing sides of the housing 1024, and a locking nut 1092 may be threaded onto each of the pair of elevation adjusting bolts 1088. The locking nut 1092 may be any suitable fastening device that will prevent, resist and/or reduce removal or loosening of the locking nut 1092 during rotation of the elevation adjusting bolt 1088. For example, the locking nut 1092 may include a hole configured to receive a pin 1094 that when aligned with a bore 1096 formed in the elevation adjusting bolt 1088 to prevent rotation of the locking nut 1092 relative to the elevation adjusting bolt 1088 so that the locking nut 1092 will not come loose from the elevation adjusting bolt 1088. The pin 1094 may be a spring pin, cotter pin, clevis pin, taper pin or any other suitable retaining pin. The locking nut 1092 may also be a slotted or castle nut (not shown). A washer 1098 may be placed between the head of the elevation adjusting bolt and the foot 1022, and/or between the locking nut 1092 and the foot 1022 order to facilitate rotation of the elevation adjusting bolts 1088 relative to the feet 1022 of the base brace 1012. A stop nut 1100, for example a nylon insert lock nut, may be placed on the end of each elevation adjusting bolt 1088. The adjustable retaining bracket 1010 may also include a pair of level supporting bolts 1102 that may be threadenly received into weld nuts 1103 secured to the support frame 1017 of the adjustable retaining bracket 1010. These level supporting bolts 1102 may be configured to provide support for the adjustable retaining bracket 1010 and allow for adjustment of the elevation of the adjustable retaining bracket relative to the support structure 300, as discussed further below.

The installation, operation and use of the adjustable retaining bracket 1010 in combination with the support structure 300 and the mounting bracket 400 will now be discussed with reference to FIGS. 56-64. The adjustable retaining bracket 1010 may be installed on the support structure 300 and structural member 310 by aligning the adjustable retaining bracket 1010 with the support structure 300 once the support structure 300 has been secured to the structural member 310 so that the elevation adjusting bolts 1088 can be received by the openings 316 and welded nuts 318 of the support structure 300. Each of the elevation adjusting bolts 1088 are threaded into the corresponding opening 316 and welded nut 318 in order to move the adjustable retaining bracket 1010 into position over the support structure 300 as shown in FIGS. 56-62. Once the elevation adjusting bolts 1088 have been threaded through the welded nuts 318 the stop nuts 1100 can be threaded onto the elevation adjusting bolts 1088 in order to prevent removal of the adjustable retaining bracket 1010 from the support structure 300 without removal of the stop nuts 1100. It is understood that the elevation adjusting bolt 1088 is free to rotate about its longitudinal axis relative to the adjustable retaining bracket 1010 as a result of the locking nut 1092 and pin 1094 retaining the elevation adjusting bolt 1088 on the adjustable retaining bracket 1010. It is further understood that the elevation adjusting bolts 1088 in cooperation with the welded nuts 318 provide support for the adjustable retaining bracket 1010, and it is not necessary for the feet 1022 of the base brace 1012 to come into contact with the support structure 300 in order to support the adjustable retaining bracket 1010 in position. The elevation of the adjustable retaining bracket 1010 relative to the support structure 300 can be determined through use of the one or more adjusting guides (not shown, but is it understood that adjusting guide 200 can also be used with adjustable retaining bracket 1010 according to the present invention), and the elevation of one side of the base brace 1012 to the other side of the base brace 1012 can also be determined through use of the one or more adjusting guides (not shown) as well. In addition, a bubble level (not shown) may be used in order to ensure that the adjustable retaining bracket 1010 is level in a direction along the length of the base brace 1012, and/or in a direction along the length of the outer tube 1014. Once the appropriate height of the adjustable retaining bracket 1010 has been obtained through use of the elevation adjusting bolts 1088, the level supporting bolts 1102 can be adjusted so that they each come into contact with the mounting plate 312 of the support structure 300 so as to provide additional support for the adjustable retaining bracket 1010. It is contemplated that an additional bubble level (not shown) or a bubble level that provides for two-direction level indication may also be included on the adjustable retaining bracket 1010 so as to provide an indication as to the level of the adjustable retaining bracket 1010 in a direction along the length of the outer tube 1014.

Figure 63:
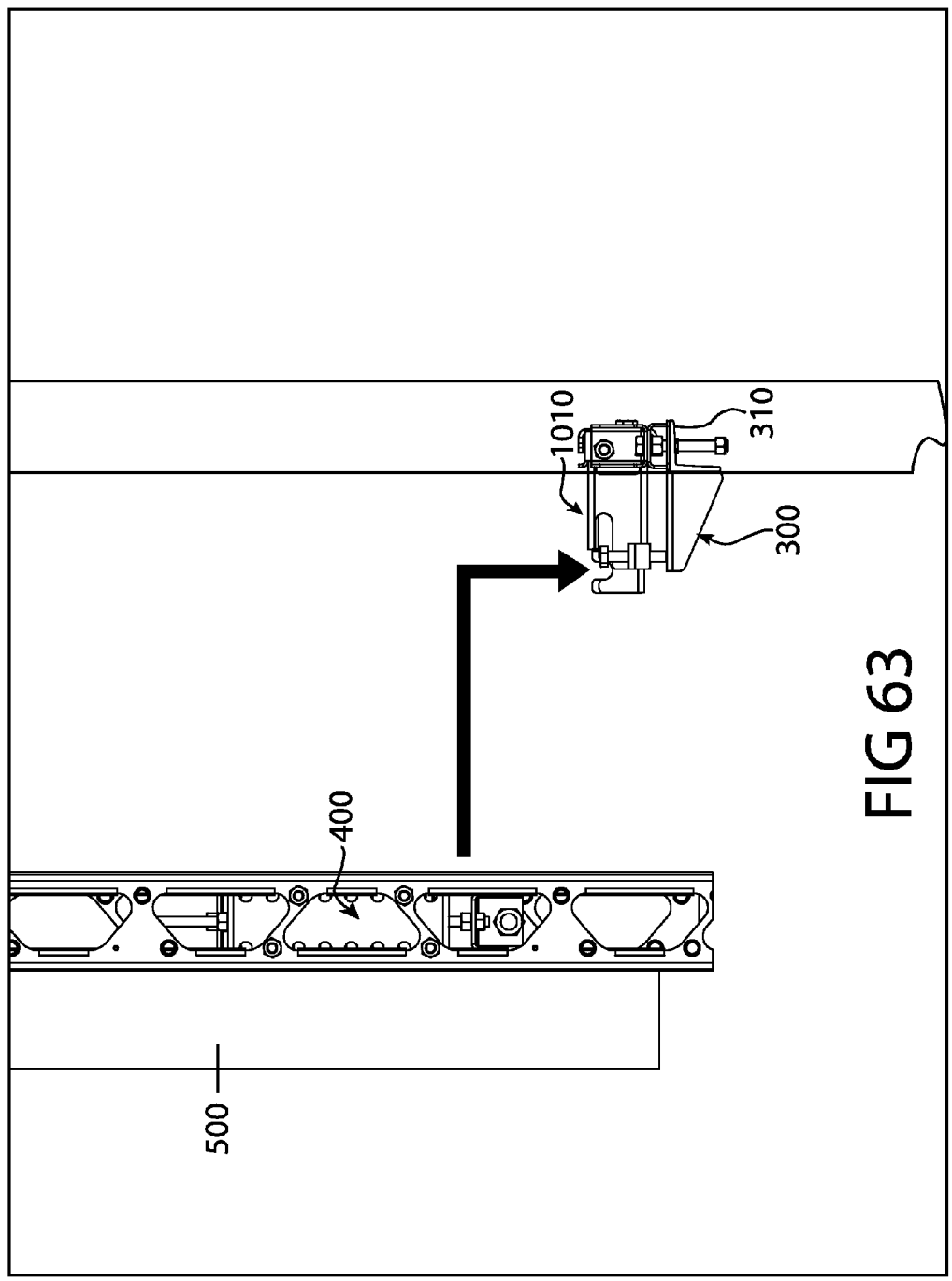
FIG. 63 is a side view showing installation of the other exemplary mounting bracket and exemplary wall on the exemplary adjustable retaining bracket according to the present invention.
Figure 64:
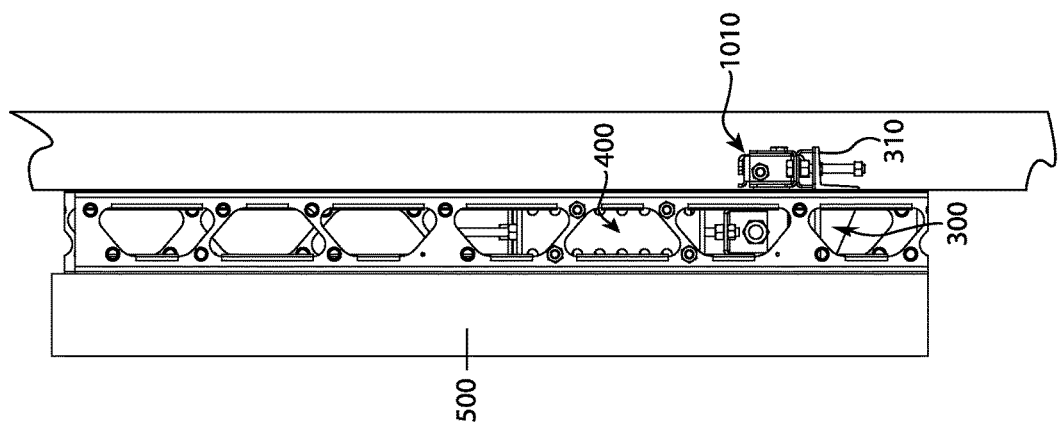
FIG. 64 is a side view showing the other exemplary mounting bracket and exemplary wall installed on the exemplary adjustable retaining bracket according to the present invention.
Figure 65:
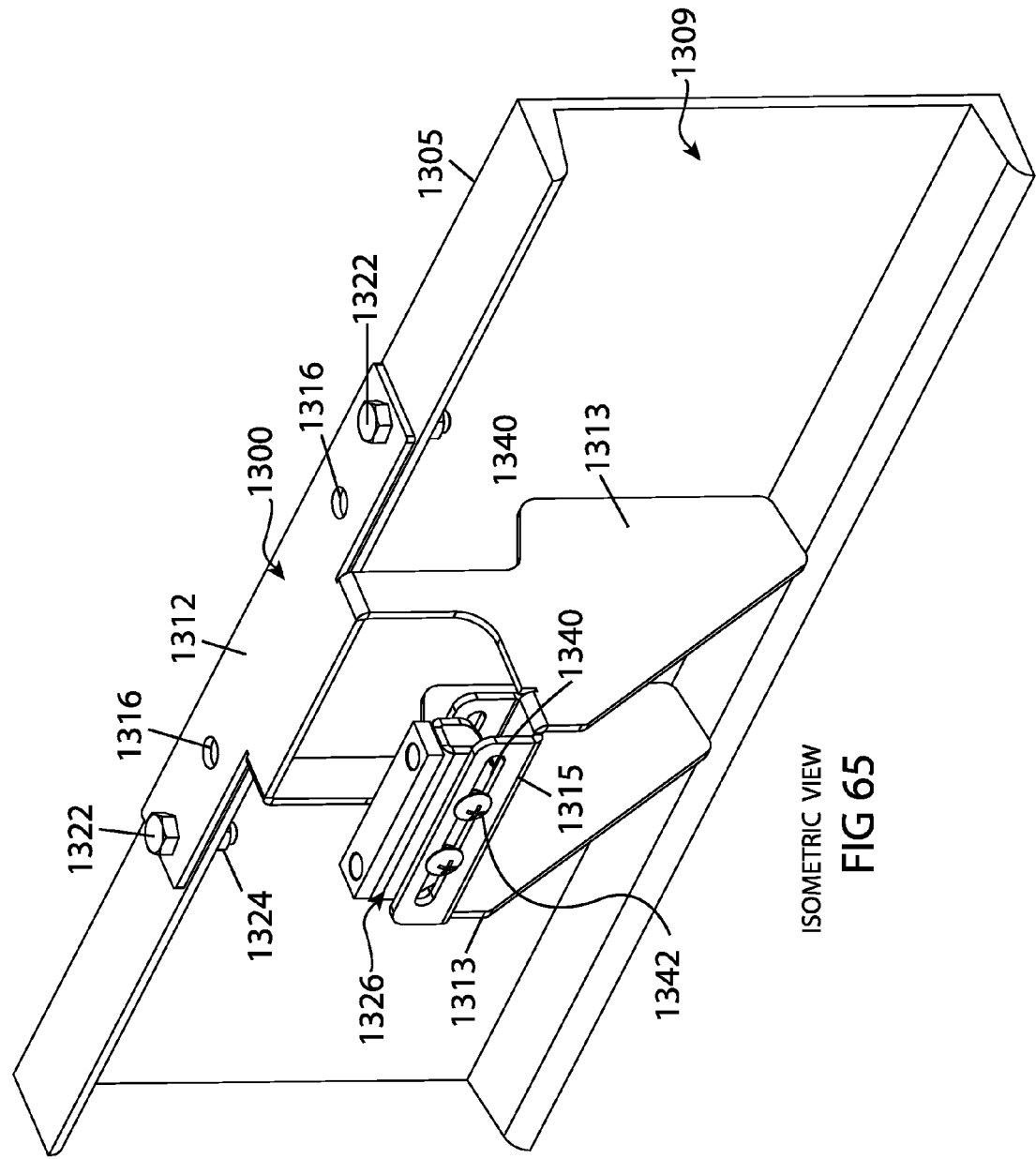
FIG. 65 is an isometric view of an alternative embodiment of an exemplary support structure that may be used with the exemplary adjustable retaining bracket according to the present invention installed on structural member.
Figure 66:
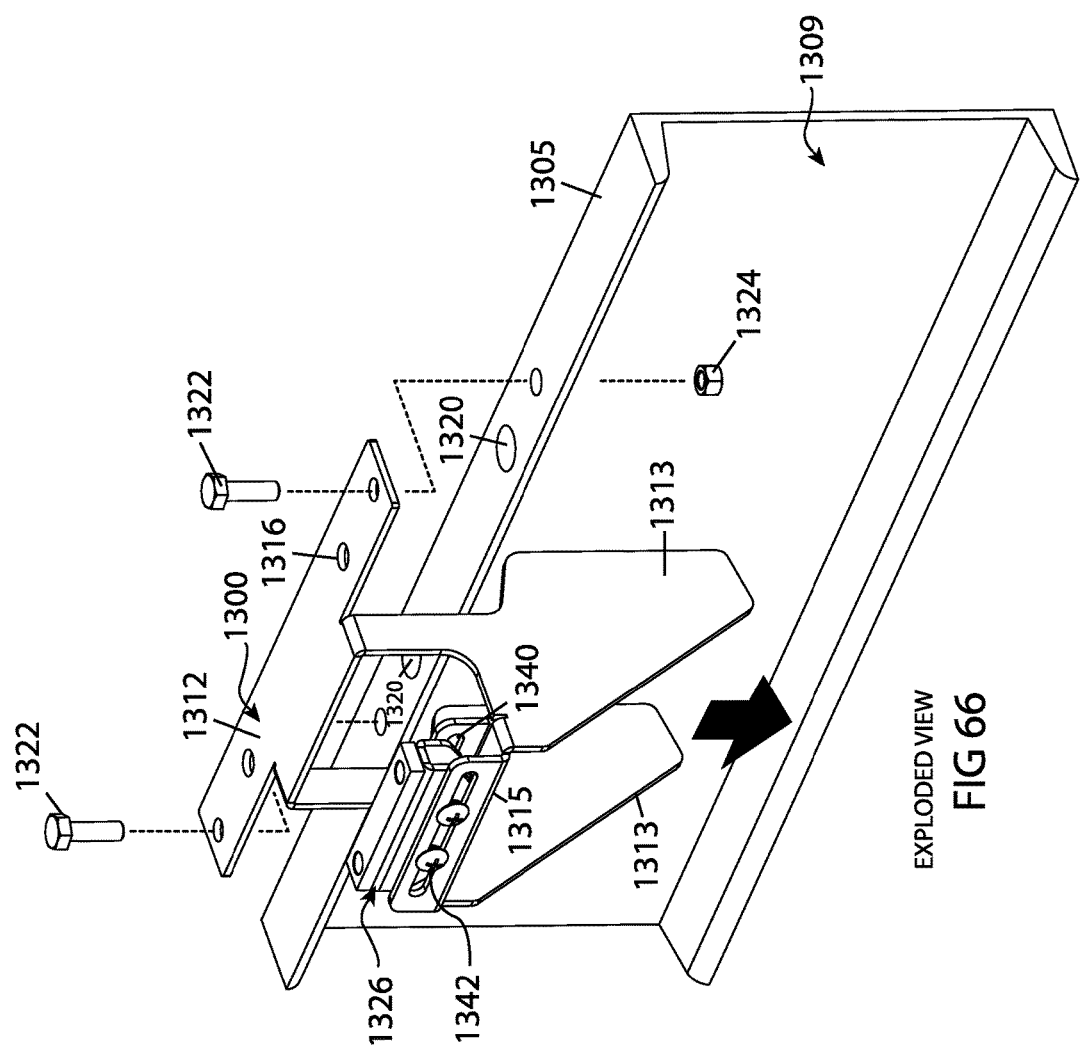
FIG. 66 is an exploded isometric view of the alternative exemplary support structure that may be used with the exemplary adjustable retaining bracket according to the present invention installed on the structural member.
Figure 67:
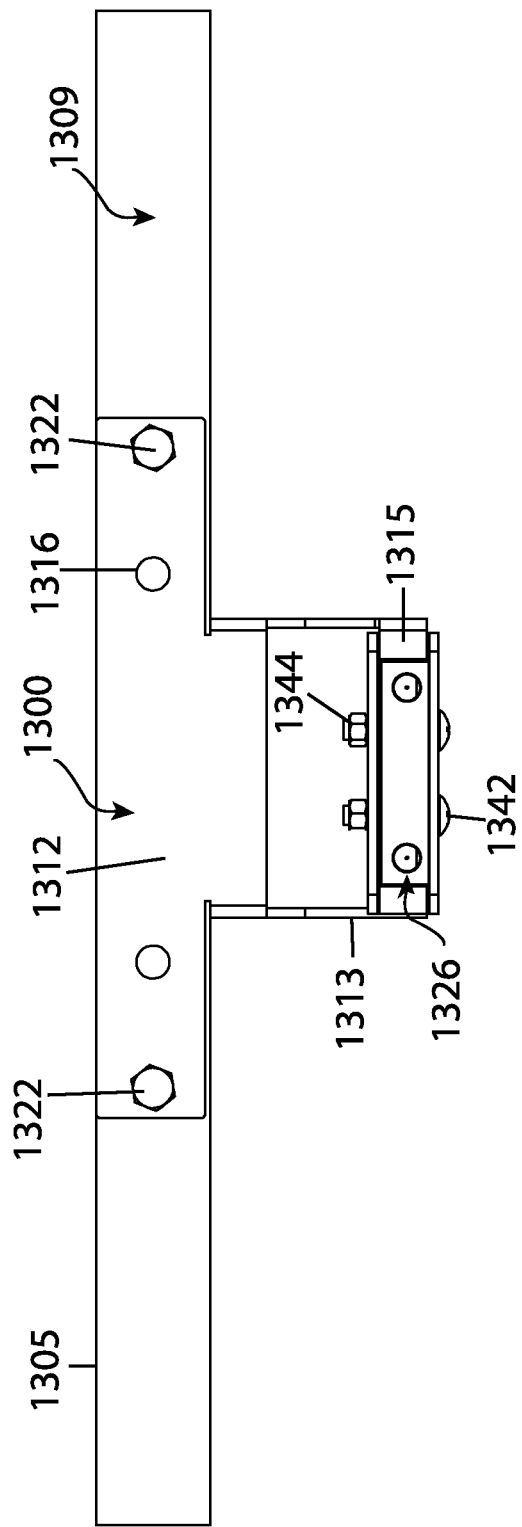
FIG. 67 is top plan view of the alternative exemplary support structure that may be used with the exemplary adjustable retaining bracket according to the present invention installed on the structural member.
Figure 68:
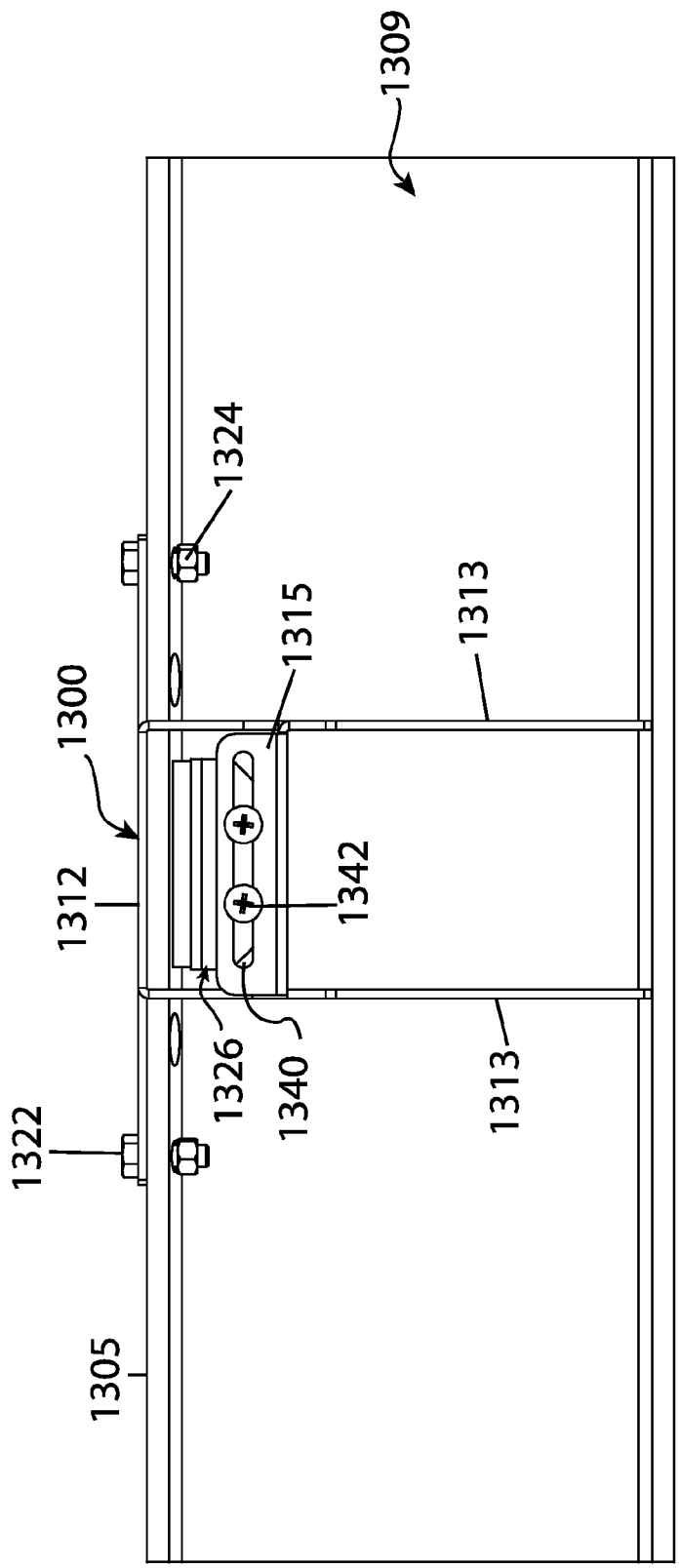
FIG. 68 is rear view of the alternative exemplary support structure that may be used with the exemplary adjustable retaining bracket according to the present invention installed on the structural member.
Figure 75:
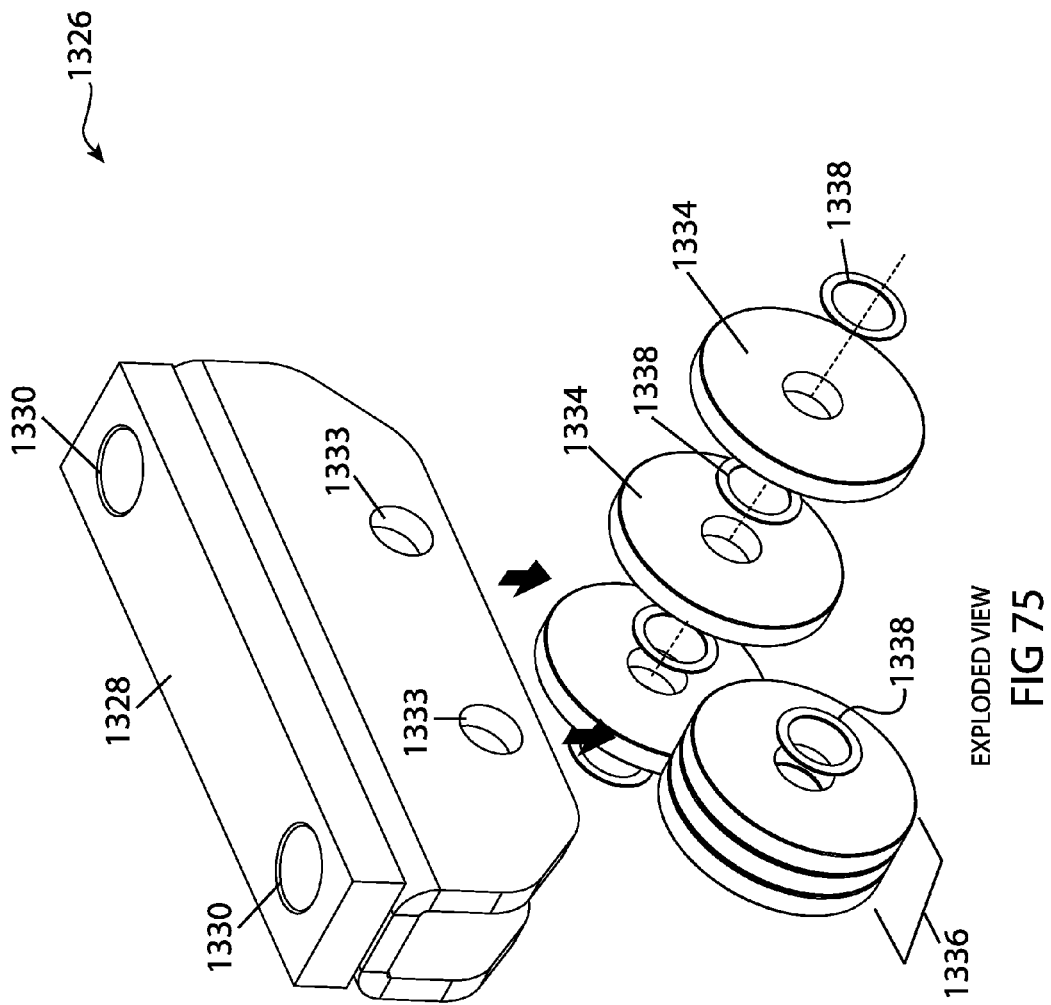
FIG. 75 is an exploded isometric view of the exemplary roller component of the alternative exemplary support structure that may be used with the exemplary adjustable retaining bracket according to the present invention.

Referring now to FIGS. 63-64, the mounting bracket 400 may be installed on the adjustable retaining bracket 1010 by inserting the catch rod 402 into the arching cutouts 1073 of the inner catch beam 1015. It is understood that each one of the one or more positioning nuts 409 should be located on the catch rod 402 so as to be positioned on either side of the inner catch beam 1015 when the catch rod 402 is inserted into the arching cutouts 1073. Once the catch rod 402 has been positioned so as to be cradled by the arching cutouts 1073 of the inner catch beam 1015, the longitudinally extending bolt 1076 may be rotated about its longitudinal axis in order to telescopically withdraw the inner catch beam 1015 into the hollow body portion 1040 of the outer tube 1014. During withdrawal of the inner catch beam 1015 into the outer tube 1014 the catch rod 402 is further received and retained within the recess formation 1056 of the hollow body portion 1040 which allows the inner catch beam 1015 with the catch rod 402 received thereon to be brought into the outer tube 1014 and provides for a cover to retain the catch rod 402 to prevent movement out of the arching cutouts 1073 of the inner catch beam 1015. Therefore, it is understood that the adjustable retaining bracket 1010 is positionable between a telescopically extended position of the inner catch beam 1015 relative to the outer tube 1014 (FIG. 63) and a telescopically withdrawn position of the inner catch beam 1015 relative to the outer tube 1014 (FIG. 64). Once the adjustable retaining bracket 1010 has been positioned into the telescopically withdrawn position the one or more positioning nuts 409 may be tightened on the catch rod 402 relative to the outer tube 1014. The adjustable retaining bracket 1010 is configured to adjust the mounting bracket 400 and wall 500 in a direction substantially perpendicular to the direction that the inner catch beam 1015 is configured to extend from and retract to the outer tube 1014.

Either of the locking nuts 1064 secured to the transverse adjusting rod 1060 may be rotated, which will cause the threads on the transverse adjusting rod 1060 to engage with the threaded holes 1053 of the outer tube 1014 resulting in movement of the outer tube 1014 along the traverse adjusting rod 1060 and base brace 1012. It is understood that the upper support band 1026 and the lower support band 1028 of the housing 1024 of the base brace 1012 act as guides and supports for the first flange 1044 and second flange 1048 respectively of the inner catch beam 1015 so that the first groove 1046 and second groove 1050 slide along the housing 1024. Since the catch rod 402 has been captured in the adjustable retaining bracket 1010 and the positioning nuts 409 have been secured about the outer tube 1014, the movement of the inner catch beam 1015 and outer tube 1014 is transferred to the catch rod 402 and one of the positioning nuts thereby moving the mounting bracket 400 and the wall 500 attached to the mounting bracket 400 in the desired direction. In this manner, the wall 500 attached to the mounting bracket 400 can be adjusted during installation of the wall 500 on a building structure without requiring additional equipment for final installation and/or adjustment of the wall 500. While the above discussion mentioned that the adjustable retaining bracket 1010 could be positioned in the telescopically withdrawn position prior to tightening the one or more positioning nuts 409, the present invention is not limited to such sequence of events, and it is contemplated that the one or more positioning nuts 409 can be tightened about the inner catch beam 1015 while the adjustable retaining bracket 1010 is in the telescopically extended position in order to allow for adjustment of the adjustable retaining bracket 1010 in the direction substantially perpendicular to the inner catch beam 1015 prior to withdrawal and/or adjustment of the adjustable retaining bracket 1010 in the direction parallel to the inner catch beam 1015.

It is understood that the adjustable mounting bracket 1010 and the components thereof described above may be made from any suitable materials for their intended purposes. For example, the adjustable mounting bracket 1010 may be made from sheet steel of any desired thickness.

Referring now to FIGS. 65-69, therein illustrated is an exemplary embodiment of a support structure, generally indicated by reference numeral 1300, that may be used with the adjustable retaining bracket 10 (FIGS. 76-78) or adjustable retaining bracket 1010 (FIG. 79) according to the present invention. As previously discussed with respect to the support structure 300 (FIGS. 15-20), the support structure 1300 shown in FIGS. 65-69 may be provided in order to facilitate installation, mounting and/or adjustment of the adjustable retaining bracket 10 or adjustable retaining bracket 1010 relative to a surface, such as a surface 1305 of a structural member 1309. The support structure 1300 may include a mounting plate 1312 and a pair of support fins 1313 extending substantially perpendicularly from the mounting plate 1312. The support fins 1313 may also be connected together by a bridge 1315 extending from one support fin 1313 to the other. The support fins 1313 are configured and positioned relative to the mounting plate 1312 and the bridge 1315 so as to provide support for the bridge 1315 by bearing against at least two surfaces of the structural member 1310. The mounting plate 1312 may also include one or more openings 1316 that may have welded nuts (not shown) secured to one side of the mounting plate 1312 of the support structure 1300. Holes 1320 may be positioned in the surface 1305 of the structural member 1310 in order to accommodate the welded nuts (not shown) of the support structure 1300. The support structure 1300 may be secured to the structural member 1310 by any suitable securing mechanism. For example, the support structure 1300 may secured to the structural member 1310 by one or more bolts 1322 inserted through the mounting plate 1312 and the surface 1305 and each bolt 1322 may be secured by a nut 1324, which may be a locking nut. However, it is understood that any suitable fastening device, such as a screw, rivet, weld, epoxy and/or adhesive, may be used to secure the support structure 1300 to the structural member 1310.

Still referring to FIGS. 65-69, the bridge 1315 of the support structure 1300 is configured to receive a rolling support 1326, and allow for rectilinear movement of the rolling support 1326 along the bridge 1315. As shown in greater detail in FIGS. 71-75, the rolling support 1326 includes a support bar 1328 that includes a pair of openings 1330 extending through the support bar 1328. As discussed further below, the pair of openings 1330 are positioned and configured to receive the level supporting bolts 102 of the adjustable retaining bracket 10 (FIGS. 76-78) or the level supporting bolts 1102 of the adjustable retaining bracket 1010 (FIG. 79). Still referring to FIGS. 71-55, the support bar 1328 of the rolling support 1326 is positioned on a channel chassis 1332 that includes one or more holes 1333 formed therein. The channel chassis 1332 is configured to receive a plurality of discs 1334, such as washers, in order to form rollers 1336 that are configured for rotation relative to the channel chassis 1332. The discs 1334 may be separated by one or more spacers 1338 placed between each disc 1334 and the discs 1334 and the channel chassis 1332. A spacer 1338 may also be placed on the outside of the channel chassis 1332 so as to be positioned between the channel chassis 1332 and the bridge 1315. It is understood that the rollers 1336 may be formed from a single wheel-type structure and may incorporate rotation facilitating devices such as bearings.

Referring now to FIGS. 65-70, the bridge 1315 of the support structure 1300 includes a pair of substantially parallel longitudinal slots 1340, and the rolling support 1326 may be movably secured to the bridge 1315 by passing one or more axel bolts 1342 perpendicularly through one of the longitudinal slots 1340, a hole 1333 on one side of the channel chassis 1332, one of the plurality of discs 1334, a hole 1333 on the other side of the channel chassis 1332 and out of the other longitudinal slot 1340. The axel bolts 1342 may be any suitable bolt, but preferably may be threaded only on the portion that extends from the bridge 1315. Each of the axel bolts 1342 may be secured to the bridge 1315 by an axel nut 1344, which may be locking nut, and it is understood that washers (not shown) may be positioned between the axel bolts 1342 and the bridge 1315 and the axel nuts 1344 and the bridge 1315. The axel bolts 1342 and the axel nuts 1344 are configured so as to retain the rolling support 1326 on the bridge 1315, but allow for the rollers 1336 to rotate about the axel bolts 1342 in order to permit movement of the rolling support 1326 longitudinally along the bridge 1315, including movement of the rolling support 1326 relative to the bridge 1315 while the rolling support 1326 is under a load. It is understood that a suitable lubricant, such as an appropriate oil or grease, may be introduced to between the axel bolts 1342 and rollers 1336 and/or the rolling support 1326 and bridge 1315 in order to reduce friction between these moving components and facilitate movement of these components relative to one another.

Figure 76:
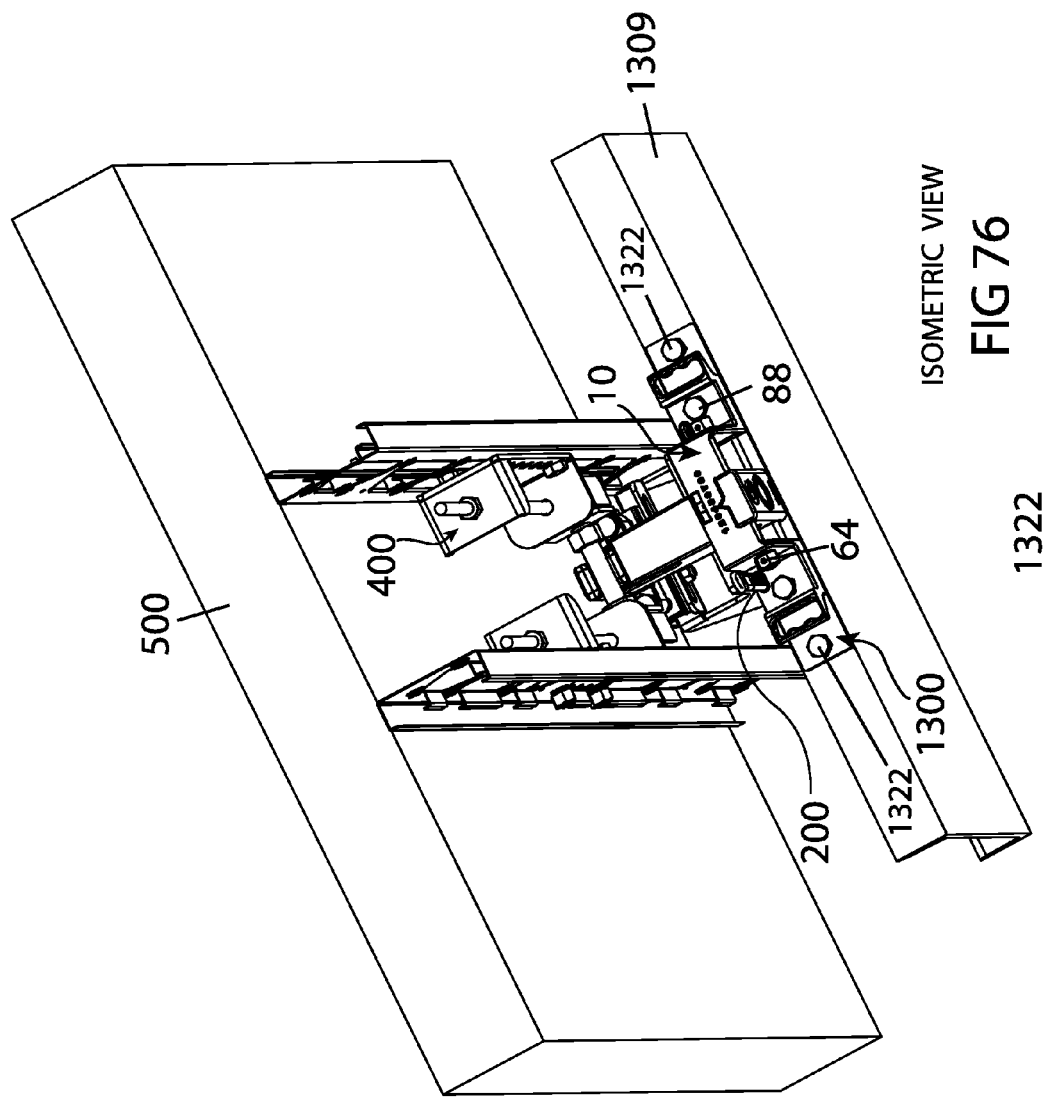
FIG. 76 is an isometric view showing the exemplary mounting bracket and exemplary wall on an exemplary adjustable retaining bracket installed on the alternative exemplary support structure according to the present invention.
Figure 77:
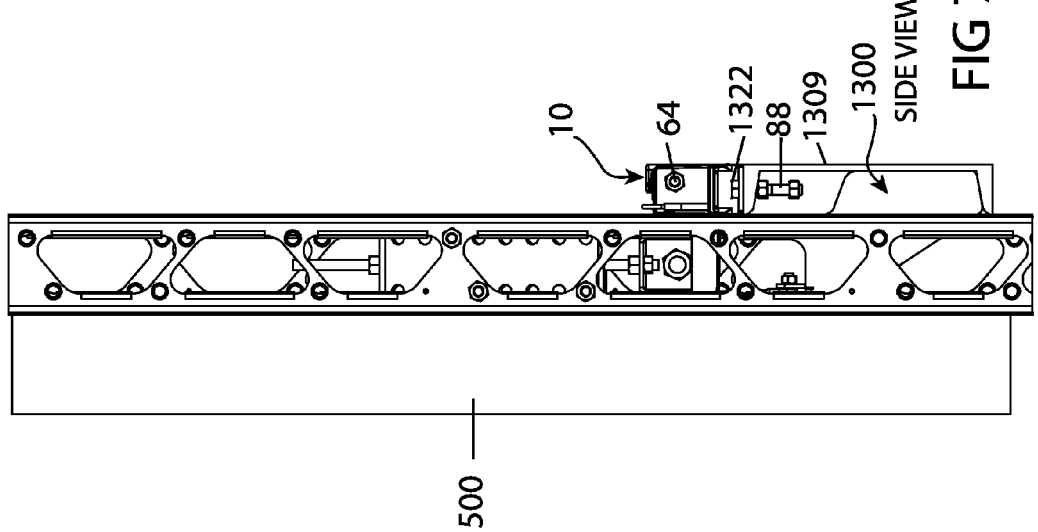
FIG. 77 is a side view showing the exemplary mounting bracket and exemplary wall on an exemplary adjustable retaining bracket installed on the alternative exemplary support structure according to the present invention.
Figure 78:
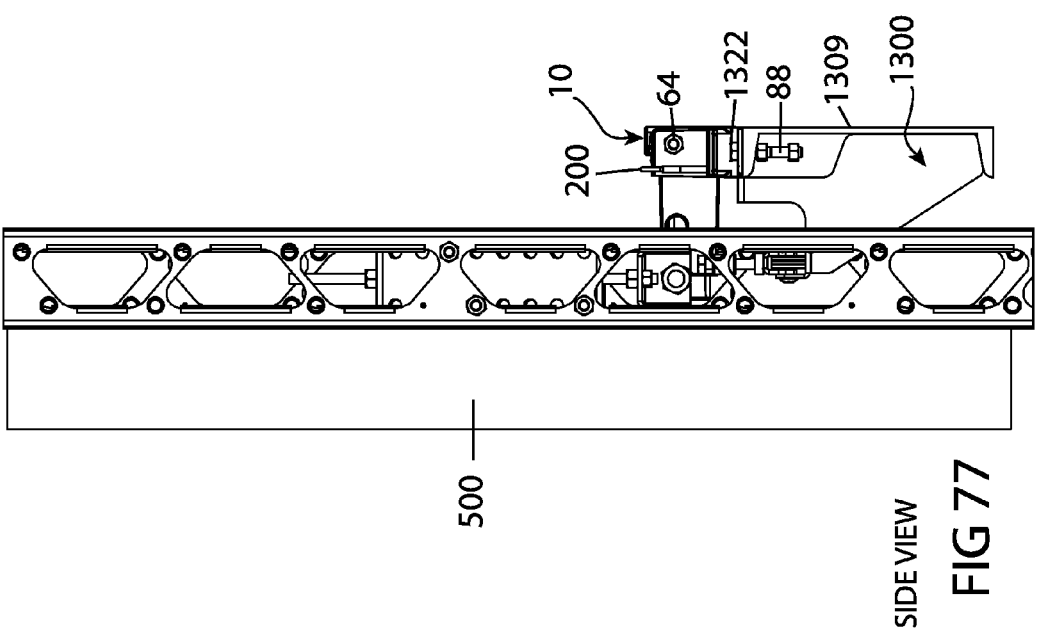
FIG. 78 is side view showing the exemplary mounting bracket and exemplary wall on an exemplary adjustable retaining bracket installed on the alternative exemplary support structure according to the present invention.

It is understood that the installation, operation and use of the adjustable retaining bracket 10 with the support structure 1300 is similar to the installation, operation and use of the adjustable retaining bracket 10 with the support structure 300 as discussed above. Referring now particularly to FIGS. 76-78, which show the adjustable retaining bracket 10 in combination with the support structure 1300 and structural member 1309. The adjustable retaining bracket 10 is aligned with the support structure 1300 once the support structure 1300 has been secured to the structural member 1309 so that the elevation adjusting bolts 88 can be received by the openings 1316 and welded nuts (not shown) of the support structure 1300. Each of the elevation adjusting bolts 88 are threaded into the corresponding opening 1316 and welded nut (not shown) in order to move the adjustable retaining bracket 10 into position over the support structure 1300. Once the elevation adjusting bolts 88 have been threaded through the welded nuts 1318 the stop nuts 100 can be threaded onto the elevation adjusting bolts 88 in order to prevent removal of the adjustable retaining bracket 10 from the support structure 1300 without removal of the stop nuts 100. It is understood that the elevation adjusting bolts 88 in cooperation with the welded nuts (not shown) provide support for the adjustable retaining bracket 10, and it is not necessary for the feet 22 of the base brace 12 to come into contact with the support structure 1300 in order to support the adjustable retaining bracket 10 in position. The elevation of the adjustable retaining bracket 10 relative to the support structure 1300 can be determined through use of the one or more adjusting guides 200, and the elevation of one side of the base brace 12 to the other side of the base brace 12 can also be determined through use of the one or more adjusting guides 200 as well. Subsequent or concurrently with securing and adjusting of the elevation adjusting bolts 88 to the support structure 1300 the level supporting bolts 102 of the adjustable retaining bracket 10 may also be inserted into and adjusted relative to the rolling support 1326. The level supporting bolts 102 may be inserted into the openings 1330 of the rolling support 1326, which are sized larger than the level supporting bolts 102, so that the level supporting bolts 102 are supported by the carriage 1332 of the rolling support 1326. Due to the bearing of the level supporting bolts 102 on the carriage 1332, the level supporting bolts 102 can be adjusted so as to provide additional support for the adjustable retaining bracket 10 and/or adjust the elevation and/or level of the adjustable retaining bracket 10 relative to the support structure 1300. Furthermore, since the level supporting bolts 102 are received into the support bar 1328, and the rolling support 1326 is movable relative to the support structure 1300, it is understood that movement of the adjustable retaining bracket 10 through use of the transverse adjusting rod 60, as discussed above, will be transferred to the rolling support 1326 in order to facilitate movement, adjustment and installation of the exemplary wall 500 relative to the structural member 1309, including such movement, adjustment and installation when the adjustable retaining bracket 10 is under a load, such as the load from the exemplary wall 500.

It is understood that the installation, operation and use of the adjustable retaining bracket 1010 with the support structure 1300 is similar to the installation, operation and use of the adjustable retaining bracket 1010 with the support structure 300 as discussed above. Referring now particularly to FIG. 79, which shows the adjustable retaining bracket 1010 in combination with the support structure 1300 and structural member 1309. The adjustable retaining bracket 1010 may be installed on the support structure 1300 and structural member 1309 by aligning the adjustable retaining bracket 1010 with the support structure 1300 once the support structure 1300 has been secured to the structural member 1309 so that the elevation adjusting bolts 1088 can be received by the openings 1316 and welded nuts (not shown) of the support structure 1300. Each of the elevation adjusting bolts 1088 are threaded into the corresponding opening 1316 and welded nut (not shown) in order to move the adjustable retaining bracket 1010 into position over the support structure 1300. Once the elevation adjusting bolts 1088 have been threaded through the welded nuts (not shown) the stop nuts 1100 can be threaded onto the elevation adjusting bolts 1088 in order to prevent removal of the adjustable retaining bracket 1010 from the support structure 1300 without removal of the stop nuts 1100. Subsequent or concurrently with securing and adjusting of the elevation adjusting bolts 1088 to the support structure 1300 the level supporting bolts 1102 of the adjustable retaining bracket 1010 may also be inserted into and adjusted relative to the rolling support 1326. The level supporting bolts 1102 may be inserted into the openings 1330 of the rolling support 1326, which are sized larger than the level supporting bolts 1102, so that the level supporting bolts 1102 are supported by the carriage 1332 of the rolling support 1326. Due to the bearing of the level supporting bolts 1102 on the carriage 1332, the level supporting bolts 1102 can be adjusted so as to provide additional support for the adjustable retaining bracket 1010 and/or adjust the elevation and/or level of the adjustable retaining bracket 1010 relative to the support structure 1300. Furthermore, since the level supporting bolts 1102 are received into the support bar 1328 and the rolling support 1326 is movable relative to the support structure 1300 it is understood that movement of the adjustable retaining bracket 1010 through use of the transverse adjusting rod 1060, as discussed above, will be transferred to the rolling support 1326 in order to facilitate movement, adjustment and installation of the exemplary wall (not shown) relative to the structural member 1309, including such movement, adjustment and installation when the adjustable retaining bracket 1010 is under a load.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. An adjustable retaining bracket, comprising:
   a base brace comprising a pair of feet, an upper support band and a lower support band positioned between the pair of feet;
   an outer tube operatively connected to the base brace and configured for rectilinear movement along the upper support band and the lower support band;
   an inner tube operatively connected to the outer tube and configured for telescopic movement relative to the outer tube, wherein the telescopic movement is transverse to the rectilinear movement;

at least one elevation adjusting bolt operatively connected to the base brace;

a support column attached to the outer tube; and at least one supporting bolt operatively connected to the support column.

2. The adjustable retaining bracket according to claim 1, further comprising a transverse adjusting rod having a longitudinal axis and operatively connected to the outer tube; and wherein the transverse adjusting rod is configured to cause the rectilinear movement of the outer tube along the upper support band and the lower support band when the transverse adjusting rod is rotated about its longitudinal axis.

3. The adjustable retaining bracket according to claim 1, further comprising an extending bolt having a longitudinal axis and operatively connected to the inner tube; and wherein the extending bolt is configured to cause the telescopic movement of the inner tube relative to the outer tube when the extending bolt is rotated about its longitudinal axis.

4. The adjustable retaining bracket according to claim 1, wherein the inner tube has a first end and a second end, and comprises a slot formed in the first end of the inner tube; wherein the outer tube comprises a hollow body portion dimensioned to receive at least a portion of the inner tube, and the hollow body portion is configured to cover at least a portion of the slot of the inner tube when the inner tube is telescopically retracted into the outer tube.

5. An adjustable retaining bracket, comprising:

a base brace comprising a pair of feet, an upper support band and a lower support band positioned between the pair of feet;

an outer tube operatively connected to the base brace and configured for rectilinear movement along the upper support band and the lower support band;

an inner tube operatively connected to the outer tube and configured for telescopic movement relative to the outer tube, wherein the telescopic movement is transverse to the rectilinear movement;

wherein the inner tube has a first end and a second end, and comprises a slot formed in the first end of the inner tube; wherein the outer tube comprises a hollow body portion dimensioned to receive at least a portion of the inner tube, and the hollow body portion is configured to cover at least a portion of the slot of the inner tube when the inner tube is telescopically retracted into the outer tube.

6. The adjustable retaining bracket according to claim 5, further comprising at least one elevation adjusting bolt operatively connected to the base brace;

a support column attached to the outer tube; and at least one supporting bolt operatively connected to the support column.

7. The adjustable retaining bracket according to claim 5, further comprising a transverse adjusting rod having a longitudinal axis and operatively connected to the outer tube; and wherein the transverse adjusting rod is configured to cause the rectilinear movement of the outer tube along the upper support band and the lower support band when the transverse adjusting rod is rotated about its longitudinal axis.

8. The adjustable retaining bracket according to claim 5, further comprising an extending bolt having a longitudinal axis and operatively connected to the inner tube; and wherein the extending bolt is configured to cause the telescopic movement of the inner tube relative to the outer tube when the extending bolt is rotated about its longitudinal axis.

* * * * *